United States Patent [19]
Kobayashi et al.

[11] Patent Number: 6,101,576
[45] Date of Patent: *Aug. 8, 2000

[54] METHOD FOR SAVING GENERATED CHARACTER IMAGE IN A CACHE SYSTEM INCLUDING A BACKUP CACHE

[75] Inventors: Sumitake Kobayashi; Atsuo Matsunaga; Ichiro Kawabata; Ryozo Furutani; Tomomi Ohta; Seiichi Kamon; Hiromitsu Nishimura; Akihiro Abe, all of Kawasaki, Japan

[73] Assignee: Fujitsu Limited, Kanagawa, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/090,001

[22] Filed: Jul. 9, 1993

[30] Foreign Application Priority Data

| Jul. 31, 1992 | [JP] | Japan | 4-204165 |
| Jul. 31, 1992 | [JP] | Japan | 4-204166 |
| Jul. 31, 1992 | [JP] | Japan | 4-204168 |
| Nov. 9, 1992 | [JP] | Japan | 4-322223 |

[51] Int. Cl.$^7$ .................................................. G06F 12/08
[52] U.S. Cl. .............................. 711/122; 711/113; 711/6; 711/161; 711/162; 707/204; 358/1.14; 358/1.11; 358/1.16
[58] Field of Search .................................. 358/1.14, 1.11, 358/1.16; 711/113, 122, 162, 161; 714/6; 707/204

[56] References Cited

U.S. PATENT DOCUMENTS

| 4,996,649 | 2/1991 | Kamei et al. | 395/110 |
| 5,040,129 | 8/1991 | Nishiyama | 395/110 |
| 5,148,293 | 9/1992 | Miyachi | 395/115 |
| 5,155,832 | 10/1992 | Hunt | 395/425 |
| 5,208,908 | 5/1993 | Harrison et al. | 395/150 |
| 5,305,433 | 4/1994 | Ohno | 395/150 |
| 5,313,612 | 5/1994 | Satoh et al. | 395/425 |
| 5,319,766 | 6/1994 | Thaller et al. | 395/425 |
| 5,325,509 | 6/1994 | Lautzenheiser | 711/137 |
| 5,345,548 | 9/1994 | Nomura et al. | 395/150 |
| 5,394,514 | 2/1995 | Matsubara | 395/115 |
| 5,410,640 | 4/1995 | Morikawa et al. | 395/110 |
| 5,708,768 | 1/1998 | Horiuchi et al. | 345/471 |

FOREIGN PATENT DOCUMENTS

| 53-33023 | 3/1978 | Japan . |
| 5339034 | 10/1978 | Japan . |
| 58-114259 | 7/1983 | Japan . |
| 61-210453 | 9/1986 | Japan . |
| 62-296216 | 12/1987 | Japan . |
| 1109416 | 4/1989 | Japan . |
| 1298422 | 12/1989 | Japan . |
| 214461 | 1/1990 | Japan . |
| 2154359 | 6/1990 | Japan . |
| 3112668 | 5/1991 | Japan . |
| 3174588 | 7/1991 | Japan . |
| 3183575 | 8/1991 | Japan . |
| 4113873 | 4/1992 | Japan . |

*Primary Examiner*—Hiep T. Nguyen
*Attorney, Agent, or Firm*—Helfgott & Karas, PC.

[57] ABSTRACT

When a control unit is in a non-operating (non-printing) state, data to be saved (character-image data) in a RAM cache memory is transferred to a disk cache memory at regular intervals in order of priority, thereby saving the data in the disk cache memory. If a power supply is cut off and then power is reintroduced, high-priority character-image data, which has been transferred from the RAM cache memory to the disk cache memory and saved in the disk cache memory when printing is not being carried out, is restored in the RAM cache memory. As a result, the high-priority data saved in the RAM cache memory when the power supply was cut off can be restored in the RAM cache memory, thereby raising the hit rate.

7 Claims, 46 Drawing Sheets

FIG. 19
(A) SAVE ACTIVATED
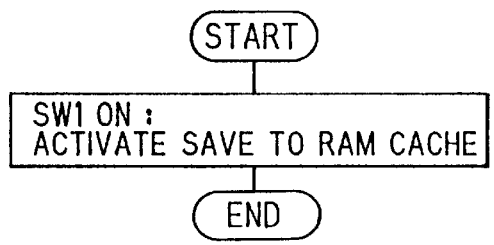
(B) SAVE DEACTIVATED
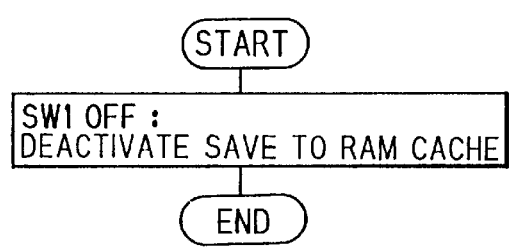
(C) LOADING ACTIVATED
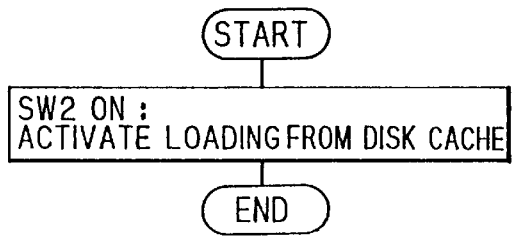
(D) LOADING DEACTIVATED
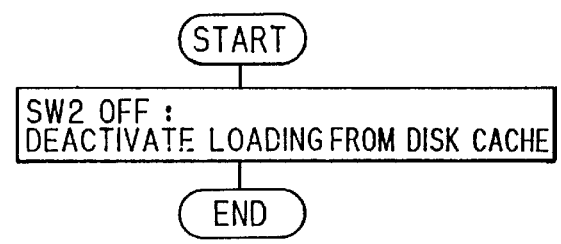
(E) SAVE ACTIVATED
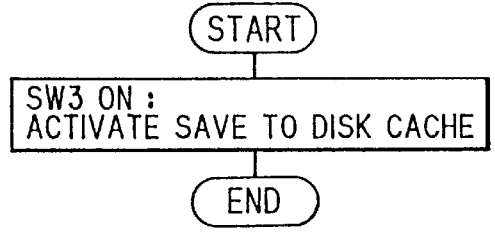
(F) SAVE DEACTIVATED
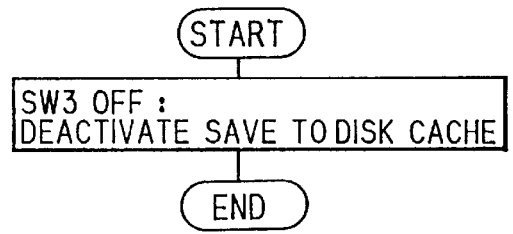
(G) LOADING ACTIVATED
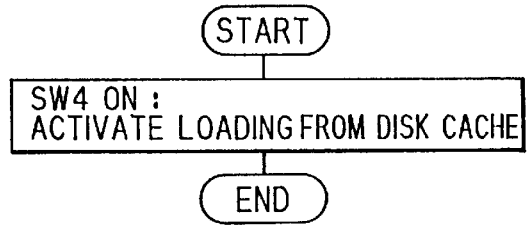
(H) LOADING DEACTIVATED
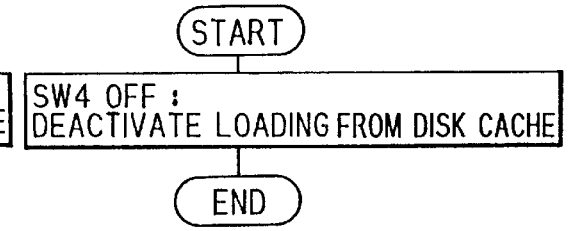

FIG. 20
(A) CHARACTER-CODE SETTING
(B) CHARACTER-CODE SETTING
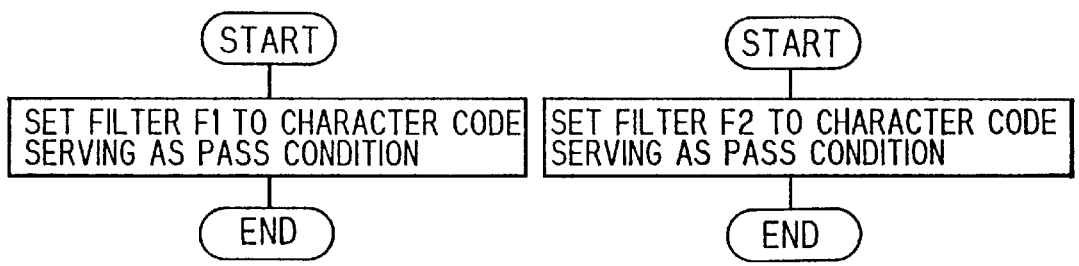
(C) CHARACTER MAGNIFICATION
(D) CHARACTER MAGNIFICATION
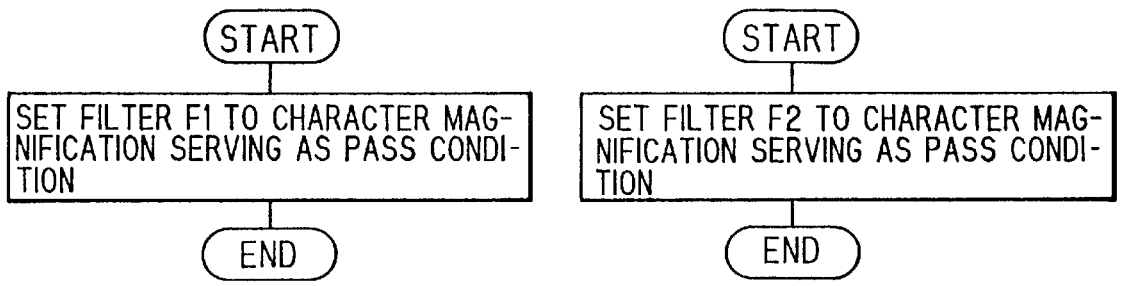
(E) TABLE ERASURE
(F) TABLE ERASURE
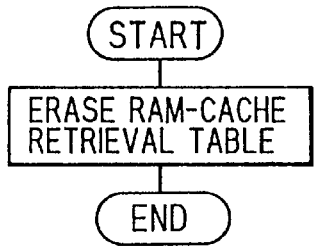
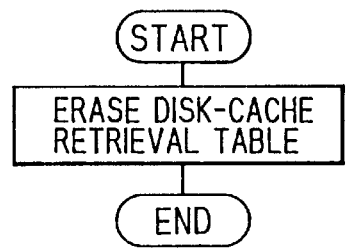

METHOD FOR SAVING GENERATED CHARACTER IMAGE IN A CACHE SYSTEM INCLUDING A BACKUP CACHE

BACKGROUND OF THE INVENTION

This invention relates to a method of controlling a cache memory. More particularly, the invention relates to a cache memory control method in an apparatus having a first cache memory in which stored data vanishes owing to cut-off of power and a second cache memory in which stored data is saved even if power is cut off.

In image output devices such as printers and display units, an increase in the processing speed of the host apparatus (computer) has been accompanied by the need for high-speed image output and for the output of fonts of various types and sizes. Consequently, these image output devices have a first cache memory (RAM cache) comprising a RAM accessible at high speed, a second cache memory (disk cache) composed of part of the storage area of a disk-shaped storage medium and a cache memory controller, and they use these elements to raise the speed at which character-image data is produced in order to provide higher printing and display speeds. In image output devices of this kind, the cache memory controller preserves used new data (character-image data) in the RAM cache if the RAM cache is not full. If the RAM cache is full, the cache memory controller saves part of the character-image data that has been saved in the RAM cache in the disk cache and then saves the above-mentioned new character-image data in the RAM cache. When prescribed character-image data is necessary, the cache memory controller searches the RAM cache and then the disk cache if the data is not present in the RAM cache. The prescribed processing is executed using the character-image data retrieved by the search. If the data cannot be found, character-image data is produced anew and saved in the RAM cache.

In a printer, for example, outline-font data is stored beforehand in correlation with characters (inclusive of symbols). When a character code and its magnification (font size) have been designated, the outline-font data corresponding to the character code is multiplied by the designated magnification and the outline of the character having the desired size is printed and painted to produce the character-image data. However, producing character-image data from outline-font data requires considerable time. Accordingly, once character-image data has been created in a printing device, the data is preserved in the RAM cache and disk cache beforehand. When a prescribed font code has been entered, the RAM cache is searched and then the disk cache if the code is not found in the RAM cache. The prescribed processing such as printing is performed using the character-image data retrieved by the search. In a case where the character-image data cannot be found, character-image data is produced and printed using outline-font data corresponding to the font code and this character-image data is saved in the RAM cache and disk cache. It should be noted that outline-font data is font data in which the outline of a character is expressed in the form of vectors. The reason for using the outline-font data is that this data can be stored with a memory capacity much smaller than that needed for character-image data.

FIGS. 1 and 2 are diagrams for describing cache memory control in a conventional printer. Shown in FIG. 1 are a control unit 1 for controlling the overall printer, a printer main body (mechanical mechanisms, the printer head, mechanical controller, head driver, etc.) 2, an operator's panel 3 having a display unit and various operating keys, and a hard disk 4.

The control unit 1 is provided with a controller 1a constituted by a microcomputer and a cache memory (hereinafter referred to as a RAM cache) 1b constituted by a RAM for storing character-image data once this data has been created. The hard disk 4 is provided with an outline-font data storage area 4a for storing outline-font data in correlation with character codes, a disk-cache storage area (hereinafter referred to simply as a disk cache) 4b for storing character-image data transferred thereto owing to overflow from the RAM cache, and other storage areas such as a storage area which stores system programs and the like for printer control.

Upon receiving data (a character code string) or a command from the host apparatus, the control unit 1 performs analysis to determine if what has been received is a character code. In the case of the character code, the control unit searches the RAM cache 1b and then the disk cache 4b if the code is not present in the RAM cache 1b. The character-image data retrieved by the search is fed into the head driver of the printer main body 2 to perform printing. If the character code cannot be found, the control unit 1 uses outline-font data corresponding to the character code to produce character-image data anew and print the data. The control unit 1 preserves this newly created character-image data in the RAM cache 1b. If the RAM cache is full in this case, some of the data that has been saved in the RAM cache is transferred to the disk cache 4b to produce a blank space in the RAM cache, after which the new character-image data is saved in the RAM cache.

If the control unit 1 receives a line-feed command, page-eject command or the like from the host apparatus or operator's panel 3, the control unit 1 sends the line-feed or page-eject command to the mechanical control portion of the printer main body 2, thereby causing the mechanical control portion to control a line-feed mechanism or page-eject mechanism so that these operations are carried out.

The size of the RAM cache 1b is limited and is capable of storing only 100 to 200 items of character-image data, by way of example. For this reason, a least recently used (LRU) algorithm is used to assign the highest order of priority to the character-image data used last, and the character-image data is stored in the RAM cache 1b with the order of priority being assigned in the order in which the data was used. More specifically, if the RAM cache 1b is not full, newly created character-image data is saved in the RAM cache 1b upon having the highest order of priority assigned to it, and the orders of priority of other items of character-image data already stored in the RAM cache are each lowered by one rank. If the RAM cache is full, on the other hand, character-image data having the lowest order of priority (i.e., least recently used character-image data) is transfer red from the RAM cache 1b to the disk cache 4b, whereby the data is saved, thereby producing space in the RAM cache 1b. Thereafter, newly created character-image data is saved in the RAM cache 1b upon having the highest order of priority assigned to it, and the orders of priority of other items of character-image data already stored in the RAM cache are each lowered by one rank.

The disk cache 4b, which is capable of storing on the order of 500 items of character-image data for example, saves transferred character-image data while the order of priority is assigned to this data in the same manner as performed by the RAM cache 1b. In other words, if the disk cache 4b is not full, character-image data transferred from the RAM cache 1b is preserved in the disk cache 4b upon having the highest order of priority assigned to it, and the orders of priority of other items of character-image data already stored in the disk cache are each lowered by one rank. If the disk cache 4b is full, on the other hand, character-image data having the lowest order of priority (i.e., least recently used character-image data) is discarded to make space, after which transferred character-image data is saved in the disk cache 4b upon having the highest order of priority assigned to it and the orders of priority of other items of character-image data already stored in the disk cache are each lowered by one rank.

If the power supply is cut off under these conditions, the data that has been stored in the RAM cache 1b vanishes. When the power is introduced, therefore, some of the character-image data that has been saved in the disk cache 4b is transferred to the RAM cache 1b, after which the above-described cache memory control is carried out.

FIG. 2 is an explanatory view of cache memory control according to the prior art. In order to simplify the description, this is for a case in which a maximum of four items of character-image data and a maximum of six items of character-image data are capable of being stored in the RAM cache 1b and disk cache 4b, respectively, with the order of priority of the data ascending from right to left. If the RAM cache and disk are full, as illustrated at (1) in FIG. 2, and new character-image data (data 0) is produced, first ① the character-image data (data 10) having the lowest order of priority is discarded from the disk cache 4b to make space equivalent to one item of character-image data, then ② the character-image data (data 4) having the lowest order of priority is transferred from the RAM cache 1b to the disk cache 4b in order to be saved (with the highest order of priority assigned being thereto), and finally ③ the new character-image data (data 0) is saved in the RAM cache 1b and has the highest order of priority assigned thereto. Thus, character-image data (data 0~data 9) is saved in the cache memories as shown at (2) in FIG. 1.

If the power supply is cut off under the conditions shown at (2), the data that has been stored in the RAM cache 1b vanishes. When power is re-introduced, the four items of character-image data (data 4~data 7) having the high orders of priority saved in the disk cache 4b are transferred to the RAM cache 1b to produce a space in the disk cache that is equivalent to the four transferred characters. As a result, character-image data (data 4~data 7) is saved in the RAM cache 1b and character-image data (data 8~data 9) is saved in the disk cache 4b, as illustrated at (3) in FIG. 2. The cache control described above is then carried out.

With the prior-art cache memory control described above, however, data having a high order of priority stored in the RAM cache vanishes when power is cut off. Consequently, this high-priority data cannot be recovered in the processing that follows the re-introduction of power, the hit rate declines and therefore a problem arises in terms of high-speed processing.

Other problems are also encountered in the conventional method of controlling cache memory.

Specifically, control of a cache memory (RAM cache and disk cache) is fixed within the apparatus. Consequently, use of a cache memory becomes effective in cases where the same character appears repeatedly a number of times.

① However, when it is attempted to print out a kanji code table, for example, identical characters do not appear and therefore the character-image data of a character of interest is not obtained from the cache memory. This means that the character-image data of every character is created using outline-font data. In such cases, the operation of saving character-image data in the cache memory becomes meaningless. Accordingly, in the printout of characters all of which are different, as in the case of a kanji code table, printing speed (the speed at which character-image data is produced) declines by an amount equivalent to the number of superfluous saving operations required.

② Further, when magnification of a character takes on a large value, the volume of character data also becomes large. As a consequence, loading the character-image data from the cache memory takes time and there are cases in which it is faster to generate the character-image data from outline-font data. In such cases, saving newly generated character-image data in the cache memory and loading the data are useless operations.

③ Furthermore, depending upon the type, certain characters almost never appear in ordinary text. Using a cache memory to save character-image data of characters almost never used, as is the case with the No. 2 Level characters of the JIS, is wasteful since it does nothing more than place a limit upon the storage area of the cache memory. Herein, the No.2 Level characters of the JIS are gathering of KANJI in Japanese which are not used ordinarily. And, the No.1 Level characters of the JIS are gathering of KANJI in Japanese which are used ordinarily.

Moreover, when a cache memory is filled with hardly used characters such as the No. 2 Level characters of the JIS and a character code composed of the frequently used No. 1 Level characters of the JIS is received, not only is the cache memory rendered substantially meaningless but data discarding processing by overflow must be executed as well.

The conventional cache memory control method has the following disadvantages as well:

In cache memory control, processing is executed for transferring data from the RAM cache of the control apparatus to the disk cache of the hard disk and writing the data in the disk cache. The processing executed by the control unit for writing the data (character-image data) in the hard disk is performed in the following manner: When a data transfer is required, the controller 1a (see FIG. 1) instructs, via a disk interface (not shown), that data of a prescribed length is to be written in the hard disk 4. A disk controller (not shown) writes the data in the hard disk 4 one block unit at a time (one block is composed of, say, 256 bytes), where the block units are the units of access, and attaches an ECC (error-checking code) to the end of each block. That is, as shown in FIG. 3, in a case where data is written in a physical sector PS, first a gap GP1, an ID and a gap GP2 are provided, after which a first block BL1 composed of the 256-byte data and the ECC is written in. This is followed by providing a gap GP3, then writing in a second block BL3 comprising 256-byte data and the ECC and finally providing a gap GP4 and a servozone SVZ.

A situation may arise in which the power supply is interrupted momentarily or cut off when character-image data of one character unit is in the process of being saved in the disk cache 4b from the RAM cache 1b. For example, this can occur when there is a power failure, when a power-supply switch is opened inadvertently or when someone trips over a power cord and pulls it out of its socket.

In such cases, the writing of one block cannot proceed owing to the loss of power and, as a result, the ECC is not attached to the end of the block. If the ECC fails to be attached, a read error will occur when the physical sector is read after the re-introduction of power and, depending upon the saving method, the data in the disk cache or the data in a management table will be destroyed. Nevertheless, measures to protect data and measures to protect the physical sector in the event of a momentary interruption in power or power outage during the writing in of data from an external storage device are not taken in the prior art. As a consequence, data is lost or a read error occurs when it is attempted to read the physical sector. Software must be reinstalled or a restoration operation must be performed.

SUMMARY OF THE INVENTION

Accordingly, an object of the present invention is to provide a cache memory control method whereby high-priority data that has been stored in a cache memory such as a RAM cache, from which stored data vanishes in the event of a power cut-off, is capable of being recovered when power is re-introduced.

Another object of the present invention is to provide a cache memory control method capable of minimizing loss of data that has been stored in a cache memory such as a RAM cache from which stored data vanishes in the event of a power cut-off.

Still another object of the present invention is to provide a cache memory control method wherein processing through which data in a first cache memory (a RAM cache, for example), from which stored data vanishes in the event of a power cut-off, is saved in a second cache memory (a disk cache, for example), from which stored data does not vanish in the event of a power cut-off, is executed when a control unit is not executing the primary control, such as printing control, whereby there is no decline in printing speed.

A further object of the present invention is to provide a cache memory control method wherein processing through which data in a first cache memory (a RAM cache, for example), from which stored data vanishes in the event of a power cut-off, is saved in a second cache memory (a disk cache, for example), from which stored data does not vanish in the event of a power cut-off, is executed in prescribed data units at fixed time intervals, thereby raising printing speed by shortening the time occupied by one processing operation for writing of data in the second cache memory.

Yet another object of the present invention is to provide a cache memory control method wherein when data in a first cache memory (a RAM cache, for example) from which stored data vanishes in the event of a power cut-off is saved in a second cache memory (a disk cache, for example) from which stored data does not vanish in the event of a power cut-off, the data is saved starting from data having a high order of priority, whereby loss of data having a high order of priority can be held to a minimum.

A further object of the present invention is to provide a cache memory control method whereby the speed at which character-image data is generated can be raised by utilizing cache memory effectively in conformity with a data stream from a host.

A further object of the present invention is to provide a cache memory control method so adapted that erroneous data will not be written in a physical sector if power is cut off during the writing of data in a disk cache.

A further object of the present invention is to provide a cache memory control method wherein loss of data can be held to a minimum even if power is cut off during the writing of data in a disk cache, thereby making it possible to dispense with re-installation of software and a recovery operation.

A further object of the present invention is to provide a cache memory control method in which loss of data can be held to one item of character-image data even if power is cut off during the writing of character-image data in a disk cache.

Still another object of the present invention is to provide a cache memory control method in which when a power-supply switch is opened during processing for writing data in a disk cache, a disk error will not occur at re-introduction of power.

Still another object of the present invention is to provide a cache memory control method in which data to be transferred is subdivided, whether or not a power-supply switch-off signal has been produced is determined before transfer of the subdivided data, the power supply is capable of being turned off immediately at the breaks of the subdivided data even in the course of processing if the power-supply switch is determined to be off, and the fact that the power supply has been cut off during the data transfer is capable of being discerned when power is introduced.

In accordance with a cache memory control method according to the present invention, a control unit transfers data, which has been saved in a first cache memory but not in a second cache memory, from the first cache memory to the second cache memory to save the data in the latter, and then transfers some of the data that has been saved in the second cache memory to the first cache memory when power is introduced. By adopting this method, loss of data, which has been stored in a RAM cache, due to cut-off of power can be held to a minimum and the hit rate can be improved. Further, the processing for saving the data in the second cache memory is executed when the control unit is not performing primary control, e.g., control of printing. With this arrangement, there is no effect upon the primary control operation and no decline in printing speed. Moreover, the data save processing is executed in prescribed data units at fixed time intervals. As a result, the time occupied by a single writing processing operation can be curtailed, influence upon the primary control operation (such as control of printing) can be minimized and there is no decline in printing speed. Furthermore, if it is so arranged that data is saved starting from data having a high order of priority, loss of high-priority data can be held to a minimum and the hit rate can be raised.

In accordance with another cache memory control method of the present invention, a cache memory controller stops the operation for saving character-image data in a cache memory if a halt to execution of this operation for saving data in the cache memory has been commanded from the outside. When a character code or character size which is not the object of a saving operation has been commanded from the outside, the relevant character-image data is not saved in the cache memory. Furthermore, a font image that has been stored in the cache memory is erased by an externally applied command.

By virtue of this arrangement, cache memory control suited to a bit stream from a host apparatus is executed to dispense with needless saving operations. For example, the speed at which font images are produced can be raised by halting a saving operation in response to an externally applied command if the data stream is such that it is better not to save the data in a cache memory beforehand, as in the case of a kanji code table or special test pattern. In case of character codes which should not be saved in a cache memory because they are used infrequently, such as in the case of the No. 2 standard of the JIS, the saving of the character-image data corresponding to these character codes is not performed, thus making it possible to raise the speed at which the character-image data is generated. Furthermore, in case of fonts which should not be saved in a cache memory because they are used infrequently, such as in the case of fonts having a large magnification, the saving of the character-image data having such font size is not performed, thus making it possible to raise the speed at which the character-image data is generated. In a case where character-image data used infrequently has already been stored in a cache memory, this data can be erased by an externally applied command to make possible more efficient utilization of the cache memory.

In accordance with still another cache memory control method of the present invention, a cache memory controller stops the loading of character-image data from a cache memory in a case where a halt to loading of the character-image data from the cache memory is commanded from the outside. When a character code or character size which is not the object of loading has been commanded from the outside, the relevant character-image data is not loaded from the cache memory.

By virtue of this arrangement, cache memory control suited to a bit stream from a host apparatus is executed to dispense with needless loading operations. In a case where generating character-image data using outline-character image data is faster than loading data from a cache memory, as in the case of characters having a large magnification, the speed at which the character-image data is generated can be raised by not carrying out the loading operation. Furthermore, in a case where generating character-image data using outline-font data is faster than loading data from a cache memory, as in the case of characters having a complicated shape, the speed at which the character-image data is generated can be raised by not carrying out the loading operation.

In still another cache memory control method according to the present invention, when data is to be transferred from a first cache memory to a second cache memory to be saved in the latter, a control unit commands the writing of data in an external storage device in write units of a prescribed length via an interface. The external storage device subdivides the data of the commanded prescribed length into single access units and writes the data in the second cache memory. When a power cut-off is detected during the writing of data, the external storage device writes data of one access unit, which is currently being written, in a second cache memory, after which it ends the write operation. If this arrangement is adopted, data of one access unit can be written reliably in a physical sector and erroneous data will not be written in the physical sector. Moreover, even if the power supply is cut off during the writing of data in the second cache memory (disk cache), loss of data can be held to the minimum and it is possible to dispense with re-installation of software as well as a restoration operation.

According to yet another cache memory control method of the present invention, when a power-supply switch is opened during the transfer of data from a first cache memory to a second cache memory, a power supply device outputs a switch-OFF signal to a control unit which, based upon the switch-OFF signal, outputs a first power-off request signal at the end of data transfer processing. The power supply device or the control unit clocks the time which has elapsed from generation of the switch-OFF signal and outputs a second power-off request signal when the elapsed time attains a predetermined time. The power supply device cuts off the supply of power in response to generation of the first or second power-off request signal. As a result of this arrangement, even if the power-supply switch is opened during the processing for writing data in the disk cache, the power supply can be cut off after the transfer of data currently being executed is concluded. Further, even if an abnormality occurs in the control unit so that the first power-off request signal cannot be outputted, the power supply can be cut off following elapse of a predetermined period of time.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 19 is a first flowchart of external control processing in the second embodiment;

FIG. 20 is a second flowchart of external control processing in the second embodiment;

DESCRIPTION OF THE PREFERRED EMBODIMENTS (A) First Embodiment (a) General Description FIG. 4(a) is a block diagram for describing a first embodiment of the invention in general terms. Numeral 11 denotes a control unit such as a printer controller for controlling the entirety of a printer device. Connected to the control unit 11 are the controlled device 12, such as a printer main body (mechanical mechanisms, the printer head, mechanical controller, head driver, etc.), an operator's panel 13 for the printer having a display unit and various operating keys, and a hard disk 14. The control unit 11 is provided with a RAM (hereinafter referred to as a RAM cache) 11b for storing character-image data once this data has been created. The hard disk 14 is provided with a font-data storage area 14a for storing outline-font data in correlation with character codes, and a disk-cache storage area (hereinafter referred to simply as a disk cache) 14b for storing character-image data transferred thereto owing to overflow from the RAM cache.

Figure 1:
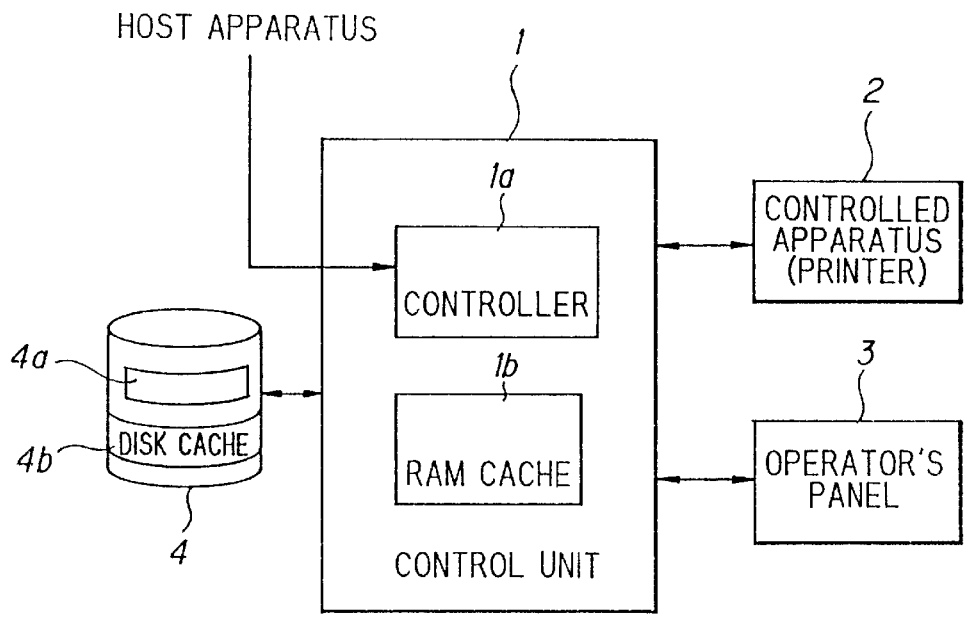
FIG. 1 is a block diagram for describing cache memory control according to the prior art.
Figure 2:
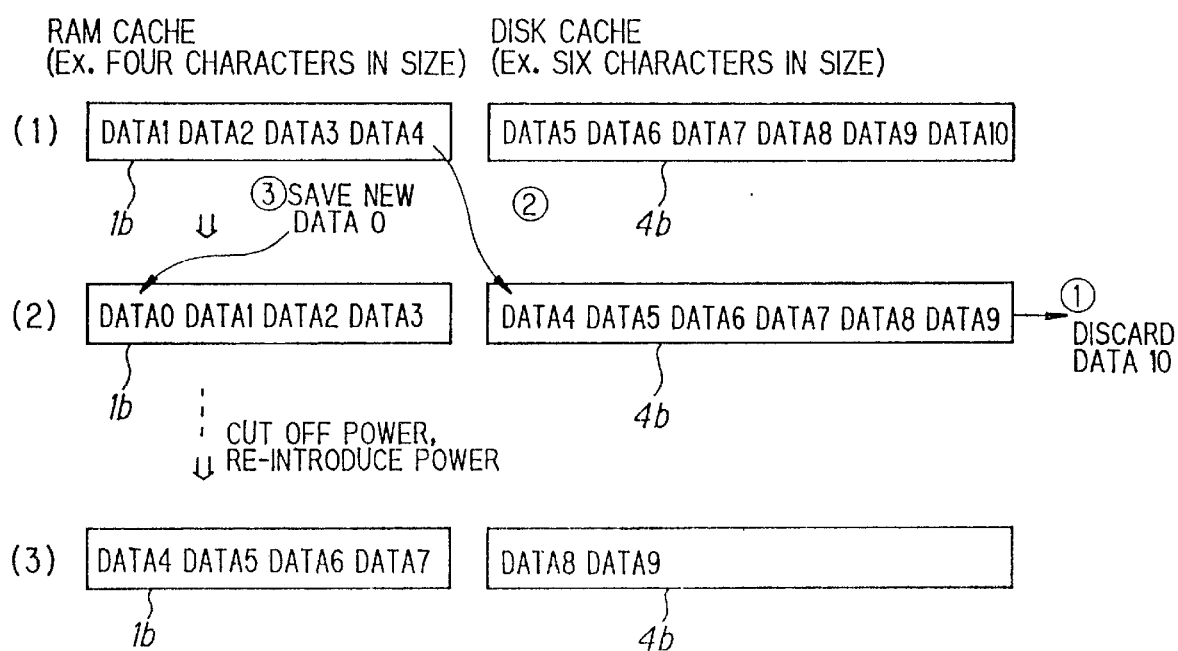
FIG. 2 is a diagram for describing cache memory control according to the prior art.
Figure 3:
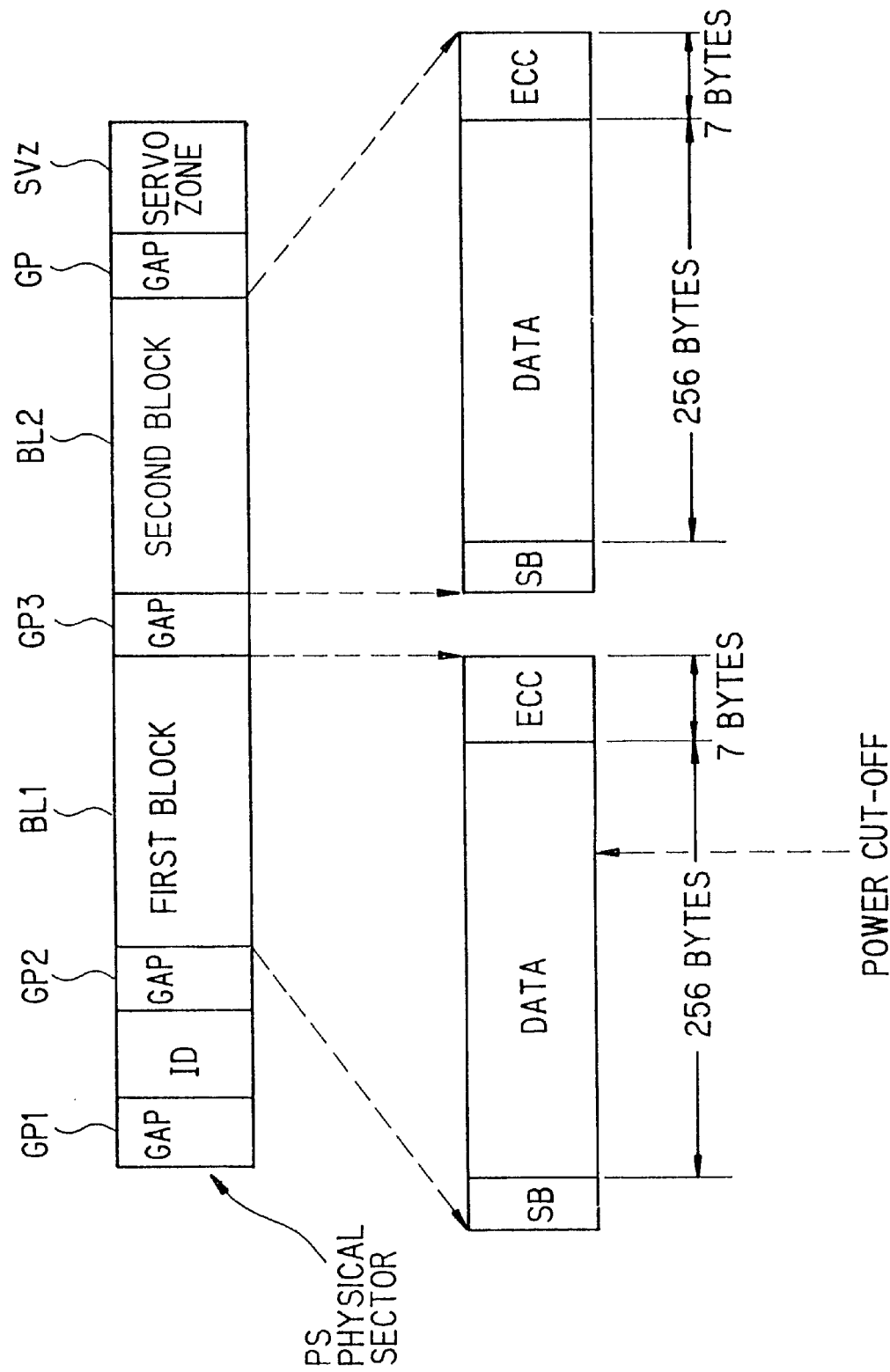
FIG. 3 is a diagram for describing a physical sector of a hard disk.
Figure 4:
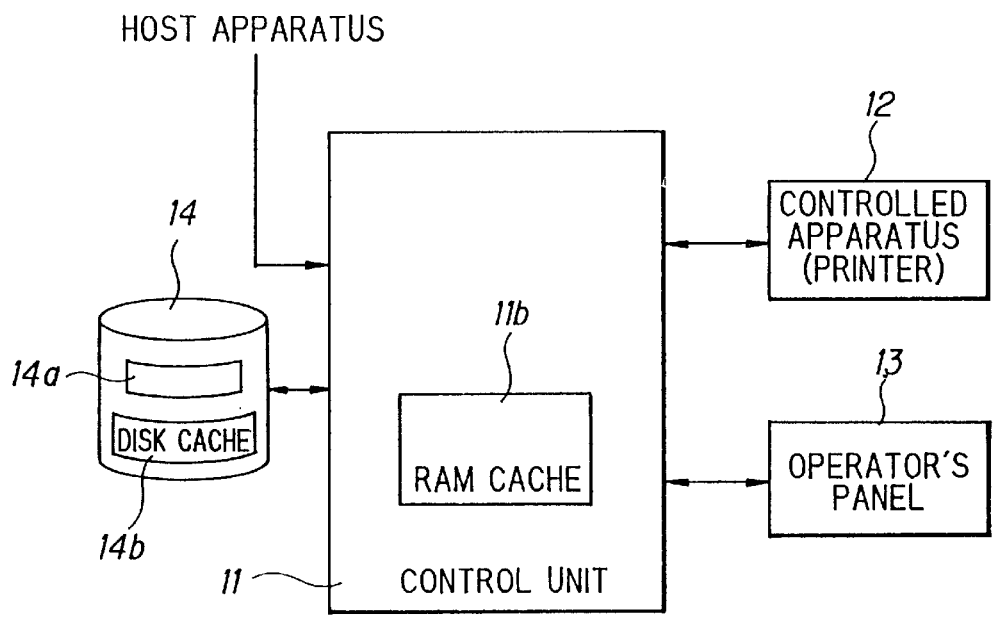
FIGS. 4a–4b are a diagram illustrating a first embodiment of the present invention.
Figure 4:
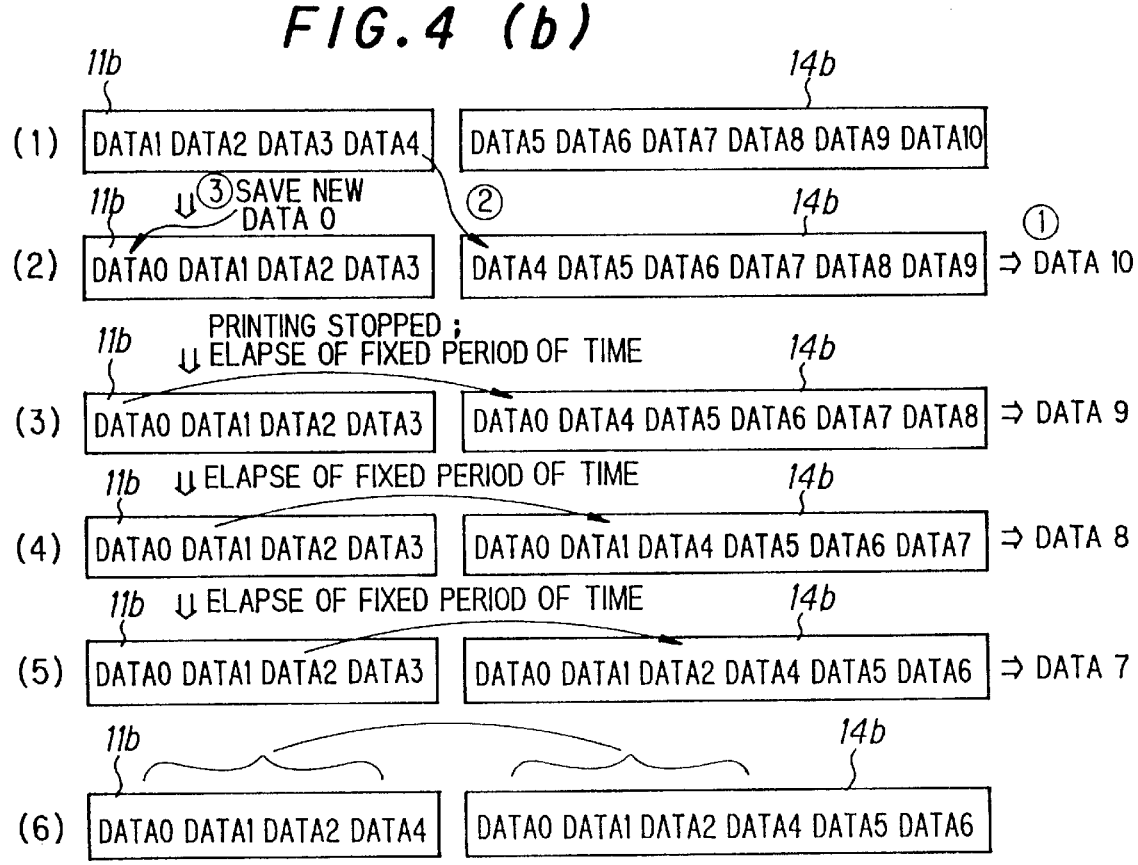

If the RAM cache 11b is not full when new data (character-image data) not present in the RAM cache 11b or disk cache 14b is created, the control unit 11 saves the new data in the RAM cache 11b. If the RAM cache 11b is full, the control unit 11 transfers part of the character-image data (a portion equivalent to one character, for example) to the disk cache 14b, thereby saving this data and producing space in the RAM cache 14a, and then saves the new data in the RAM cache 14a. If the RAM cache 14a and disk cache 14b are both full, then, as illustrated at (1) in FIG. 4(b), first ① the control unit 11 discards the character-image data (data 10) having the lowest order of priority from the disk cache 14b to make space equivalent to one character, then ② the control unit 11 transfers the character-image data (data 4) having the lowest order of priority from the RAM cache 11b to the disk cache 14b in order save this data (with the highest order of priority being assigned thereto), and finally ③ the control unit 11 saves the new character-image data (data 0) in the RAM cache 11b and assigns the highest order of priority thereto. Thus, character-image data (data 0~data 9) is saved in the cache memories as shown at (2) in FIG. 4(b).

This is followed by performing the cache control described above. When not in the printing mode, the control unit 11 transfers the items of data (character-image data) in the RAM cache 11b not saved in the disk cache 14b from the RAM cache to the disk cache at fixed intervals in the order of priority, thereby saving these items of data in the disk cache 14b, as shown at (3), (4) and (5) in FIG. 4(b). In this case, if the disk cache 14b is full, the control unit 11 discards the data (data 9) having the lowest order of priority to produce space in the disk cache and then transfers the data having the highest order of priority from the RAM cache 11b to the disk cache 14b to save this data in the RAM cache, as shown at (3) in FIG. 4(b). Thereafter, and in similar fashion, the control unit 11 transfers the data (character-image data) of the RAM cache 11b not saved in the disk cache 14b from the RAM cache to the disk cache in the order of priority, thereby saving this data in the disk cache 14b [(see (4) and (5) in FIG. 4(b)].

If the power supply is cut off when the state (5) is in effect, the data that has been stored in the RAM cache 11b vanishes. When power is re-introduced, the control unit 11 transfers the high-priority character-image data saved in the disk cache 14b from the disk cache to the RAM cache 11b. As a result, all of the high-priority data with the exception of data 3 which had been saved in the RAM cache 11b at the cut-off of power is restored in the RAM cache 11b, as illustrated at (6) in FIG. 4(b), after which the above-described cache control operation is performed. It should be noted that when the power supply is cut off and then re-introduced after all of the data in the RAM cache has been transferred to and saved in the disk cache, all of the data of the RAM cache is recovered.

Thus, data newly saved in the RAM cache is saved also in the disk cache and is restored in the RAM cache when power is introduced. Consequently, loss of the data that has been stored in the RAM cache can be held to the minimum and the hit rate (the probability that data will be found in the RAM cache) at the time of actual operation can be improved. In the case of a printer, printing can be performed at high speed.

Further, since the control unit transfers the RAM-cache data, inclusive of new data, which has not been saved in the disk cache from the RAM cache to the disk cache to save this data in the disk cache when the primary control operation is not being performed, the primary operation, such as a printing operation, is in no way affected. This means that there is no decline in printing speed ascribable to cache control.

Furthermore, since the transfer of data from the RAM cache to the disk cache is executed at fixed intervals in prescribed data units when no operation is being performed (i.e., when printing is not being carried out), the time devoted to a single cache control cycle is shortened. This means that even if the primary operation starts while cache control is being performed, cache control will end in a short period of time and, hence, primary control (printing control) can start promptly.

The data saved in the RAM cache is assigned an order of priority in accordance with a predetermined rule, and data is transferred to and saved in the disk cache starting from the high-priority data. As a result, high-priority data can be recovered and loss of this data can be minimized, thereby raising the hit ratio.

(b) Overall Configuration

Figure 5:
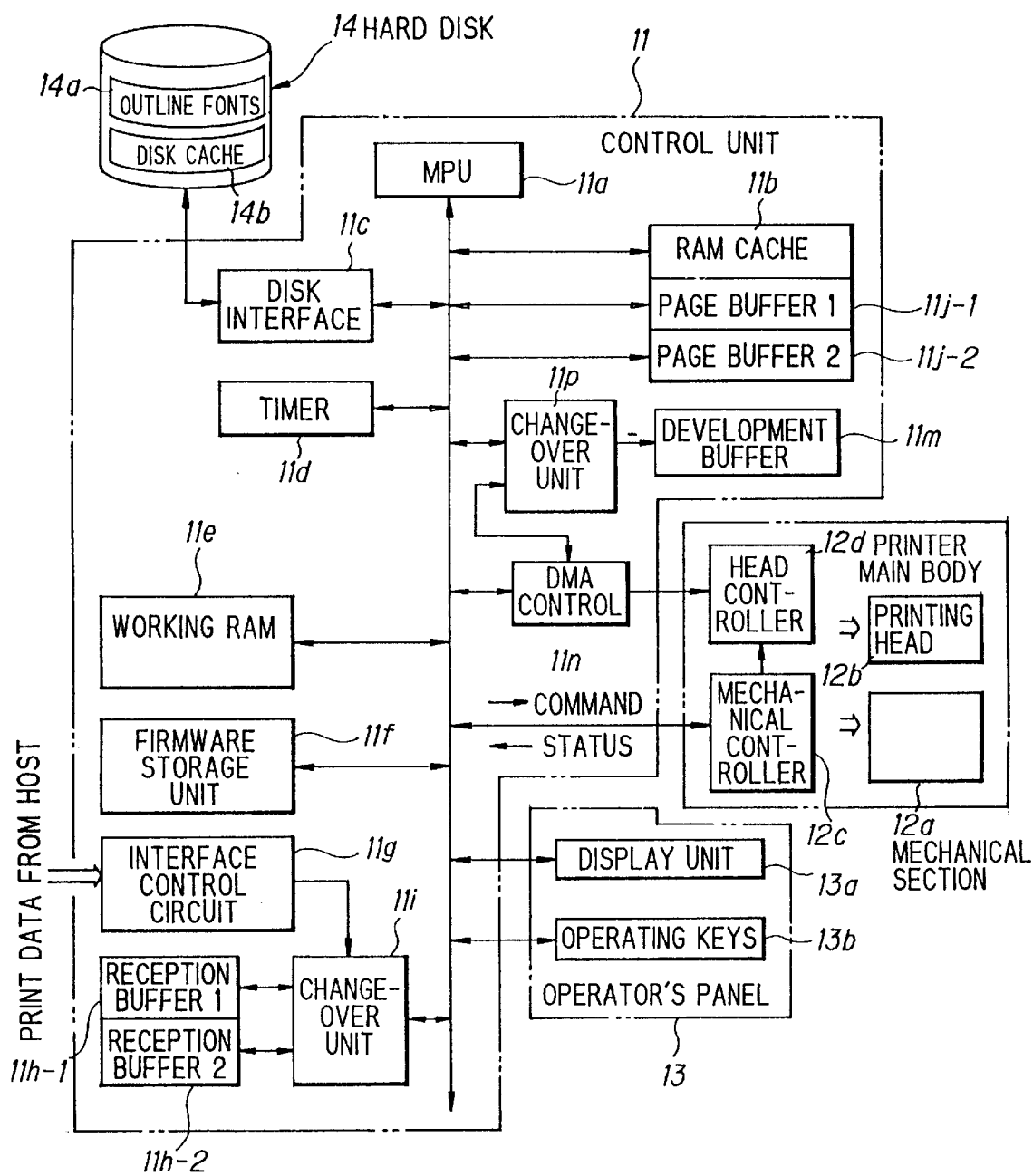
FIG. 5 is an overall block diagram illustrating the first embodiment of the present invention.

FIG. 5 is a block diagram of this embodiment of the present invention. This is for a case in which the cache memory control method of the invention is applied to a printer.

The control unit 11, which is constituted by a microcomputer, is a printer controller for controlling the entirety of a printer, by way of example. The printer main body 12 has a mechanical section 12a such as a paper-feed motor, a printer head 12b, a mechanical controller 12c and a head controller (head controller+head driver) 12d. The operator's panel 13 has a display unit 13a and various operating keys 13b. The hard disk 14 is provided with the font-data storage area 14a for storing outline-font data in correlation with character codes, and a disk-cache storage area (hereinafter referred to simply as a disk cache) 14b for storing character-image data transferred thereto owing to overflow from the RAM cache.

(c) Control Unit

The control unit 11 includes a microcomputer (MPU) 11a, the RAM (hereinafter referred to as a RAM cache) 11b for storing character-image data once the data has been created, a disk interface (SCSI controller) 11c for supervising exchange of data with the hard disk, a timer 11d, a working RAM lie, a storage unit 11f for storing firmware, and an interface control circuit 11g, which has a DMA control function, for supervising exchange of data with the host. Also included are first and second reception buffers 11h-1, 11h-2, respectively, for storing data sent from the host apparatus alternately one line at a time by DMA control, a changeover unit 11i for changing over the reception buffers 11h-1, 11j-2 between the interface controller 11g and the MPU 11a, first and second page buffers 11j-1, 11j-2 for storing one page of character-image data alternately, a development buffer (line buffer) 11m for storing one line of character-image data transferred thereto from the page buffer, a DMA controller 11n for reading the character-image data out of the development buffer 11m successively, applying this data to the head controller 12d and causing the latter to print the data, and a changeover unit 11p for placing the development buffer under the control of the MPU 11a or of the DMA controller 11n.

(d) Printing Control

The data from the host apparatus is stored successively in the second reception buffer 11h-2 by DMA control of the interface circuit 11g and, at the same time, the MPU 11a reads the data out of the first reception buffer 11h-1 (in which one line of character data has already been stored), analyzes this data, searches the RAM cache 11b if the data is a character code, searches the disk cache 14b if the data is not a character code and develops and stores character-image data, which has been retrieved by the search, in the second page buffer 11j-2. It should be noted that one page of character-image data has already been stored in the first page buffer 11j-1 and, as will be described below, has already been used in printing. If the data cannot be found in either of the caches, character-image data is generated anew using outline-font data that has been stored in the outline-font data storage area 14a, this data is developed and stored in the second page buffer 11j-2 and the newly created character-image data is saved in the RAM cache 11b.

Thenceforth, and in similar fashion, the control unit 11 performs control for storing data in the second reception buffer 11h-2 and control for analyzing the data that has been stored in the first reception buffer 11h-1 (e.g., control for developing the data in the page buffer). If storage of one line of data and development of data in the page buffer 11j-2 end, the first reception buffer 11h-1 is changed over to data reception, the next line of data is stored in the buffer 11h-1 and data is read successively out of second reception buffer 11h-2. If the data is a character code, then character-image data is generated and developed in the second page buffer 11j-2. Thereafter, and in similar fashion, the first and second reception buffers are changed over alternately between reception and data development line by line.

In concurrence with the foregoing operation, the MPU 11a transfers one page of character-image data, which has already been stored in the first page buffer 11j-1, to the development buffer 11m line by line, and the DMA controller 11n reads the character-image data out of the buffer 11m and inputs the data to the head controller 12d in successive fashion. The head driver drives printing pins based upon the character-image data and transports the printing head in the horizontal direction to print one line of characters on recording paper. This is followed by feeding the recording paper by one line, transferring the next line of character-image data to the development buffer 11m, performing printing and then repeating this operation to print one page.

When the development of one page of character-image data in the second buffer 11j-2 and the printing of one page of character-image data in the first page buffer 11j-1 are completed, the first page buffer 11j-1 is changed over to use for development, the second page buffer 11j-2 is changed over to use for printing and control similar to that described above is repeated. Thenceforth, and in similar fashion, the first and second page buffers are changed over successively to use for development and use for printing, whereby printing is carried out.

(e) Cache Memory Control (e-1) Cache Memory Control During Printing

The MPU 11a creates character-image data from a character code, develops the data in the buffers 11j-1, 11j-2 and performs cache memory control.

More specifically, if character-image data corresponding to a character code is present in the RAM cache 11b, this character-image data is developed in the page buffer. In addition, the order of priority of this character-image data in the RAM cache is made the highest in accordance with an LRU algorithm, and the orders of priority of the other character-image data are updated.

If character-image data corresponding to the character code is not found in the RAM cache 11b but is present in the disk cache 14b, this character-image data is developed in the page buffer and saved in the RAM cache 11b. The order of priority of this character-image data in the RAM cache is made the highest in accordance with the LRU algorithm and the orders of priority of the other character-image data is lowered by one rank. The above-mentioned character-image data is deleted from the disk cache 14b and the order of priority of the other character-image data is updated in accordance with the LRU algorithm.

If character-image data corresponding to the character code is not found in either the RAM cache 11b or the disk cache 14b, character-image data is generated using outline-font data, this data is developed in the page buffer and this new character-image data is stored in the RAM cache 11b. In this case, if the RAM cache 11b is not full, the data is saved in the RAM cache, the order of priority of this character-image data in the RAM cache is made the highest and the orders of priority of the other character-image data are updated. If the RAM cache 11b is full, on the other hand, some of the character-image data (e.g., character-image data equivalent to one character) is transferred to and saved in the disk cache 14b, thereby making space in the RAM cache 11b, after which the new character-image data is saved in the RAM cache. If both the RAM cache 11b and disk cache 14b are full, first the character-image data having the lowest order of priority is discarded from the disk cache 11b to make space equivalent to one character, after which character-image data having the lowest order of priority is transferred from the RAM cache 11b to the disk cache 14b and saved there (the highest order of priority is assigned to this data). The new character-image data is then saved in the RAM cache 11b and has the highest order of priority assigned thereto.

Figure 6:
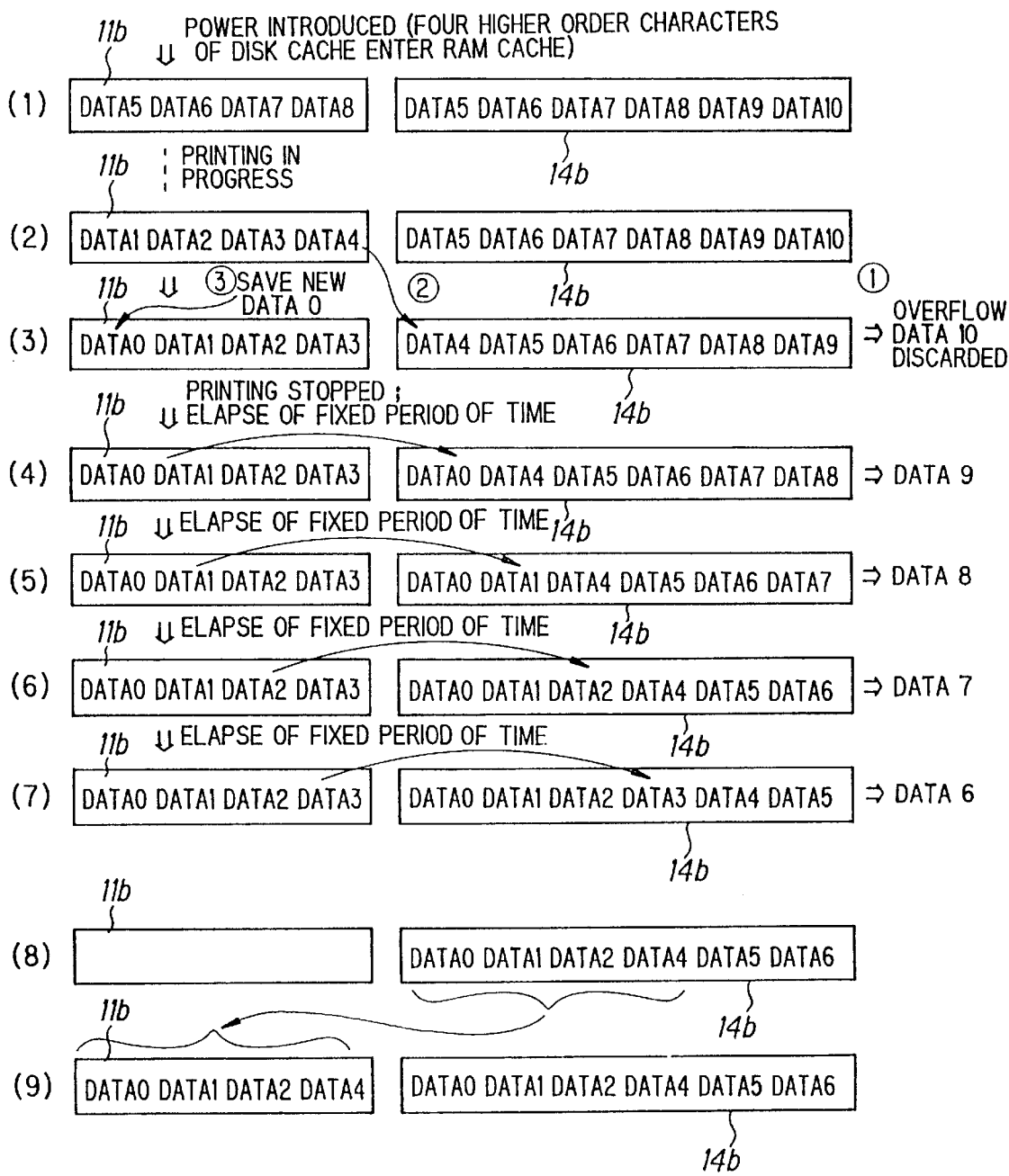
FIG. 6 is a diagram for describing cache memory control.

FIG. 6 is a diagram for describing cache memory control of the invention in a case where, for the sake of simplifying the description, a maximum of four items of character-image data and a maximum of six items of character-image data are capable of being stored in the RAM cache 11b and disk cache 14b, respectively, with the order of priority of the data ascending from right to left.

When power is introduced, high-priority character-image data that has been saved in the disk cache 14b is transferred to and saved in the RAM cache 11b. As a result, after power is introduced, the character-image data in the RAM cache 11b and disk cache 14b partially overlap [see (1) in FIG. 6]. Thereafter, when printing control starts, the content of the RAM cache 11b is updated by the above-described cache memory control, as a result of which the content of the RAM cache 11b becomes as shown at (2) in FIG. 6.

When new character-image data (data 0) is created under these conditions, first ① the character-image data (data 10) having the lowest order of priority is discarded from the disk cache 14b to make space equivalent to one character, then ② the character-image data (data 4) having the lowest order of priority is transferred from the RAM cache 11b to the disk cache 14b in order to be saved (with the highest order of priority being assigned thereto), and finally ③ the new character-image data (data 0) is saved in the RAM cache 11b and has the highest order of priority assigned there to. Thus, character-image data (data 0–data 9) is saved in the cache memories as shown at (3) in FIG. 6. During subsequent printing, the cache memory control described above is performed.

(e-2) Cache Memory Control When Printing is Not in effect.

When the control unit 11 operates in the non-printing mode, the MPU 11a transfers, in the prescribed data units, the character-image data in the RAM cache 11b not saved in the disk cache 14b from the RAM cache 11b to the disk cache 14b at fixed intervals in the order of priority, thereby saving this data in the disk cache 14b, as shown at (4) in FIG. 6. This data is assigned the highest order of priority. Each time an item of character-image data is transferred to the disk cache 14b, it is assigned the highest order of priority. In this case, if the disk cache 14b is full, the MPU 11a discards the data (data 9) having the lowest order of priority to produce space in the disk cache 14b and then transfers the data having the highest order of priority from the RAM cache 11b to the disk cache 14b to save this data in the RAM cache. Thereafter, and in similar fashion, the MPU 11a transfers the data (character-image data) of the RAM cache 11b not saved in the disk cache 14b from the RAM cache to the disk cache in the order of priority, thereby saving this data in the disk cache 14b [see (5), (6) and (7) in FIG. 4(b)].

If the power supply is cut off when, say, the state (6) is in effect, the content of the RAM cache 11b is lost and only the content of the disk cache 14b is preserved, as illustrated at (8) in FIG. 6. When power is re-introduced in this state, the control unit transfers the high-priority character-image data (data 0, 1, 2, 4) saved in the disk cache 14b from the disk cache 14b to the RAM cache 11b. As a result, all of the high-priority data with the exception of data 3 which had been saved in the RAM cache 11b at the cut-off of power is restored to the RAM cache 11b, after which the above-described cache control operation is performed. It should be noted that when the power supply is cut off and then re-introduced after all of the data in the RAM cache has been transferred to and saved in the disk cache, all of the data of the RAM cache is recovered.

(f) Details of Cache Memory Control

The details of cache memory control will now be described in accordance with the flowcharts of FIGS. 7 through 16.

(f-1) Flow of Overall Processing of Control Unit

Figure 7:
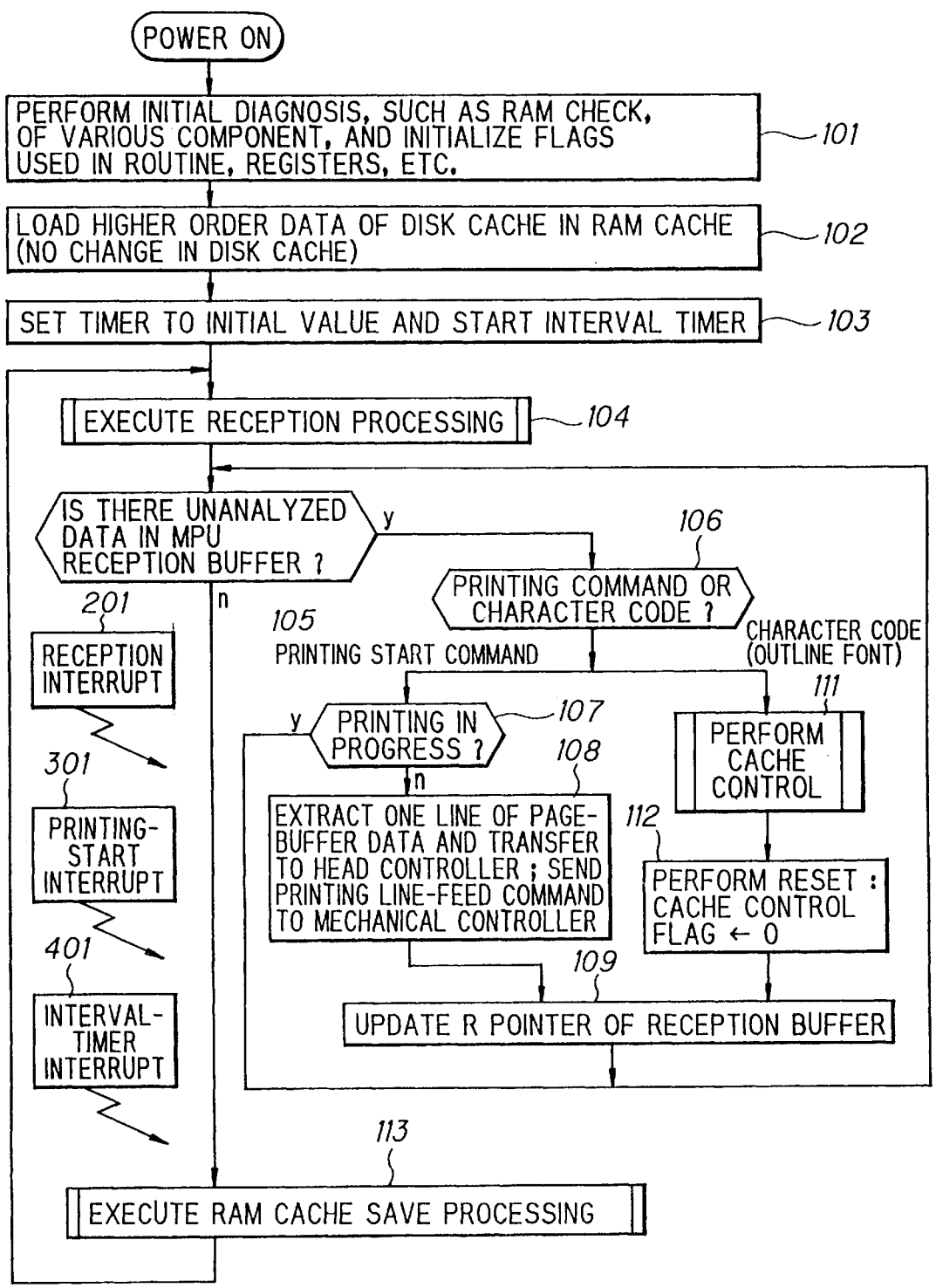
FIG. 7 is a flowchart of overall processing.

FIG. 7 is a flowchart of overall processing of the control unit.

When power is introduced, initial diagnosis of various components is performed, such as a RAM check, and flags, registers and the like used in each routine are initialized (step 101).

Next, data (character-image data) having a higher order of priority saved in the disk cache 14b is loaded in the RAM cache 14b (step 102). The content of the disk cache is not updated.

Figure 8:
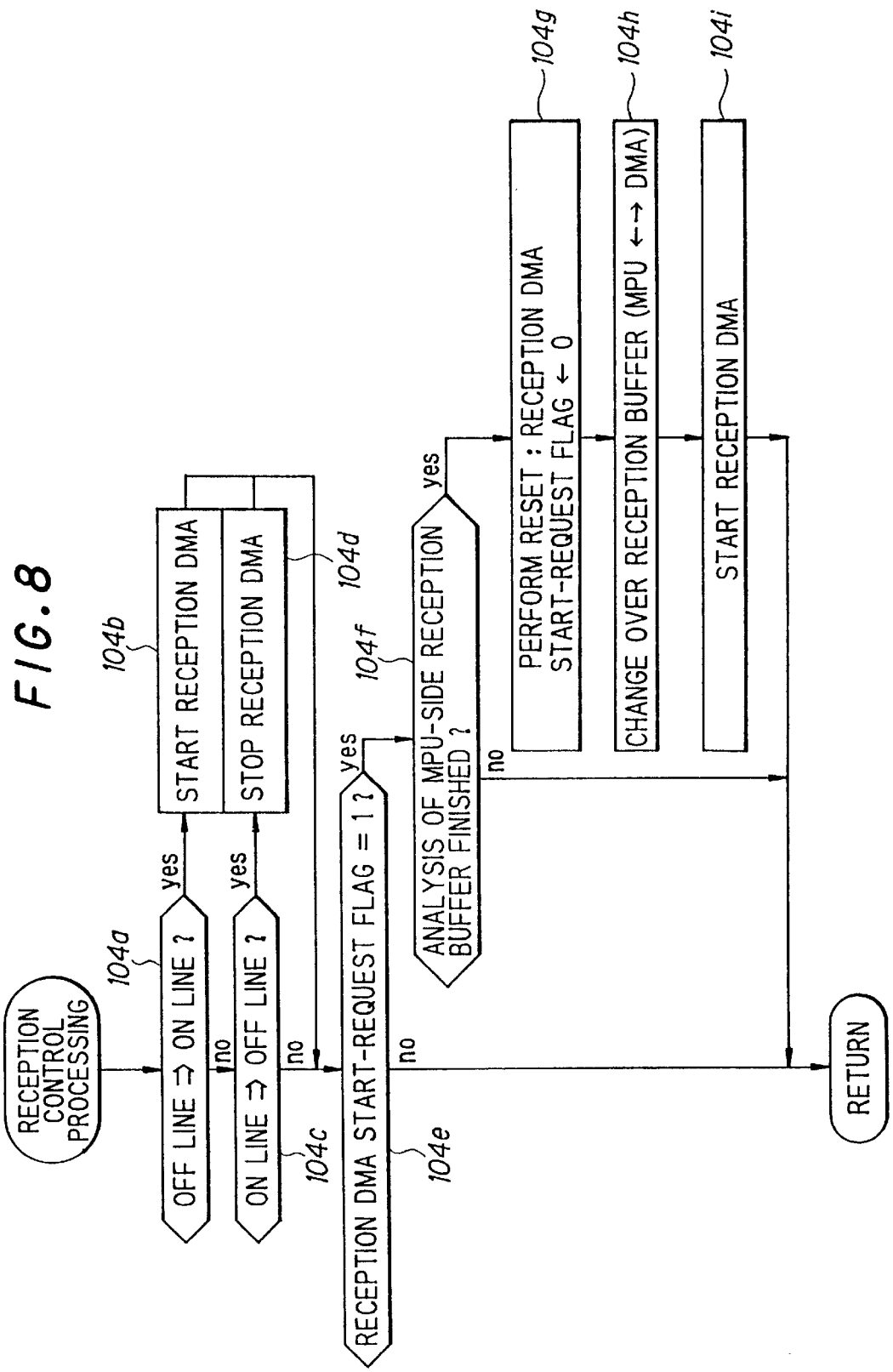
FIG. 8 is a flowchart of reception processing.

Following loading the timer 11d is set to an initial value and an interval timer is started (step 103). The reception processing shown in FIG. 8 is then executed (step 104).

In reception processing, first it is determined whether an on-line/off-line switch on the operator's panel 13 has been changed over from the off-line to the on-line position (step 104a). If changeover from off-line to on-line has been performed, the interface control circuit 11g is caused to start reception DMA (step 104b).

If the changeover from off-line to on-line has not been made, then it is determined whether a changeover from on-line to off-line has been made (step 104c). If this changeover has been made, the interface control circuit 11g is caused to stop reception DMA (step 104d).

Next, a check is made to see whether a reception-DMA start-request flag is at logical "1" (step 104e). This flag initially is "0", as will be described below.

When a reception interrupt is applied (201), the reception-DMA start-request flag is made logical "1" if the MPU 11a is reading character data out of a reception buffer for development (a reception buffer on the MPU side) and analyzing this data. The interface control circuit 11g monitors the reception data from the host apparatus and generates the reception interrupt (201), which is applied to the MPU 11a, when ① a character-data string+a line-feed command (LF) or ② a character-data string+a page-print start command (FF) is received.

If the reception-DMA start-request flag is logical "0", the program departs reception processing (104). If the reception-DMA start-request flag is logical "1", however, it is determined (step 104f) whether all of the data in the reception buffer on the side of the MPU has been analyzed (i.e., if the data is a character code, it is determined whether the code has been developed into character-image data and the analysis thereof completed). If analysis has been concluded, the program returns from reception processing (104).

If analysis has not ended, on the other hand, the reception-DMA start-request flag is returned to logical "0" (step 104g) and then the functions of the reception buffers 11h-1, 11h-2 (for reception and for development) are changed over (step 104h). That is, the buffer for DMA reception is changed over to the reception buffer for development (the reception buffer on the MPU side) and the reception buffer on the MPU side is changed over to the buffer for DMA reception. This is followed by starting reception DMA (step 104i) and departing from the reception control processing (104).

If reception processing has ended, it is determined whether data not yet analyzed is present in the reception buffer on the side of the MPU (step 105). If such data it present, there a check is performed to see whether data indicated by a read pointer (R pointer) in the reception buffer on the MPU side is a printing-start command or a character code (step 106). If the data is a printing-start command, then it is determined whether a printing operation is being performed (step 107). If printing is in progress, the program returns to step 105. If printing is not in progress, one line of data (character-image data ) is cut from the page buffer for printing, this data is transferred to the head controller 12d via the development buffer 11m, one line of printing is executed and then the printing line-feed command is sent to the mechanical controller 12c (step 108). Next, the R pointer of the reception buffer on the MPU side is incremented (step 109), after which the program returns to step 105.

If the data indicated by the R pointer at step 106 is a character code, the n the processing of "cache memory control during" described in section (d) above, is executed by a cache-memory control routine, described below. More specifically, character-image data corresponding to a character code is searched for in each cache memory. If the data is not found, then the data is created from outline-font data and the created new character-image data is saved in each cache (step 111). Thereafter, a cache control flag is reset to "0" (step 112), the R pointer of the reception buffer on the MPU side is incremented (step 109) and the program returns to step 105.

If it is determined at step 105 that there is no unanalyzed data in the reception buffer on the MPU side, this is regarded as indicating that the printing mode is not in effect and "RAM-cache save processing in non-printing state", which is the processing indicated at (4) through (7) in FIG. 6, is executed (step 113) by a RAM-cache save processing routine, described below, after which the program returns to step 104. Processing repeated from this step onward.

(f-2) Interrupt Processing

Interrupt processing includes reception-interrupt processing 201, a printing-start interrupt 301 and an interval-timer interrupt 401.

Reception interrupt

Figure 9:
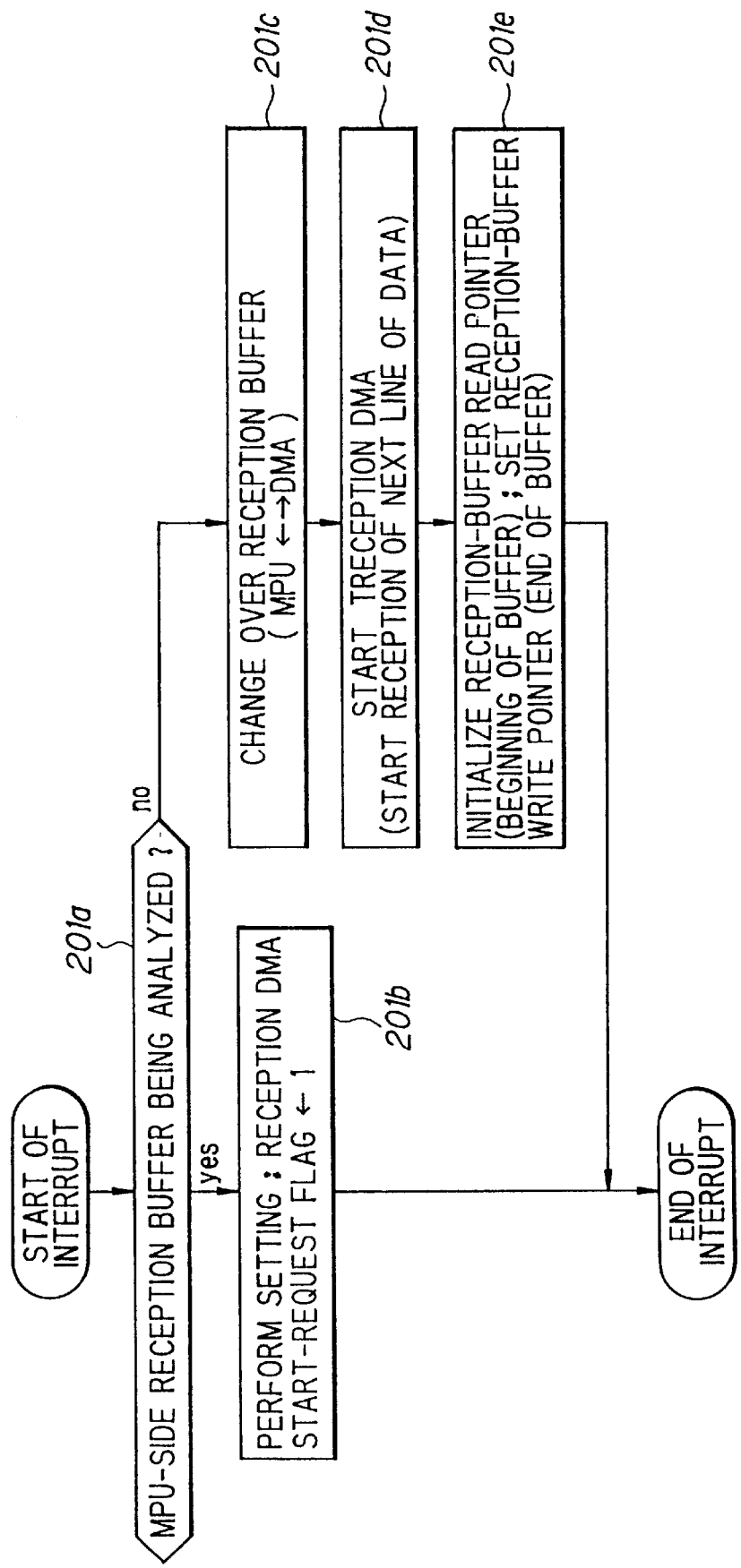
FIG. 9 is a flowchart of reception-interrupt processing.

FIG. 9 is a flowchart illustrating reception-interrupt processing.

The interface control circuit 11g generates the reception interrupt, which is applied to the MPU 11a, when ① a character-data string+a line-feed command (LF) or ② a character-data string+a page-print start command (FF) is received from the host.

When the reception interrupt is generated, it is determined whether data is being read out of the reception buffer 11h-1 or 11h-2 on the MPU side and is under analysis. For example, it is determined whether the data is being developed into character-image data (step 201a). If the data is being analyzed, the reception-DMA start-request flag is made logical "1" (step 201b) and interrupt processing is terminated. DMA reception of the next line is deferred until the analysis of all data in the reception buffer on the MPU side ends. When analysis ends, a "YES" decision is rendered at step 104f, the reception buffer is changed over and DMA reception begins.

If all of the data in the reception buffer on the MPU side has already been analyzed when the reception interrupt is generated, the reception buffer is changed over immediately. That is, the buffer for DMA reception is changed over to the reception buffer on the MPU side and the reception buffer on the MPU side is changed over to the buffer for DMA reception (step 201c). Thereafter, reception DMA is started (step 201d), the R pointer of the reception buffer on the MPU side is initialized and the write pointer of the reception buffer on the DMA side is set (step 201e). Reception-interrupt processing is then terminated.

Printing-start interrupt

Figure 10:
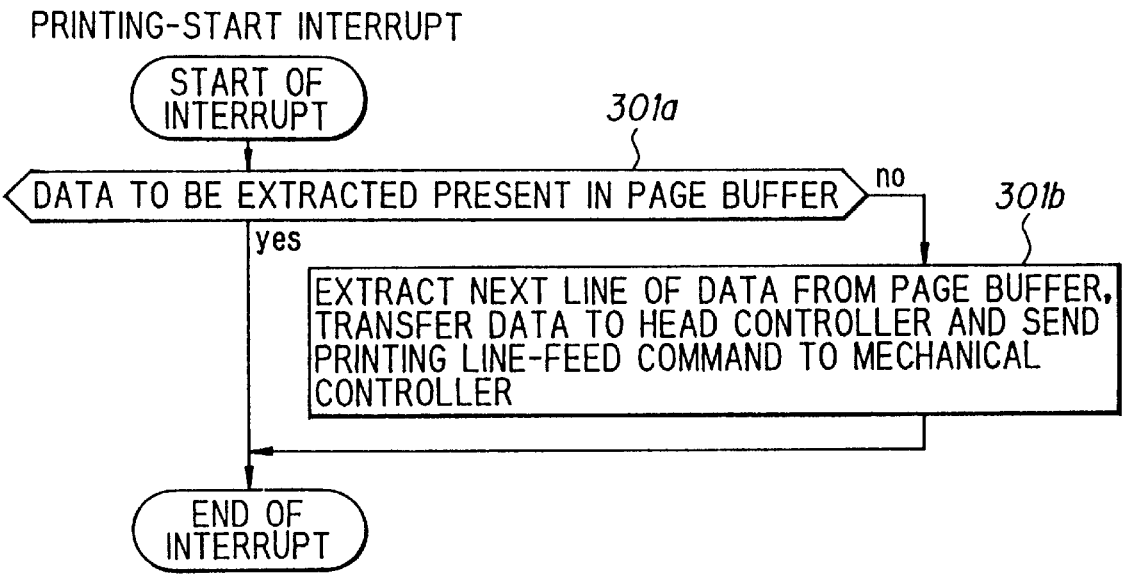
FIG. 10 is a flowchart of printing-start interrupt processing.

FIG. 10 is a flowchart illustrating printing-start interrupt processing.

When the MPU 11a issues a command such as a printing line-feed command to the mechanical controller 12c in order to print the next line, the mechanical controller 12c sends back the status as a response at the end of this processing (the end of one line of paper feed, etc.). Notification of the status response serves as the printing-start interrupt of the MPU 11a.

When the printing-start interrupt is generated, it is determined whether character-image data to be extracted is present in the page buffer for printing (step 301a). If the data is absent, interrupt processing is terminated.

However, if the character-image data to be extracted is present in the page buffer for printing, the next line of data (character-image data) is cut from he page buffer for printing, this data is transferred to the head controller 12d via the development buffer 11m, one line of printing is executed and then the printing line-feed command is sent to the mechanical controller 12c (step 301b). Printing-start interrupt processing is then terminated.

Interval-time interrupt

Figure 11:
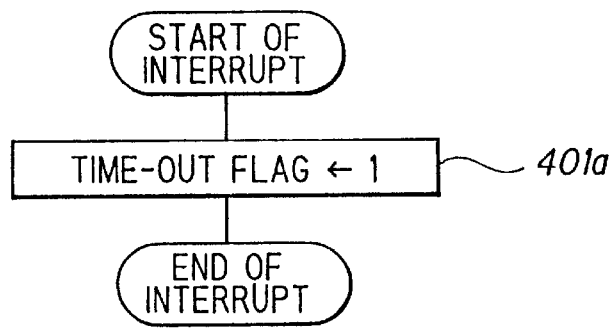
FIG. 11 is a flowchart of interval-timer interrupt processing.

FIG. 11 is a flowchart illustrating interval-timer interrupt processing.

The interval-timer interrupt, which involves setting a time-out flag that decides whether RAM-cache save processing is to be executed or not, is generated by the timer 11d at fixed time intervals. When the timer interrupt is generated, the time-out flag is made logical "1" (step 401a) and interrupt processing is terminated.

(f-3) Cache Memory Control During Printing

Figure 12:
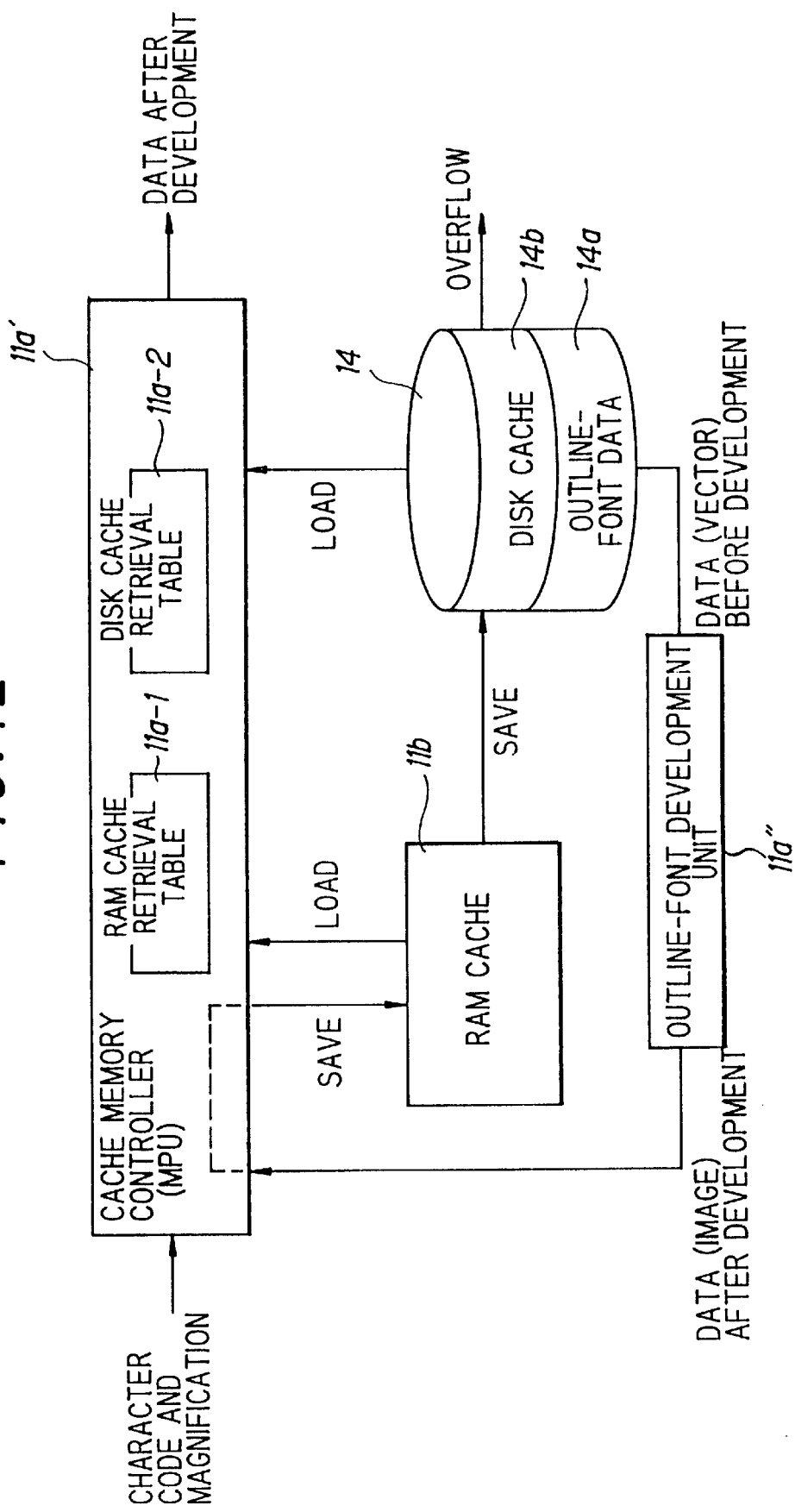
FIG. 12 is a block diagram of a portion relating to cache memory control.
Figure 13:
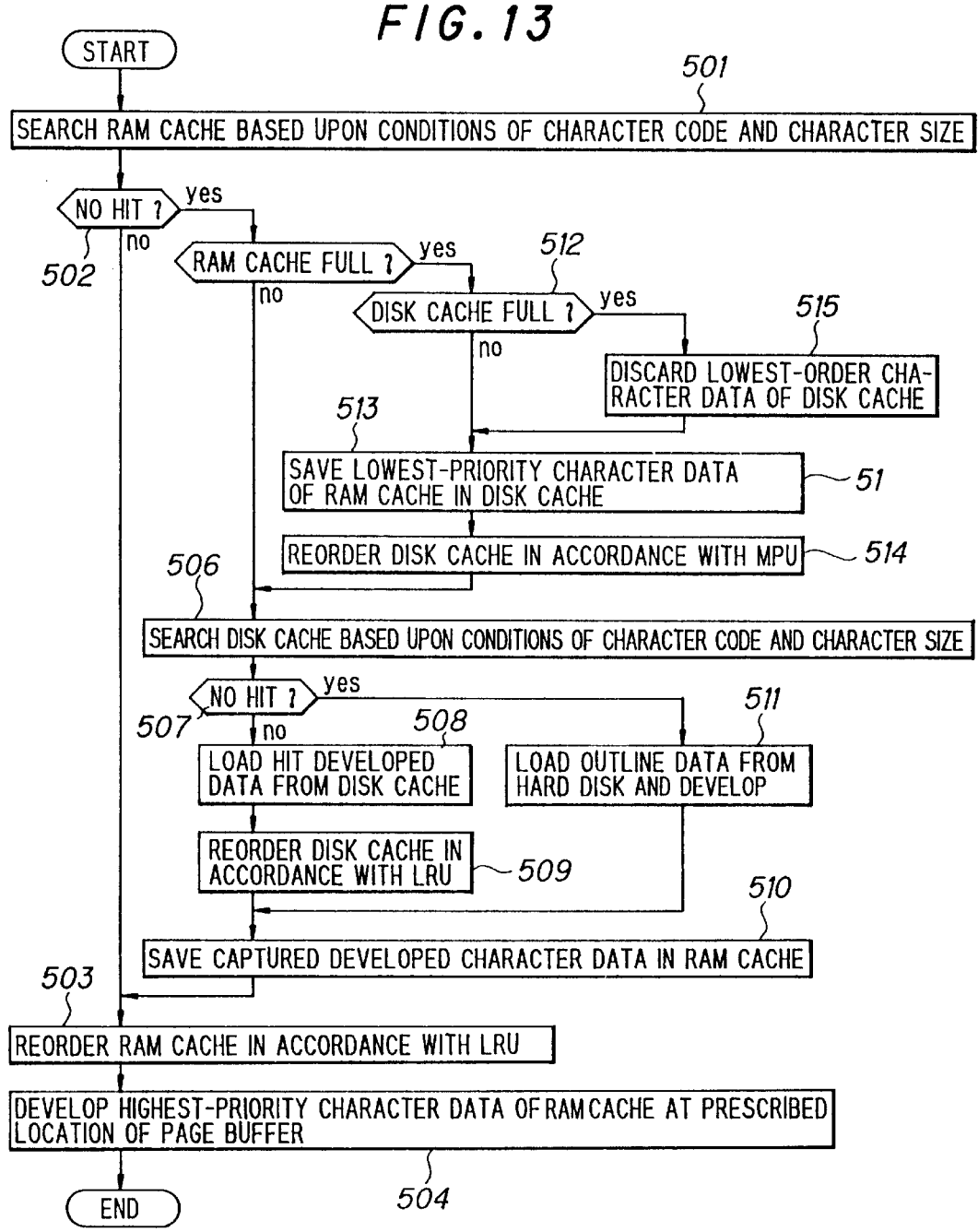
FIG. 13 is a flowchart of processing for cache memory control.

FIG. 12 is a block diagram of components related to cache memory control, and FIG. 13 is a flowchart illustrating cache-memory control processing during printing. It will be assumed that the host designates character size together with a character code. The character size is commanded only when the size is to be changed.

In FIG. 12, numeral 11a' denotes a cache memory controller for searching cache memory, executing processing in order to save character-image data in cache memory and processing for loading character-image data from cache memory. Numeral 11a'' denotes an outline-font development unit for developing outline-font data and generating character-image data. The cache memory controller 11a' and outline-font data development unit 11a'' are realized by dividing the function of the MPU 11a shown in FIG. 5. The RAM cache 11b is constituted by a RAM and saves character-image data. The hard disk 14 has the outline-font data storage area 14a for the storing outline-font data of each character codes, and the disk cache 14b for saving character-image data transferred thereto owing to overflow from the RAM cache 11b.

The cache memory controller 11a' has a RAM-cache retrieval table 11a-1 for storing the stored character codes of the RAM cache 11b, the magnifications thereof and the addresses of the RAM cache 11b, and a disk-cache retrieval table 11a-2 for storing the stored character codes of the disk cache 14b, the magnifications thereof and the addresses of the disk cache 14b.

Cache memory control at the time of printing will now be described in accordance with the flowchart of FIG. 13.

If data read out of the reception buffer (see 11h-1, 11h-2 in FIG. 5) on the MPU side is a character code, the cache memory controller 11a' searches the RAM-cache retrieval table 11a-1 in accordance with the conditions of the character code and character size rearranged in the order of use (step 503) in accordance with the LRU algorithm, after which the character-image data having the highest order of priority in the RAM cache 11b is developed in the page buffer for printing (step 504) and processing is terminated. If the data cannot be found in the RAM-cache retrieval table 11a-1, the RAM cache controller 11a' checks to see whether the RAM cache is full (step 505). If the RAM cache is not full, then the RAM-cache retrieval table 11a-2 is searched in accordance with the conditions of the character code and character size (steps 506, 507). If the character code and size are found, the character-image data representing the hit is loaded from the disk cache (step 508).

Next, the cache memory controller 11a' rearranges the order of priority in the RAM-cache retrieval table 11a-2 in the order of use (step 509) in accordance with the LRU algorithm and saves the captured character-image data in the RAM cache 11b (step 510). The processing from step 503 onward is then executed.

If the data cannot be found in the RAM-cache retrieval table 11a-2 at step 507, the cache memory controller 11a' reads the outline-font data corresponding to the character code out of the outline-font storage area 14a and this data is developed into character-image data by the outline-font development unit 11a' (step 511). The developed character-image data is saved in the RAM cache 11b (step 510), after which processing from step 503 onward is executed.

If the RAM cache 11b is found to be full at step 505, on the other hand, the cache memory controller 11a' refers to the disk-cache retrieval table 11a-2 to determine whether the disk cache 14b is full (step 512). If the disk cache 14b is not full, the cache memory controller 11a' transfers the character-image data having the lowest order of priority in the RAM cache 11b to the disk cache 14b to save this data in the disk cache and produce space in the RAM cache (step 513). Next, in accordance with the LRU algorithm, the cache memory controller 11a' rearranges the order of priority in the disk-cache retrieval table 11a-2 (step 514) and then performs the processing from step 506 onward.

If the disk cache 14b is found to be full at step 512, the controller 11a' discards the character-image data having the lowest order of priority from the disk cache to make space in the disk cache (step 515) and then performs processing from step 513 onward.

Thus, cache memory control during printing is performed through the operation described above. It should be noted that in case of a character code, no cache memory control whatsoever is executed through the cache memory control routine and, at step 112 (see FIG. 7), the cache control flag is reset to "0". In other words, the fact that the cache control flag is "0" means that there has been a change in the content of RAM cache 11b or disk cache 14b.

(f-4) RAM-Cache Save in Non-Printing State

Figure 14:
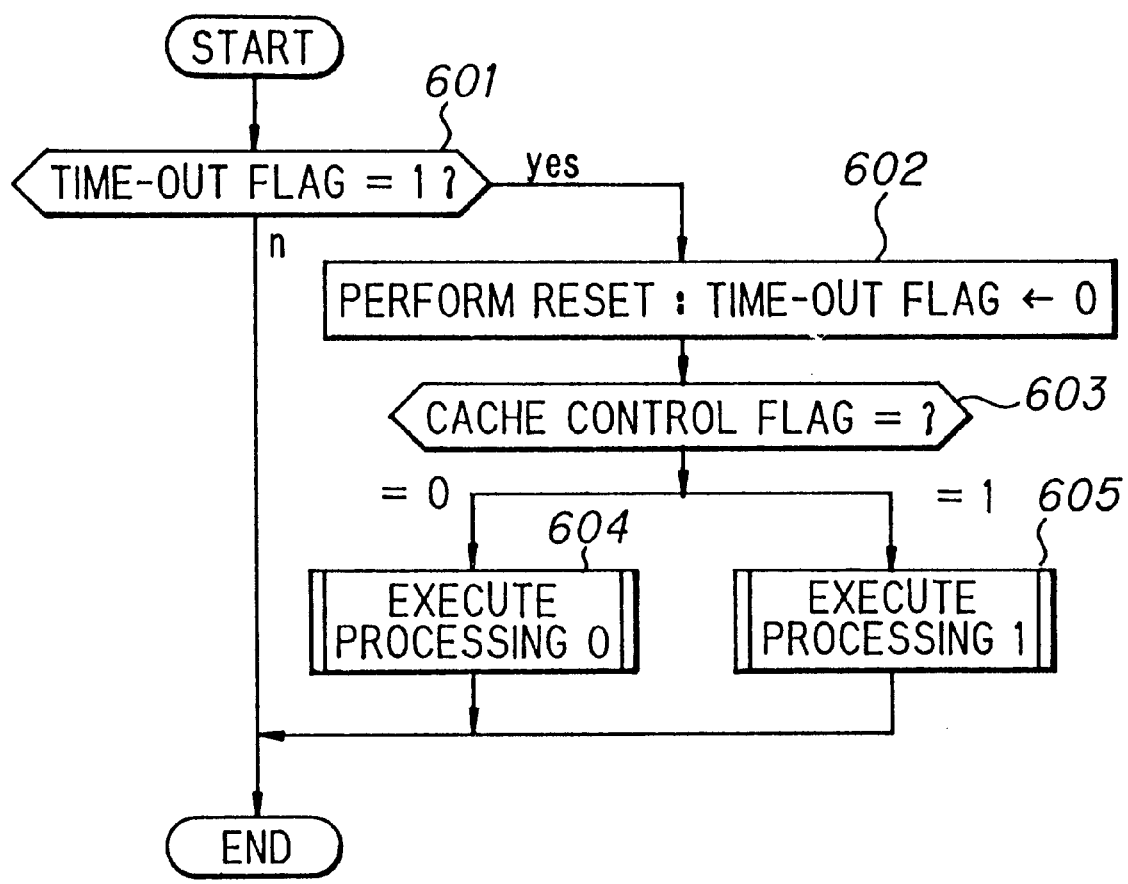
FIG. 14 is a first flowchart of RAM-cache save processing.
Figure 15:
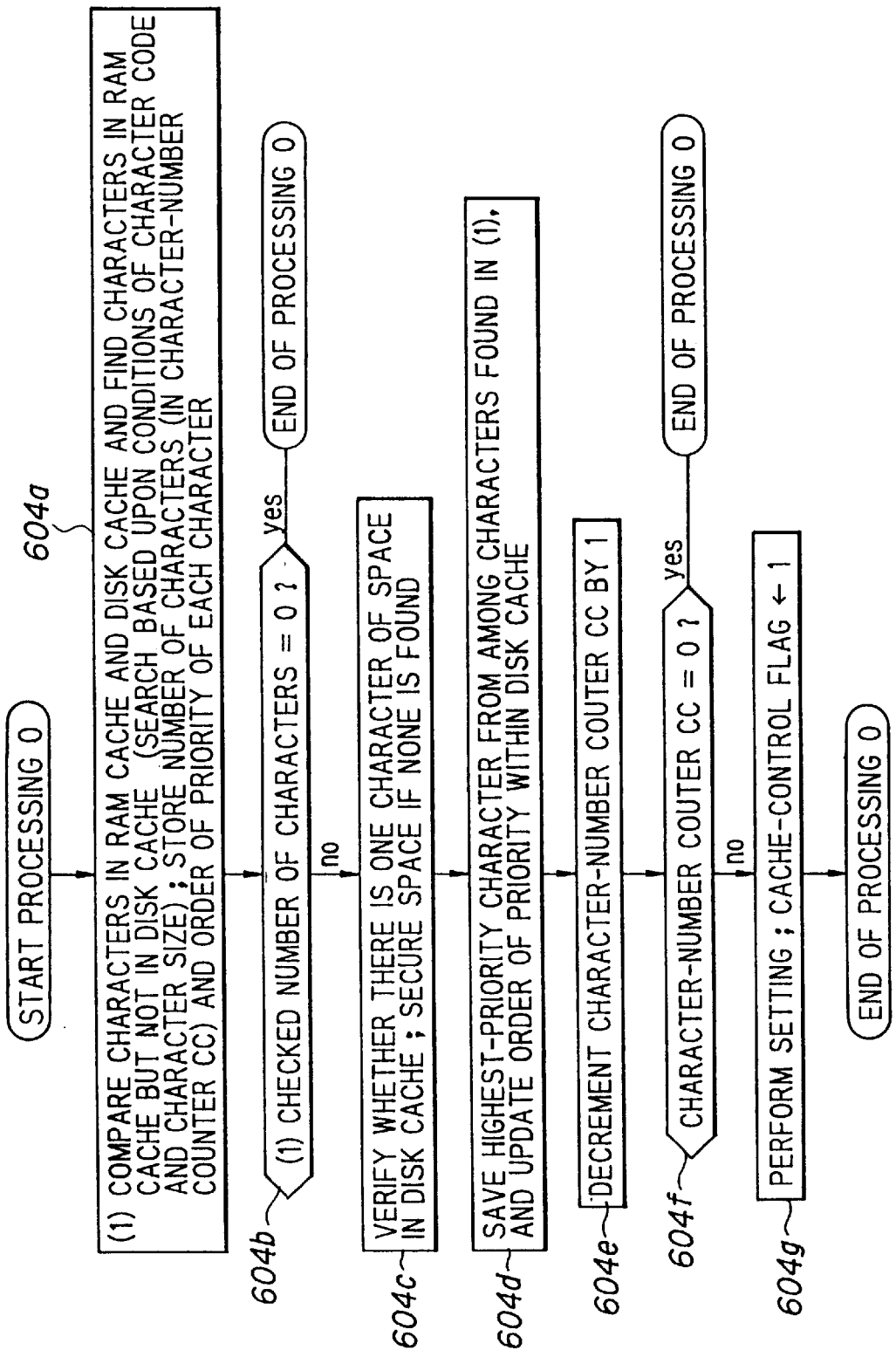
FIG. 15 is a second flowchart of RAM-cache save processing.
Figure 16:
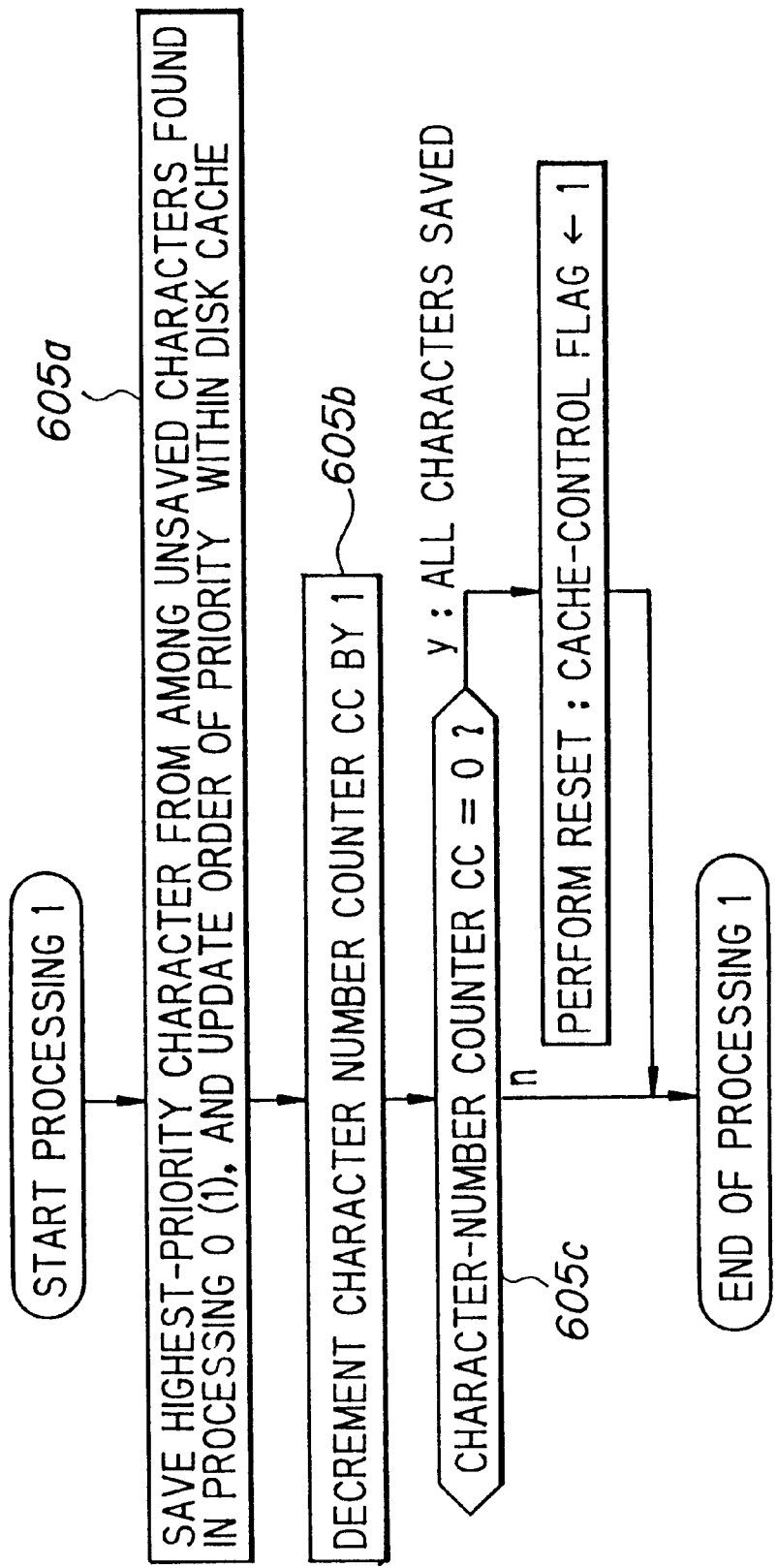
FIG. 16 is a third flowchart of RAM-cache save processing.

FIGS. 14 through 16 are flowcharts of RAM-cache save processing when printing is not being carried out.

If data unanalyzed is found not to be present in the reception buffer on the MPU side at step 105 in FIG. 7, this is regarded as being indicative of the non-printing state and the processing routine for saving data in the RAM cache is executed.

First, the cache memory controller 11a' determines whether the time-out flag is logical "1" (step 601). If the flag is logical "0", RAM-cache save processing is terminated without generating the interval-time interrupt (without passage of a fixed period of time). If the time-out flag is logical "1", on the other hand, the flag is returned to logical "0" (step 602) and the logic ("0" or "1") of the cache control flag is investigated (step 603).

The cache memory controller 11a' executes the RAM-cache save processing of FIG. 15 (step 604) if the cache control flag is "0" and the RAM-cache save processing of FIG. 16 (step 605) if the cache control flag is "1".

If the cache control flag is "0", the cache memory controller 11a' compares the character codes and character sizes in the RAM-cache retrieval table 11a-1 with those in the disk-cache retrieval table 11a-2, searches for characters (according to character code and character size conditions) present in the RAM cache but not in the disk cache, plants the number of these characters in a character-number counter CC (not shown) and stores the order of priority of each character (step 604a).

Next, the cache memory controller 11a' checks to determine whether the character count CC is zero (step 604b). If the count is zero, this means that there is no character-image data to be saved in the disk cache 14b from the RAM cache 11b and, hence, RAM-cache save processing is terminated.

If the character count CC is not zero, it is determined whether space equivalent to one character is available in the disk cache 14b. If this space does not exist, then the character-image data having the lowest order of priority is discarded from the disk cache to provide such space (step 604c).

Next, from among the characters obtained at step 604a, the cache memory controller 11a' transfers the character-image data of the character having the highest order of priority to the disk cache 14b to save this data in the disk cache and changes the order of priority within the disk-cache retrieval table 11a-2 (step 604d). Thereafter, the character count CC is decremented (step 604e) and the character counter CC is checked to determine whether it is zero (step 604f). If the count is zero, this means that there is no longer any character-image data to be saved in the disk cache 14b from the RAM cache 11b. RAM-cache save processing is terminated as a result. If the count is not zero, however, the cache control flag is made "1" (step 604g), RAM-cache save processing is terminated and the system waits for generation of the next interval-timer interrupt.

If the cache control flag is found to be "1" at step 603 (step 10), then, from among the characters obtained at step 604a (FIG. 15) not yet saved, the cache memory controller 11a' transfers the character-image data of the character having the highest order of priority to the disk cache 14b to save the data therein and changes the order of priority within the disk-cache retrieval table 11a-2 (step 605a). The controller 11a then decrements the character count CC (step 605b) and checks the count CC to determine it is zero (step 605c). If the count is not zero, however, the cache control flag is left at "1", RAM-cache save processing is terminated and the system waits for generation of the next interval-timer interrupt.

If the character count CC is zero, this means that all of the characters present in the RAM cache 11b but not in the disk cache 14 have been transferred to and saved in the disk cache. As a result, the controller makes the cache memory flag "0" (step 605d) and terminates RAM-cache save processing.

The foregoing description relates to a case in which orders of priority of each of the characters in the RAM cache and disk cache are decided by the LRU algorithm. However, the invention is not limited to the LRU algorithm and the order of priority can be decided in accordance with a different rule for deciding order of priority.

Further, a case has been described above in which the invention is applied to a printer. However, the invention is not limited to a printer but can be applied generally to data processing devices as well.

Furthermore, in the foregoing description, one character is adopted as the saving unit of data at the time of the interval-timer interrupt in the non-printing mode. However, the one-character unit does not impose a limitation upon the invention and it is permissible to adopt units of a fixed data length set in advance. For example, if the character-image data is composed of 32 kilobytes, data can be saved in a unit of four bytes by a single timer interrupt.

Further, a case has been described above in which a RAM cache is used as a cache memory from which data is lost by a power cut-off and a disk cache is used as a cache memory from which data is not lost by a power cut-off. However, the present invention is not limited to these memories.

In accordance with the first embodiment described above, data that has been saved anew in a RAM cache is saved also in a disk cache, and this data is restored to the RAM cache when power is introduced. As a result, loss of data that has been stored in the RAM cache just prior to the power cut-off can be held to the minimum, the hit rate (the probability that data will be found in the RAM cache) at the time of actual operation can be improved and processing speed (printing speed in the case of a printer) can be raised.

Further, since the control unit transfers the RAM-cache data, inclusive of new data, which has not been saved in the disk cache from the RAM cache to the disk cache to save this data in the disk cache when the primary control operation is not being performed, the primary operation, such as a printing operation, is in no way affected. This means that there is no decline in processing speed, such as printing speed, ascribable to cache memory control.

Furthermore, since the transfer of data from the RAM cache to the disk cache is executed at fixed times in prescribed data units when no operation is being performed (i.e., the non-printing mode), the time devoted to a single cache memory control cycle is shortened. This means that even if the primary operation starts while cache memory control is being performed, cache memory control will end in a short period of time and, hence, primary control (printing control) can start promptly.

The data saved in the RAM cache is assigned an order of priority in accordance with a predetermined rule, and data is transferred to and saved in the disk cache starting from the high-priority data. As a result, high-priority data can be recovered and loss of this data can be minimized, thereby raising the hit ratio.

(B) Second Embodiment (a) Overall Configuration

Figure 17:
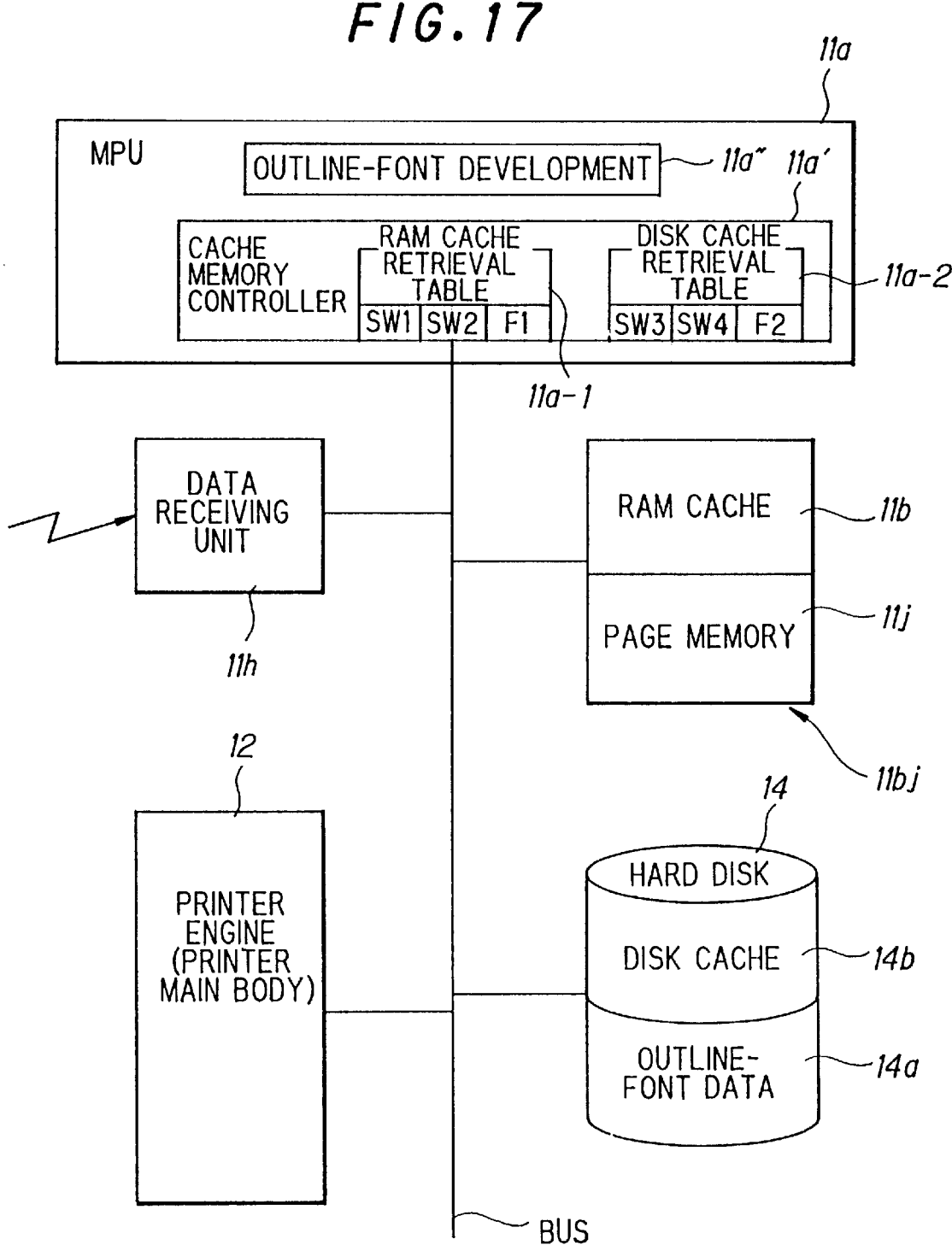
FIG. 17 is an overall block diagram illustrating a second embodiment of the present invention.
Figure 18:
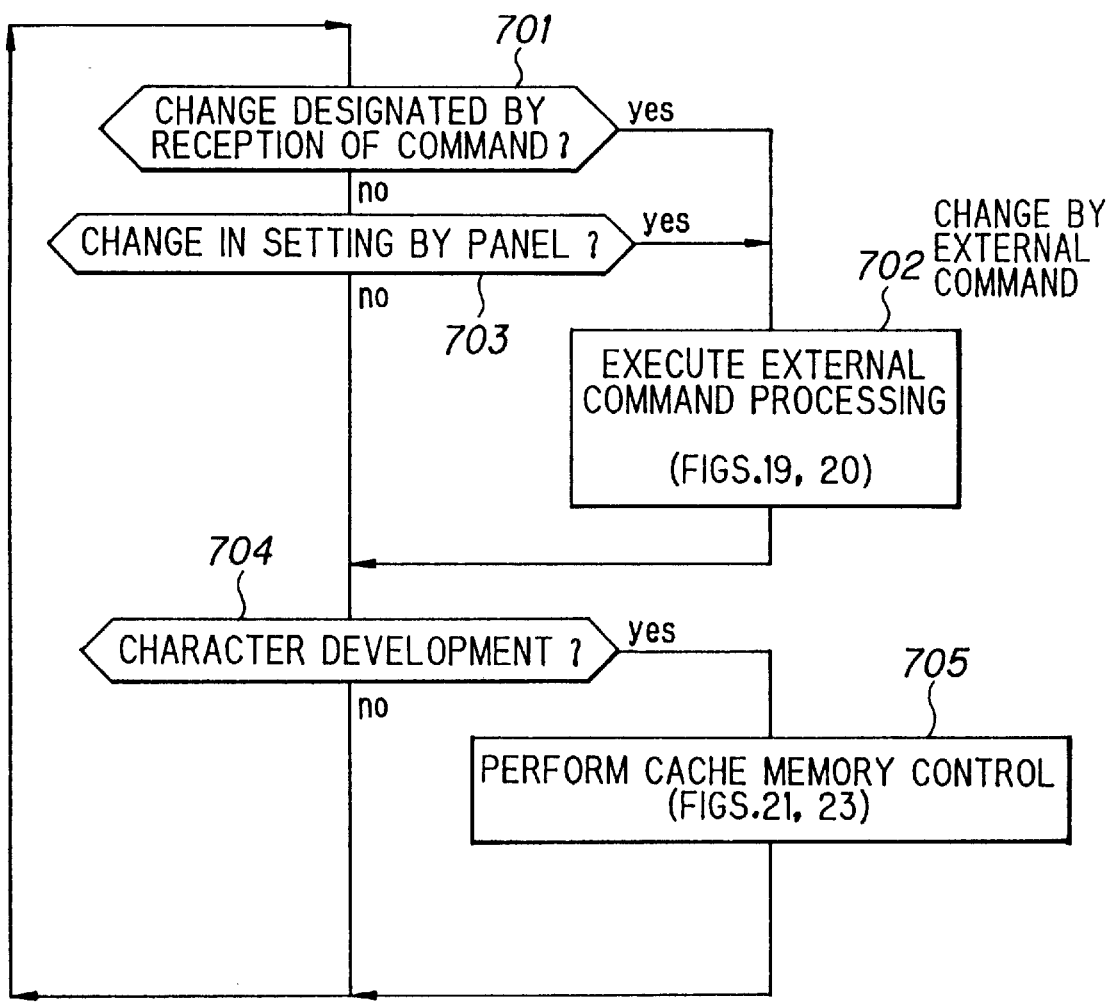
FIG. 18 is a flowchart of overall processing according to the second embodiment.

FIG. 17 is a block diagram illustrating a second embodiment of the present invention, FIG. 18 is a flowchart of overall processing, and FIGS. 19 and 20 are flowcharts of external control processing. Components in FIG. 17 identical with those in FIG. 5 are designated by like reference numerals. As shown in FIG. 17, the microcomputer (MPU) 11a includes the cache memory controller 11a', which has the RAM-cache retrieval table 11a-1 and the disk-cache retrieval table 11a-2, and the outline-font development unit 11a'', which are included as functions. Numeral 11bj denotes a RAM having the RAM cache 11b and a page memory 11j.

Numeral 11h represents a data receiving unit for receiving commands and data from the host apparatus (a computer, word processor, etc.), 12 the printer main body (a printer engine) and 14 the hard disk having the outline-font storage area 14a and the disk-cache storage area 14b. The MPU 11a, the RAM 11bj, the data receiving unit 11h, the printer engine 12 and the hard disk 14 are interconnected by a bus so as to be capable of exchanging data with one another.

The RAM-cache retrieval table 11a-1 is provided with a switch flag SW1 for setting whether processing for saving data in the RAM cache 11b is active or inactive, a switch flag SW2 for setting whether processing for loading data from the RAM cache 11b is active or inactive, and a filter-condition setting unit F1 for setting filter conditions (character code, magnification) of processing for saving data in the RAM cache 11b.

Similarly, the disk-cache retrieval table 11a-2 is provided with a switch flag SW3 for setting whether processing for saving data in the disk cache 14b is active or inactive, a switch flag SW4 for setting whether processing for loading data from the disk cache 14b is active or inactive, and a filter-condition setting unit F2 for setting filter conditions (character code, magnification) of processing for saving data in the disk cache 14b.

(b) Overall Processing

Overall processing will now be described in accordance with FIGS. 18 through 20.

When a reception command is received from the data receiving unit 11h, the MPU 11a determines whether or not the command designates a change in save processing or load processing (step 701). If the command designates a change, external control processing, described in connection with FIGS. 19 and 20, is executed (step 702).

Figure 21:
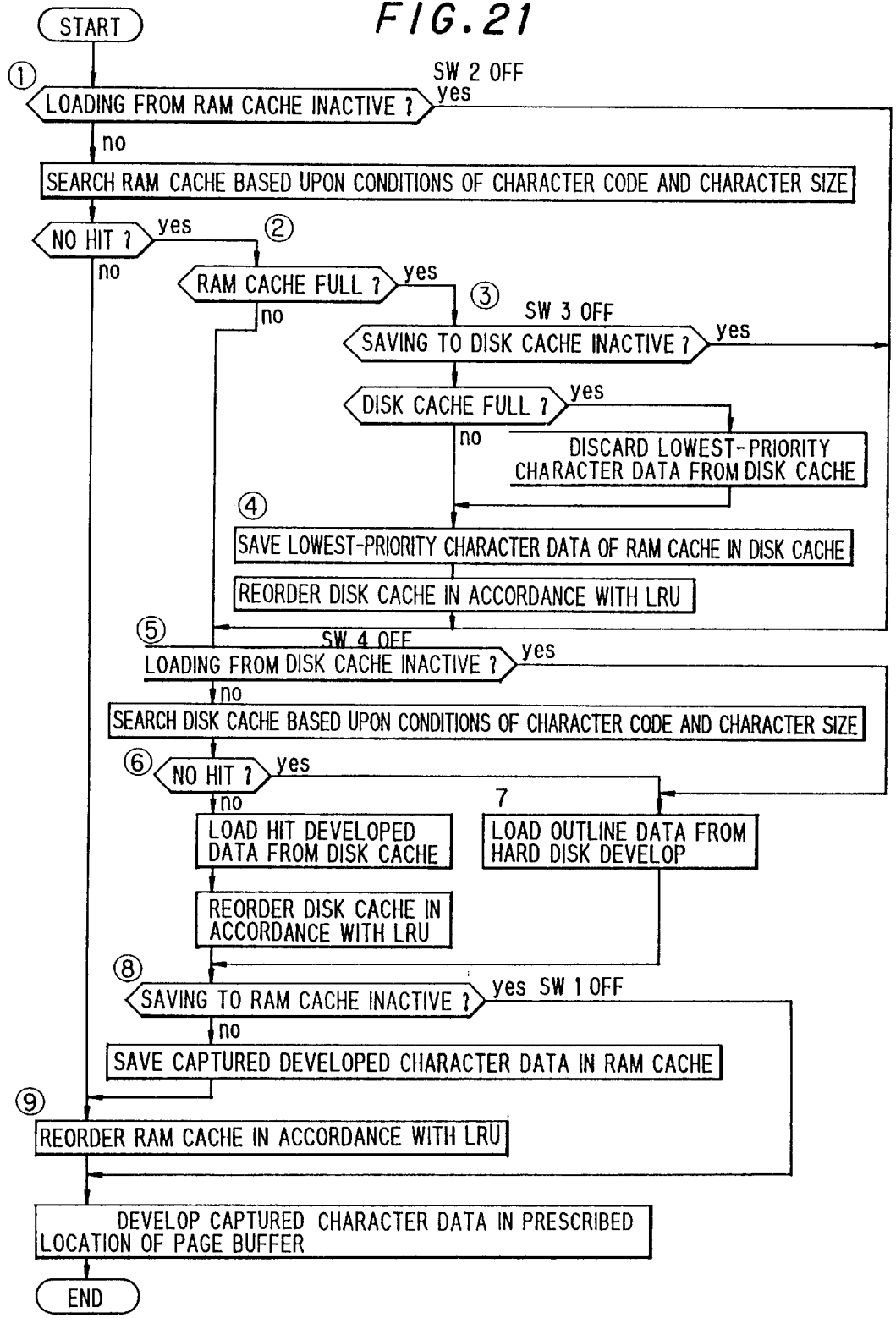
FIG. 21 is a flowchart of cache memory control for a case in which save processing and load processing are set to be active/inactive.
Figure 23:
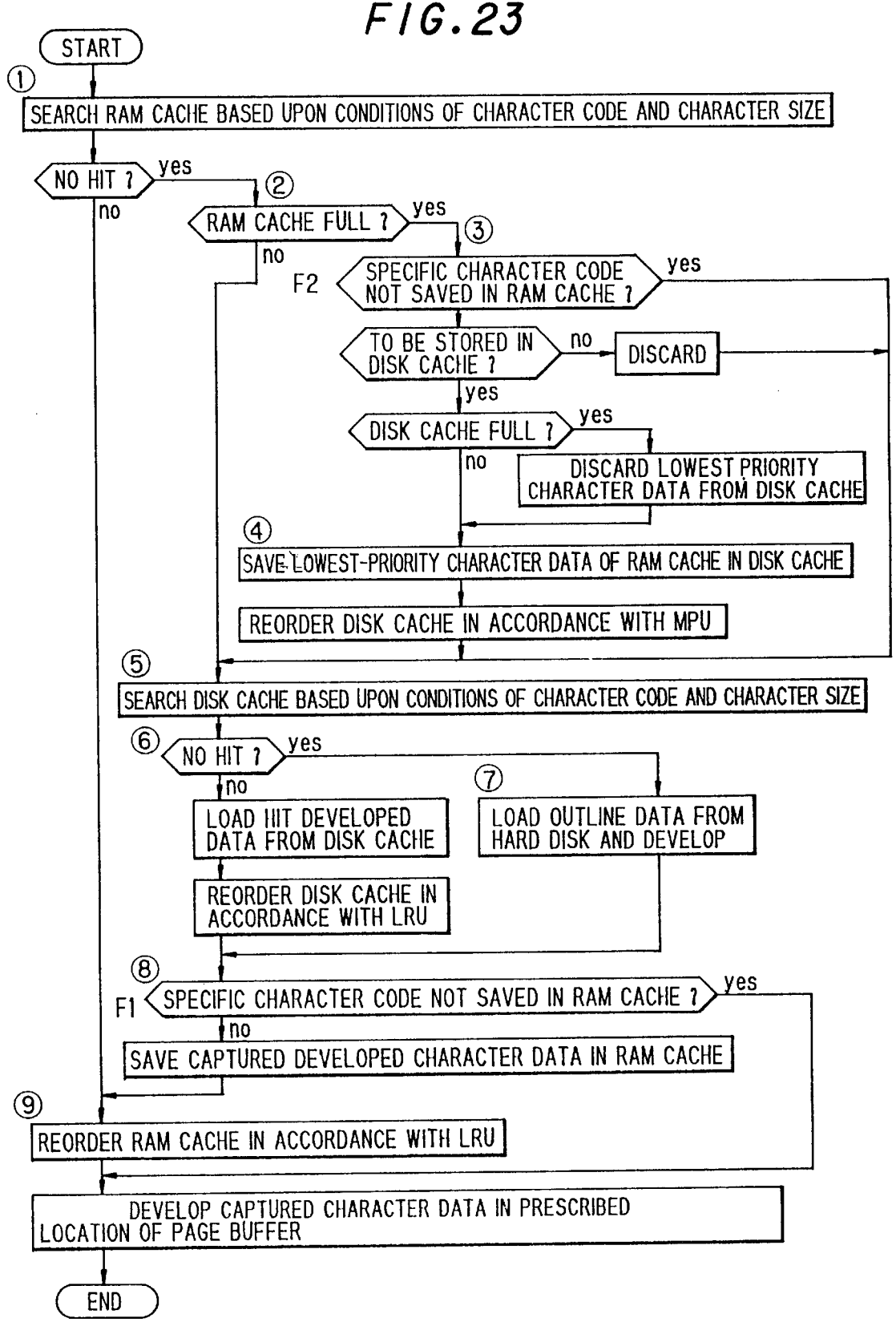
FIG. 23 is a flowchart of cache memory control for a case in which save processing is set to be active/inactive by a character code.

If the command does not designate a change in save processing or load processing and the data is a character code (step 704), cache memory control illustrated in FIGS. 21 and 23 is executed.

FIG. 19 illustrates external control processing. If an externally applied instruction indicates that saving (SAVE)

of data in the RAM cache 11b is to be activated, then, as shown in (A) of FIG. 19, the switch flag SW1 of the RAM-cache retrieval table 11a-1 is turned on (closed) to activate saving (SAVE) of data in the RAM cache 11b. If the externally applied instruction indicates that saving (SAVE) of data in the RAM cache 11b is to be deactivated, then, as shown in (B) of FIG. 19, the switch flag SW1 of the RAM-cache retrieval table 11a-1 is turned off (opened) to deactivate saving (SAVE) of data in the RAM cache 11b.

If an externally applied instruction indicates that loading (LOAD) of data from the RAM cache 11b is to be activated, then, as shown in (C) of FIG. 19, the switch flag SW2 of the RAM-cache retrieval table 11a-1 is turned on (closed) to activate loading (LOAD) of data from the RAM cache 11b. If the externally applied instruction indicates that loading (LOAD) of data from the RAM cache 11b is to be deactivated, then, as shown in (D) of FIG. 19, the switch flag SW2 of the RAM-cache retrieval table 11a-1 is turned off (opened) to deactivate loading (LOAD) of data from the RAM cache 11b.

Similarly, if an externally applied instruction indicates that saving (SAVE) of data in the disk cache 14b is to be activated, then, as shown in (E) of FIG. 19, the switch flag SW3 of the disk-cache retrieval table 11a-2 is turned on (closed) to activate saving (SAVE) of data in the disk cache 14b. If the externally applied instruction indicates that saving (SAVE) of data in the disk cache 14b is to be deactivated, then, as shown in (F) of FIG. 19, the switch flag SW3 of the disk-cache retrieval table 11a-2 is turned off (opened) to deactivate saving (SAVE) of data in the disk cache 14b.

If an externally applied instruction indicates that loading (LOAD) of data from the disk cache 14b is to be activated, then, as shown in (G) of FIG. 19, the switch flag SW4 of the disk-cache retrieval table 11a-2 is turned on (closed) to activate loading (LOAD) of data from the disk cache 14b. If the externally applied instruction indicates that loading (LOAD) of data from the disk cache 14b is to be deactivated, then, as shown in (H) of FIG. 19, the switch flag SW4 of the disk-cache retrieval table 11a-2 is turned off (opened) to deactivate loading (LOAD) of data from the disk cache 11b.

In the external control processing of FIG. 20, if an externally applied instruction sets the conditions of processing for saving data in the RAM cache 11b and the external instruction is one which sets the pass conditions of the filter as a character code, then the character code which is the object of save processing is set in the RAM-cache retrieval table 11a-1 as a filter condition F1, as shown in (A) of FIG. 20. Further, if an externally applied instruction sets the conditions of processing for saving data in the disk cache 14b and the external instruction is one which sets the pass conditions of the filter as a character code, then the character code which is the object of save processing is set in the disk-cache retrieval table 11a-2 as a filter condition F2, as shown in (B) of FIG. 20.

Similarly, if an externally applied instruction sets the conditions of processing for saving data in the RAM cache 11b and the external instruction is one which sets the pass conditions of the filter as a character magnification (size), then the character magnification which is the object of save processing is set in the RAM-cache retrieval table 11a-1 as the filter condition F1, as shown in (C) of FIG. 20. Further, if an externally applied instruction sets the conditions of processing for saving data in the disk cache 14b and the external instruction is one which sets the pass conditions of the filter as character magnification, then the character magnification which is the object of save processing is set in the disk-cache retrieval table 11a-2 as the filter condition F2, as shown in (D) of FIG. 20.

Next, if a n externally applied instruction is one which designates erasure of the RAM cache, the content of the RAM-cache retrieval table 11a-1 is erased, as shown at (E) in FIG. 20. If an externally applied instruction is one which designates erasure of the disk cache, the content of the disk-cache retrieval table 11a-2 is erased, as shown at (F) in FIG. 20.

Thus, the active/inactive setting of save processing relating to the RAM cache 11b, the active/inactive setting of load processing relating to the RAM cache 11b, the setting of save processing conditions (character code and character magnification) relating to the RAM cache 11b and the erasure of saved data in the RAM cache 11b are executed in response to the external designation. Similarly, the active/inactive setting of save processing relating to the disk cache 14b, the active/inactive setting of load processing relating to the disk cache 14b, the setting of save processing conditions (character code and character magnification) relating to the disk cache 14b and the erasure of saved data in the disk cache 14b are executed in response to the external designation.

(c) Active/Inactive Setting of Save Processing and Load Processing

Figure 22:
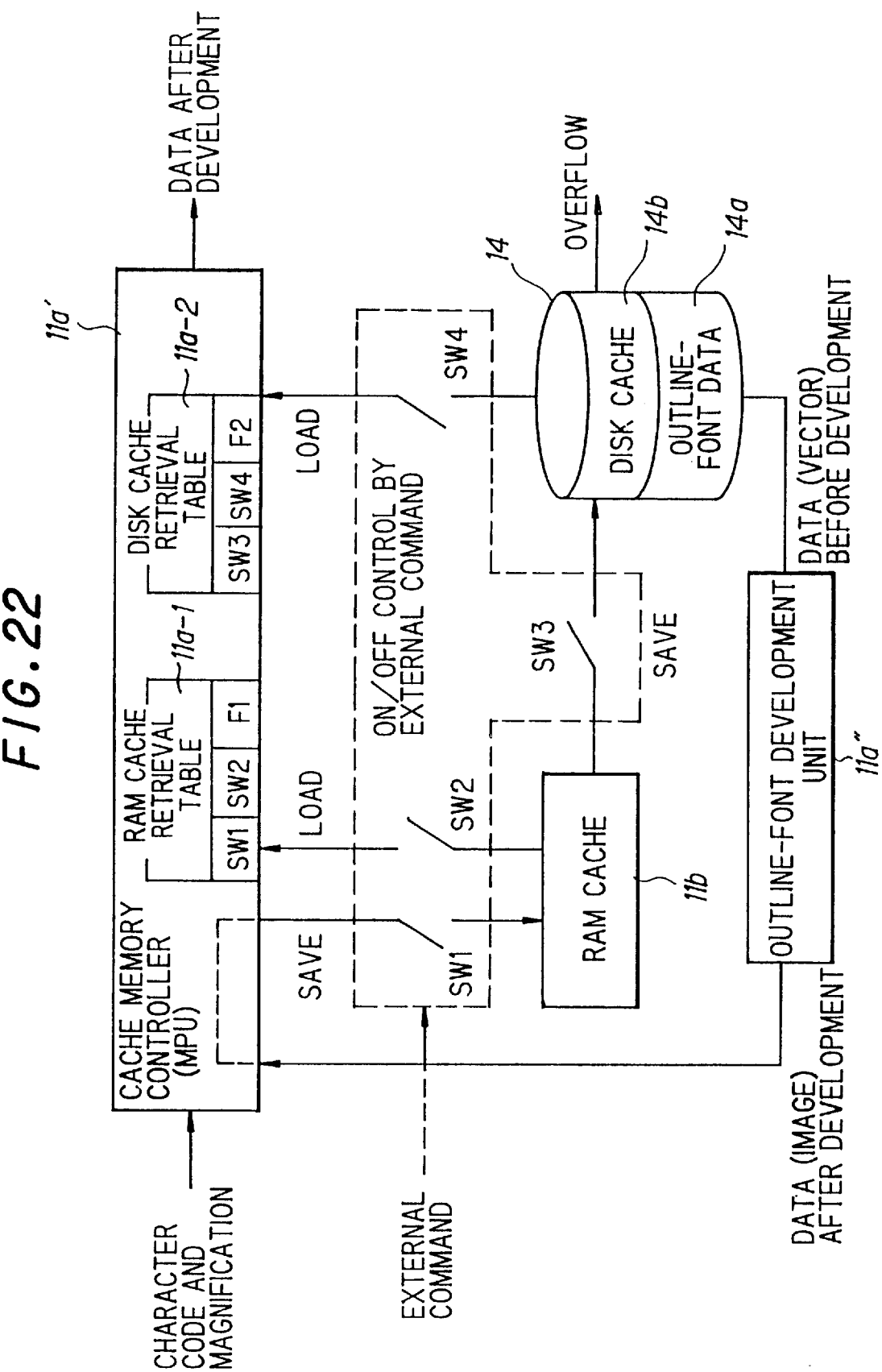
FIG. 22 is a view for describing operation of cache memory control for a case in which save processing and load processing are set to be active/inactive.

FIG. 21 is a flowchart of processing for a case in which save processing and load processing have been set to be active/inactive, and FIG. 22 is a view for describing operation.

① When a character code and magnification are received from the host apparatus, the cache memory controller 11a' checks the switch flag SW2 of the RAM-cache retrieval table 11a-1 to determine whether loading from the RAM cache 11b is inactive. If loading is found to be inactive, then the controller 11a' advances the program to step ⑤ without executing processing for loading data from the RAM cache 11b.

On the other hand, if the switch flag SW2 is found to be ON so that loading from the RAM cache 11b is active, then the controller 11a' searches the RAM-cache retrieval table 11a-1 on the basis of the character code and magnification, determines whether the corresponding character-image data is in the RAM cache 11b (i.e., whether there is a hit) and advances the program to step ⑨ if there is a hit.

② If a hit is not achieved, the cache memory controller 11a' checks the RAM-cache retrieval table 11a-1 to determine whether it is full or not. If the RAM cache is not full, the program proceeds to step ⑤.

③ If the RAM cache 11b is found to be full, the cache memory controller 11a' checks the switch flag SW3 of the disk-cache retrieval table 11a-2 to determine whether saving to the disk cache 14b is inactive. If saving is found to be inactive, then the controller 11a' advances the program to step ⑤ without executing processing for saving data in the disk cache 14b.

If the switch flag SW3 is found to be ON so that saving to the disk cache 14b is active, then the controller 11a' checks the disk-cache retrieval table 11a-2 and checks the disk cache 14b to determine whether it is full or not. If it is not full, the program proceeds to step ④. If it is full, then the controller 11a' discards the character-image data having the lowest order of priority from the disk cache 14b and advances the program to step ④.

④ The cache memory controller 11a' saves the character-image data having the lowest order of priority in the RAM cache 11b in the disk cache 14b and rearranges the order of priority of the character codes in the disk-cache retrieval table 11a-2 in accordance with the LRU algorithm.

⑤ Next, the cache memory controller 11a' checks the switch flag SW4 of the disk-cache retrieval table 11a-2 to determine whether loading from the disk cache 14b is inactive. If loading is found to be inactive, then the controller 11a' advances the program to step ⑦ without executing processing for loading from the disk cache 14b.

On the other hand, if the switch flag SW4 is found to be ON so that loading from the disk cache 14b is active, the controller 11a' searches the disk-cache retrieval table 11a-2 on the basis of the character code and magnification and determines whether the corresponding character-image data is in the disk cache 14b (i.e., whether there is a hit).

⑥ If a hit is achieved, the cache memory controller 11a' loads the hit character-image data from the disk cache 14b, rearranges the order of priority of the character codes in the disk-cache retrieval table 11a-2 in accordance with the LRU algorithm and advances the program to step ⑧.

⑦ Conversely, if the cache memory controller 11a'determines that a hit has not been achieved, the controller 11a' extracts outline-font data corresponding to the relevant character code from the outline-font data storage unit 14a of the hard disk 14 and generates character-image data by means of the outline-font development unit 11a''.

⑧ Next, the cache memory controller 11a' checks the switch flag SW1 of the RAM-cache retrieval table 11a-1 to determine whether this flag is OFF, thereby determining whether processing for saving data in the RAM cache 11b is inactive. If this processing is found to be inactive, the program proceeds to step ⑨.

On the other hand, if the switch flag SW is found to be on so that processing for saving data in the RAM cache 11b is active, the controller 11a' saves the generated character-image data in the RAM cache 11b.

⑨ The cache memory controller 11a' rearranges the order of priority in the RAM cache 11b in accordance with the LRU algorithm and stores the generated character-image data at a prescribed location of the page memory 11j. This processing is then terminated.

By way of example, in order to print a kanji code table, neither save processing nor load processing regarding the cache memories 11b, 14b are useful since identical characters do not appear in the printout of the code table. Accordingly, before transmission of the data contained in the kanji code table, the host apparatus issues an instruction for turning off both of the switch flags SW1, SW2 of the RAM cache 11b as well as an instruction for turning off both of the switch flags SW3, SW4 of the disk cache 14b. As a result, processing for generating character-image data is executed just as if the cache memories were absent. The host apparatus would issue a similar instruction when a test pattern is printed out.

When ordinary printing is to be performed, the host apparatus issues an instruction for turning on both of the switch flags SW1, SW2 of the RAM cache 11b as well as an instruction for turning on both of the switch flags SW3, SW4 of the disk cache 14b, thereby returning control to the usual cache memory control.

When character image data is written in the page memory 11j, this character-image data is transferred to the printer engine 12 under the control of the MPU 11a, whereby this data is printed out.

Thus, in the case of a data stream for which utilization of the cache memories is not useful, cache memory control is deactivated. As a result, needless cache memory control may be dispensed with and character-image data can be generated at greater speed.

Figure 24:
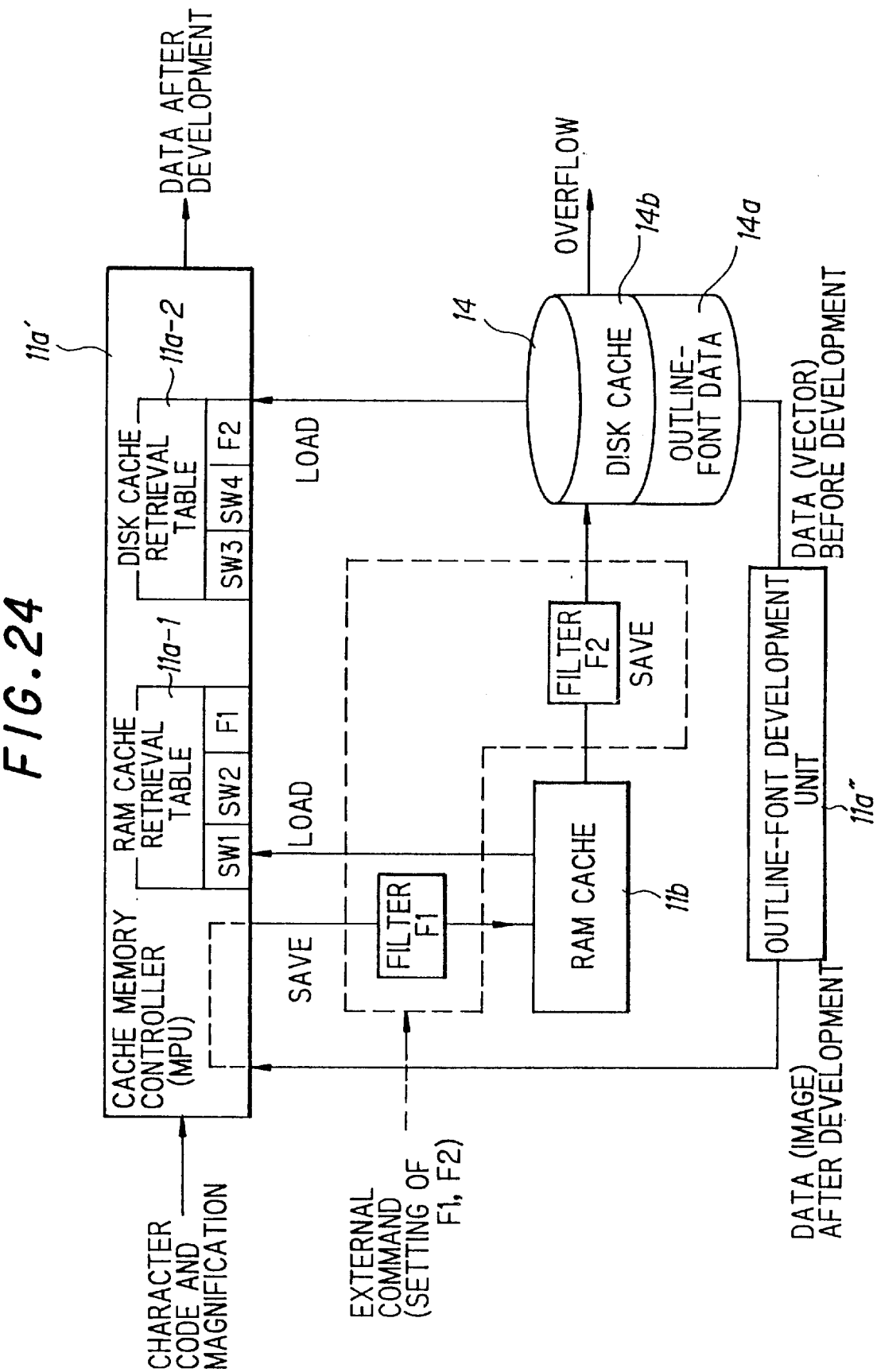
FIG. 24 is a view for describing operation of cache memory control for a case in which save processing is set to be active/inactive by a character code.

(d) Active/Inactive Setting of Save Processing and Load Processing by Character Code FIG. 23 is a flowchart of processing for a case in which save processing and load processing have been set to be active/inactive by a character code, and FIG. 24 is a view for describing operation.

① When a character code and magnification are received from the host apparatus, the cache memory controller 11a' searches the RAM-cache retrieval table 11a-1 based upon the character code and magnification, determines whether the corresponding character-image data is within the RAM cache 11b (i.e., whether there is a hit) and advances the program to step ⑨ if there is a hit.

② If a hit is not achieved, the cache memory controller 11a' checks the RAM-cache retrieval table 11a-1 to determine whether it is full or not. If the RAM cache is not full, the program proceeds to step ⑤.

③ If the RAM cache 11b is found to be full, the cache memory controller 11a' refers to the filter condition F1 of the RAM-cache retrieval table 11a-1 to determine whether the relevant character code is a specific character code not to be saved in the RAM cache 11b. If the code is one not to be save in the RAM cache, the controller 11a' advances the program to step ⑤ without executing processing for saving data in the disk cache 14b.

If the character code is one to be saved in the RAM cache 11b, then the cache memory controller 11a' refers to the filter condition F2 to determine whether the character code having the lowest order of priority in the RAM cache 11b is a character code to be saved in the disk cache 14b. If this is not a character code to be saved in the disk cache 14b, then the controller 11a' discards the character-image data corresponding to the above-mentioned character code having the lowest order of priority from the RAM cache 11b and advances the program to step ⑤.

However, if the character code is one to be saved in the disk cache 14b, then the cache memory controller 11a' checks the disk-cache retrieval table 11a-2 and determines whether the disk cache 14b is full. The program proceeds to step ④ if it is not full. If it is full, the controller 11a' discards the character-image data corresponding to the character code having the lowest order of priority in the disk cache 14b and advances the program to step ④.

④ The cache memory controller 11a' saves the character-image data having the lowest order of priority in the RAM cache 11b in the disk cache 14b and rearranges the order of priority of the character codes in the disk-cache retrieval table 11a-2 in accordance with the LRU algorithm.

⑤ The cache memory 11a' searches the disk-cache retrieval table 11a-2 on the basis of the relevant character code and magnification and determines whether the corresponding character-image data is in the disk cache 14b (i.e., whether there is a hit).

⑥ If a hit is achieved, the cache memory controller 11a' loads the hit character-image data from the disk cache 14b, rearranges the order of priority of the character codes in the disk-cache retrieval table 11a-2 in accordance with the LRU algorithm and advances the program to step ⑧.

⑦ Conversely, if the cache memory controller 11a' determines that a hit has not been achieved, the controller 11a' extracts outline-font data corresponding to the relevant character code from the outline-font data storage unit 14a of the hard disk 14 and generates character-image data by means of the outline-font development unit 11a''.

⑧ Next, the cache memory controller 11a' determines whether the relevant character code is one to be saved set in the filter condition F1 of the RAM-cache retrieval table 11a-1. If the code is one that is not to be saved, the controller 11a' advances the program to the development processing of step ⑨ without executing save processing.

If the code is one to be saved, on the other hand, the generated character-image data is saved in the RAM cache 11b.

⑨ The cache memory controller 11a' rearranges the order in the RAM cache 11b in accordance with the LRU algorithm. The generated character-image data is stored at a predetermined location of the page memory 11j, after which processing is terminated.

Thus, when a code of a character of the No. 1 Level of the JIS is set as a set code of the filter F1, for example, a character of the No. 2 Level of the JIS used very infrequently will not be saved in the RAM cache 11b.

Similarly, when a code of a character of the No. 1 Level of the JIS is set as a set code of the filter F2, a character of the No. 2 Level of the JIS used very infrequently will be discarded without being saved in the disk cache 14b from the RAM cache 11b.

Further, if a character magnification to be saved is set as the set conditions of the filters F1, F2, a character having a magnification greater than the set magnification will not be saved in the cache memories 11b, 14b through an identical flow of processing.

Furthermore, if the filter F1 is set in such a manner that all characters will be saved and the filter F2 is set in such a manner that characters of the No. 2 Level of the JIS will not be saved, then, even in the case of characters of the No. 2 level of the JIS, character-image data of characters used frequently will remain in the RAM cache 11b and characters used infrequently will be discarded.

Similarly, filters can be provided on the load sides of the RAM cache 11b and disk cache 14b and it can be so arranged that characters having a high magnification will not be loaded from cache memory. When this is done, it is possible to generate character-image data at high speed because it is quicker to generate the data from outline-font data. The reason for this is that character-image data having a high magnification has a volume of several hundred bytes and the loading thereof would take considerable time.

(e) Erasure of Stored Data

Figure 25:
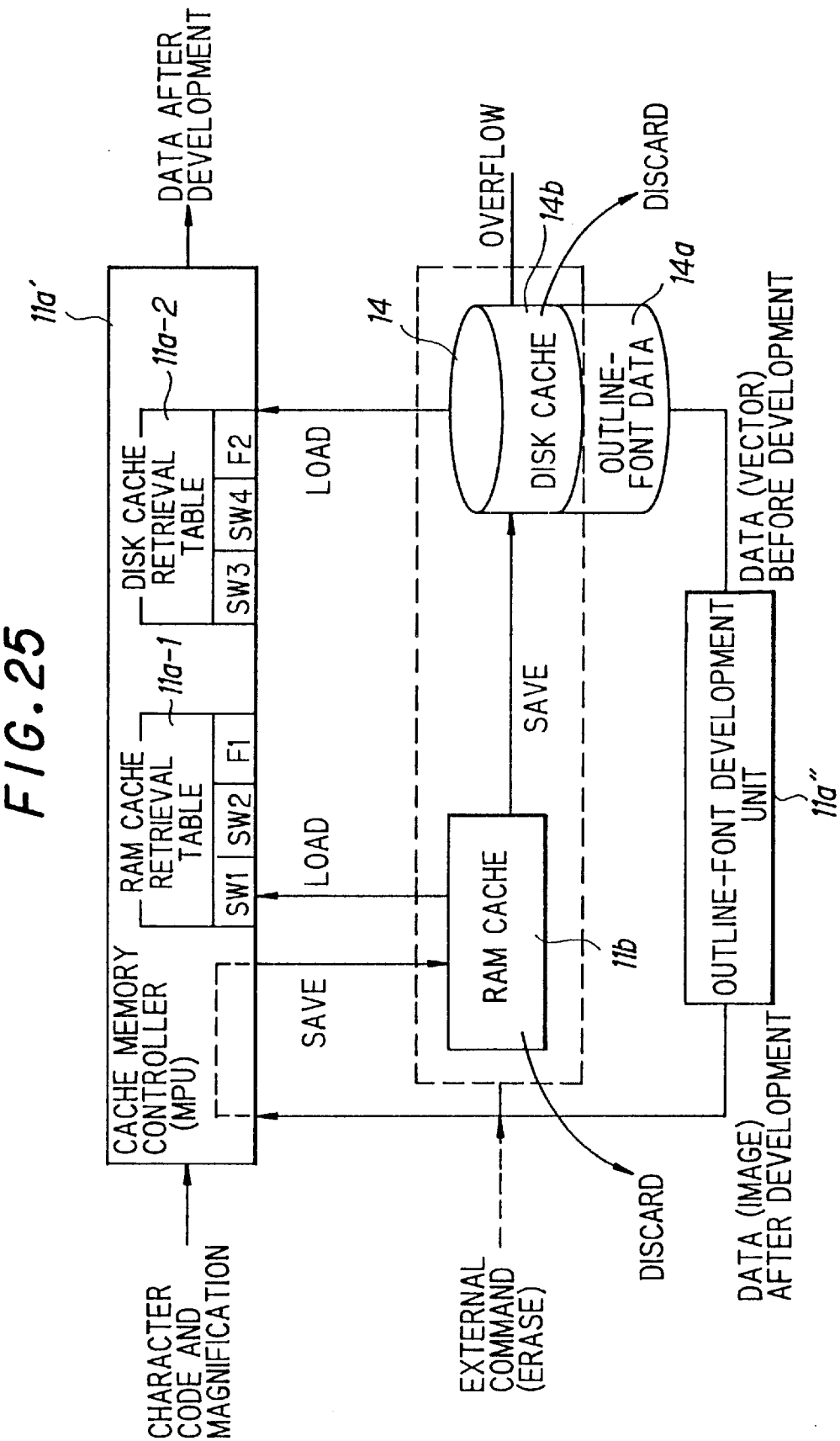
FIG. 25 is a view for describing an operation for erasing data from a cache memory.

FIG. 25 is a view for describing an operation for erasing a font image that has been stored in cache memory.

When certain text data is printed, character-image data is saved in the cache memories 11b, 14b by save processing. When the next item of text data is printed under these conditions and it is found that a character of the preceding text data will not be used, the host apparatus issues an erase instruction prior to the transmission of the next item of text data to clear the data in the RAM-cache retrieval table 11a-1 and disk-cache retrieval table 11a-2 and discard the saved data of RAM cache 11b and the saved data of disk cache 14b. When this arrangement is adopted, the character-image data of the preceding text data can be saved and the unnecessary character-image data of the succeeding text data can be erased from cache memory, whereby cache memory control regarding the succeeding text data can be performed in a highly efficient manner.

(f) Modifications

The second embodiment is capable of being modified in the manner described below.

Though a magnetic disk is adopted as the storage device above, it is possible to use an optical disk device, an optomagnetic disk device, a optical card device or a non-volatile semiconductor memory, etc.

Though the printer engine is described as being a wire-dot printer, an electrophotographic printer also can be used.

Though the image output unit is described as being a printer, another image output device such as a digital copier, a facsimile machine or a display unit may be used.

In accordance with the second embodiment, save processing or load processing regarding cache memory can be controlled by an external instruction so as to be activated or deactivated. This makes possible cache memory control suited to a data stream from a host apparatus and enables a font image to be generated at high speed. In addition, since character-image data of characters having a high frequency of use is saved, the utilization efficiency of cache memory can be improved.

(C) Third Embodiment (a) General Description of Third Embodiment

Figure 26:
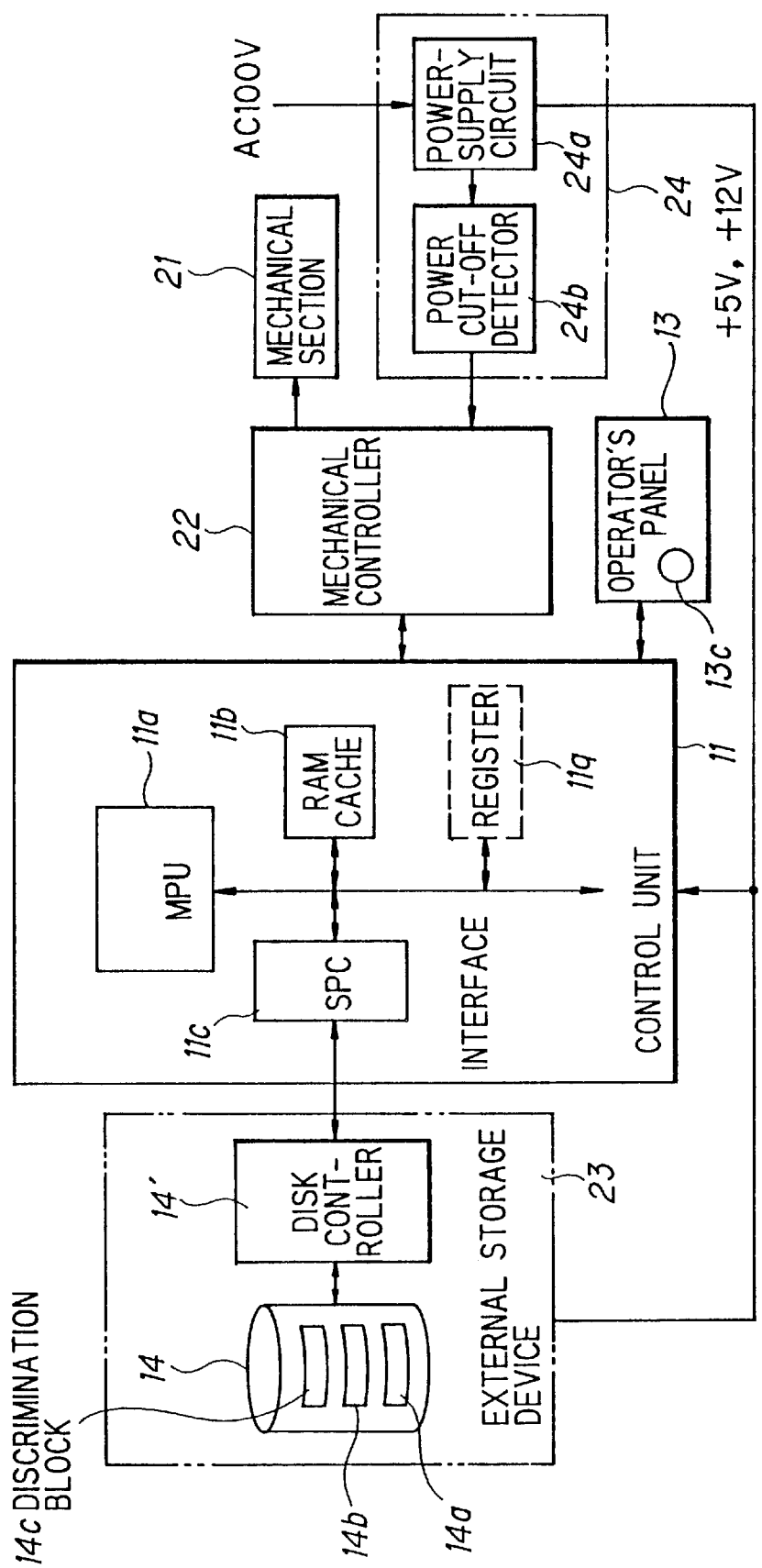
FIG. 26 is an explanatory view of a third embodiment.

FIG. 26 is a block diagram for describing a third embodiment of the present invention. This embodiment provides measures for dealing which a case in which power is cut off when data is being transferred from the RAM cache to the disk cache.

Numeral 11 denotes the control unit, 11a the MPU (a microcomputer), 11b the RAM cache, 11c a disk interface (SCSI protocol controller SPC), 11q a register in which power-supply cut-off information is set, 13 the operator's panel having a display unit and various operating keys, 13c write-in notifying means such as an LED by which the operator is made to recognize that data is currently being written in an external storage device. Numeral 21 denotes a mechanical unit which includes a paper-feed mechanism, a line-feed mechanism and a printer head, 22 a mechanical controller which functions as interrupt-signal generating means or power-supply cut-off information writing means when a power cut-off is detected, and 23 the external storage device having the hard disk 14 and a disk controller 14'. The hard disk 14 includes the outline-font data storage unit 14a, the disk cache 14b and a discrimination block 14c for storing write start/end information. Numeral 24 denotes a power-supply unit for supplying the control unit and the external storage device with DC voltage. The power-supply unit 24 includes a power-supply circuit 14a for generating DC voltage from an AC voltage of 100 V and supplying the DC voltage to the aforesaid components, and a power-supply cut-off detector for monitoring momentary cut-off of the 100 V AC voltage as well as cut-off of the AC power supply.

When the control unit 11 issues an instruction via the interface 11c to the effect that data (e.g., character-image data) is to be written in the external storage device 23 in write units of a prescribed length, the disk controller 14' writes the data of the prescribed length, whose write-in has been instructed, in the hard disk 14 (the disk cache 14b, for example) in single access units (units of one block or one sector). If the AC power supply is cut off during the course of a write-in operation, this is detected by the power-supply cut-off detector 24b and the mechanical controller 22 is so informed. In response to being notified, the mechanical controller 22 immediately generates a power cut-off interrupt, in response to which the control unit 11 resets the status of the disk interface SPC 11c.

When the interface unit SCP 11c is reset, the disk controller 14' of the external storage device 23 discriminates the reset state of the interface and writes the data of one access unit (one block unit), which is currently in the process of being written, in the hard disk 14, after which the write operation is terminated. More specifically, even if the AC power supply is cut off, the DC voltage does not drop immediately but instead declines upon elapse of a prescribed DC-voltage guarantee time (e.g., 60 msec). Hence, one access unit (one block unit) of data is written in the hard disk within the DC-voltage guarantee time, after which the write operation is terminated. As a result, the error-checking code ECC can be added on reliably before the data is written in the physical sector of the hard disk, thereby preventing the occurrence of a read error when the physical sector is read following the introduction of power.

Further, the control unit 11 sets information indicating "writing in progress" in the discrimination block 14c of the hard disk 14 before it commands writing of the data of the prescribed length in the external storage device 23 via disk interface SPC 11c, then sets information indicating "end of writing" in the discrimination block 14c after the writing of the data of the prescribed length ends. When power is re-introduced after a cut-off in power, the control unit 11 investigates the information in the discrimination block 14c and, if the information indicates "writing in progress", executes prescribed initialization processing by deciding that a cut-off in AC power occurred during writing. More specifically, the control unit 11 initializes (clears) the results of processing that was being executed at the cut-off in AC voltage as well as the related contents of the management table. Thus, loss of data can be held to a minimum. For example, even if a power failure occurs while character image data is in the process of being written in the disk cache 14b, the loss of data can be limited to one character. Moreover, the management table can be maintained in the correct state so that re-installation and a recovery operation need not be performed.

Furthermore, if an arrangement is adopted in which the operator is notified, by the write-in notifying means 13, of the fact that data is currently being written in the external storage device 23, a situation can be avoided in which the power supply is cut off by carelessly turning off the power-supply switch during a writing operation.

In addition, power cut-off information can be written in the register 11q by the mechanical controller 21 without an interrupt, and the MPU 11a of the control unit 11 can perform a check in appropriate fashion by firmware to perform power cut-off processing. More specifically, the MPU 11a may check the content of the register 11q in suitable fashion to determine whether power has been cut off or not. If it is determined that power has been turned off, the writing of data of the prescribed length in the external storage device 23 is not commanded; this operation is command only if power has not been cut off. In such case, the content of the register 11q is checked before the writing of data of the prescribed length is commanded. If power has been cut off, the write command is not issued and the system waits until the power supply has attained the normal state. Accordingly, when the power supply returns to the normal state in case of a momentary power cut-off, subsequent processing (the instruction to write) can resume immediately.

Let DL represent the length of data written in the hard disk 14 of the external storage device 23 within the DC-voltage guarantee time. By making the data length designated by the control unit 11 for write-in the external storage device 23 less than DL, the designated data can be written with the ECC attached thereto in reliable fashion before the DC voltage drops. This makes it possible to protect the physical sector (i.e., to assure that a read error will not occur in the physical sector).

(b) Overall Configuration

Figure 27:
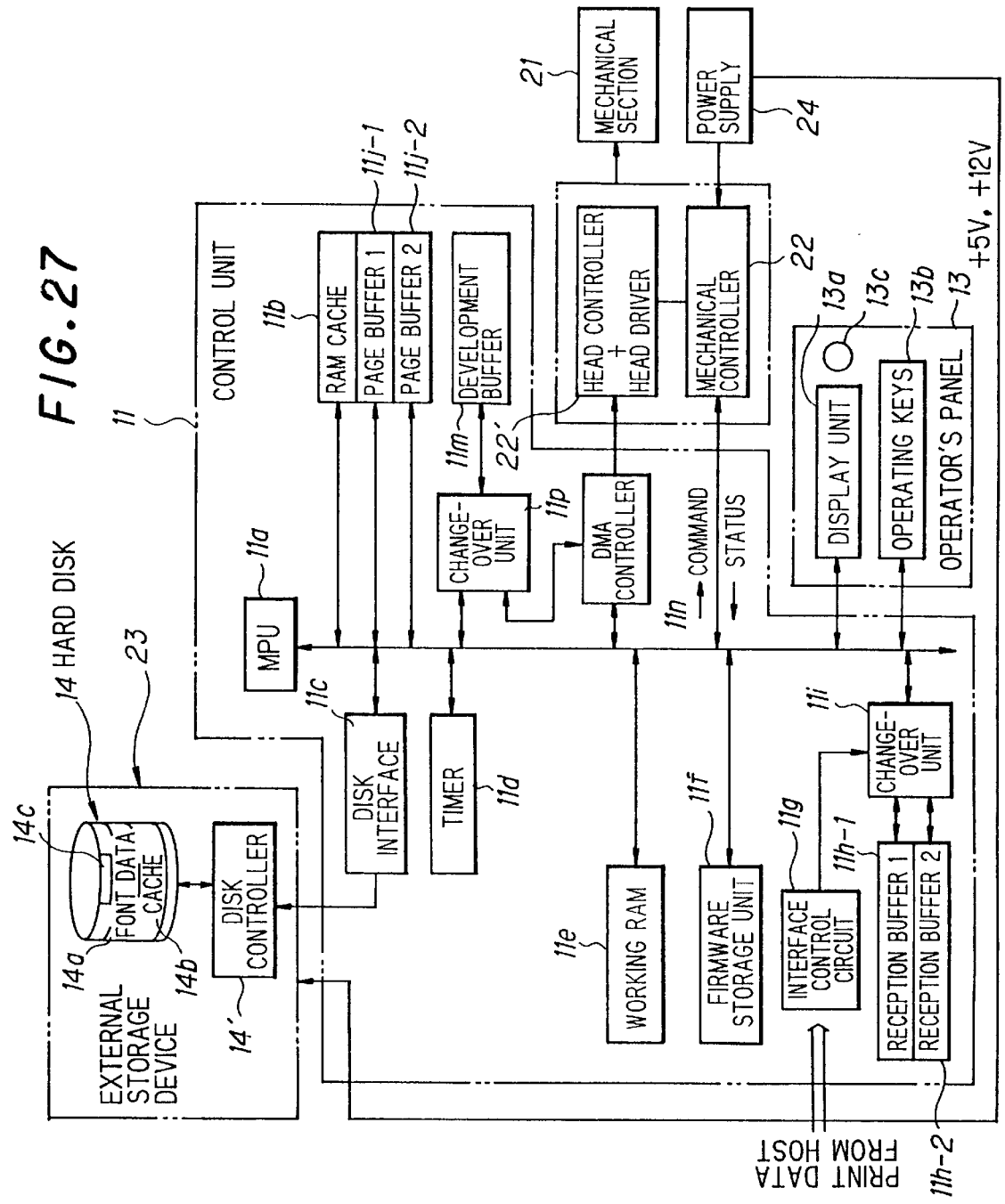
FIG. 27 is an overall block diagram showing the third embodiment.

FIG. 27 is a block diagram showing the overall configuration of a printer apparatus according to a third embodiment of the invention.

The control unit 11, which is constituted by a microcomputer, is a printer controller for controlling the entirety of a printer, by way of example. The operator's panel 13 has the display unit 13a, the various operating keys 13b and an LED 13c for informing the operator of the fact that data is currently being written in the external storage device. Numeral 21 denotes the mechanical unit which includes a paper-feed motor and a printer head, etc., 22 the mechanical controller which functions as interrupt-signal generating means when a power cut-off is detected (i.e., when a momentary cut-off notifying signal *DVDRO, described later, assumes a low level), and 22' a head controller (head controller+head driver). Numeral 23 denotes the external storage device having the hard disk 14 and the disk controller 14'. The hard disk 14 is provided with (1) the font-data storage area 14a for storing outline-font data in correlation with character codes, (2) the disk cache 14b for storing character-image data transferred thereto owing to overflow from the RAM cache, the (3) the discrimination block 14c for storing write start/end information, and other storage areas for storing a management table and the like. Numeral 24 denotes the power-supply unit for supplying the control unit 11 and the external storage device 23 with DC voltage (+5 V, +12 V). It should be noted that the means for allowing the operator to recognize that data is currently being written in the external storage device is not limited to an LED. A buzzer may be used for this purpose or a message indicating that writing is in progress may be displayed on the display unit.

(c) Control Unit

The control unit 11 includes the microcomputer (MPU) 11a, the RAM cache 11b for storing character-image data once the data has been created, the SCSI protocol controller (hereinafter referred to as the disk interface) 11c for supervising exchange of data with the hard disk, the timer 11d, the working RAM 11e, the storage unit 11f for storing firmware, and the interface control circuit 11g, which has a DMA control function, for supervising exchange of data with the host. Also included are the first and second reception buffers 11h-1, 11h-2, respectively, for storing data sent from the host apparatus alternately one line at a time by DMA control, the changeover unit 11i for changing over the reception buffers 11h-1, 11j-2 between the interface controller 11g and the MPU 11a, the first and second page buffers 11j-1, 11j-2 for storing one page of character-image data alternately, the development buffer (line buffer) 11m for storing one line of character-image data transferred thereto from the page buffer, the DMA controller 11n for reading the character-image data out of the development buffer 11m successively, applying this data to the head controller 22' and causing the latter to print the data, and a changeover unit 11p for placing the development buffer 11m under the control of the MPU 11a or of the DMA controller 11n. Since the control unit 11 executes printing control and cache memory control in the same manner as set forth in connection with FIG. 5, this control need not be described again.

(d) Power-Supply Unit

Figure 28:
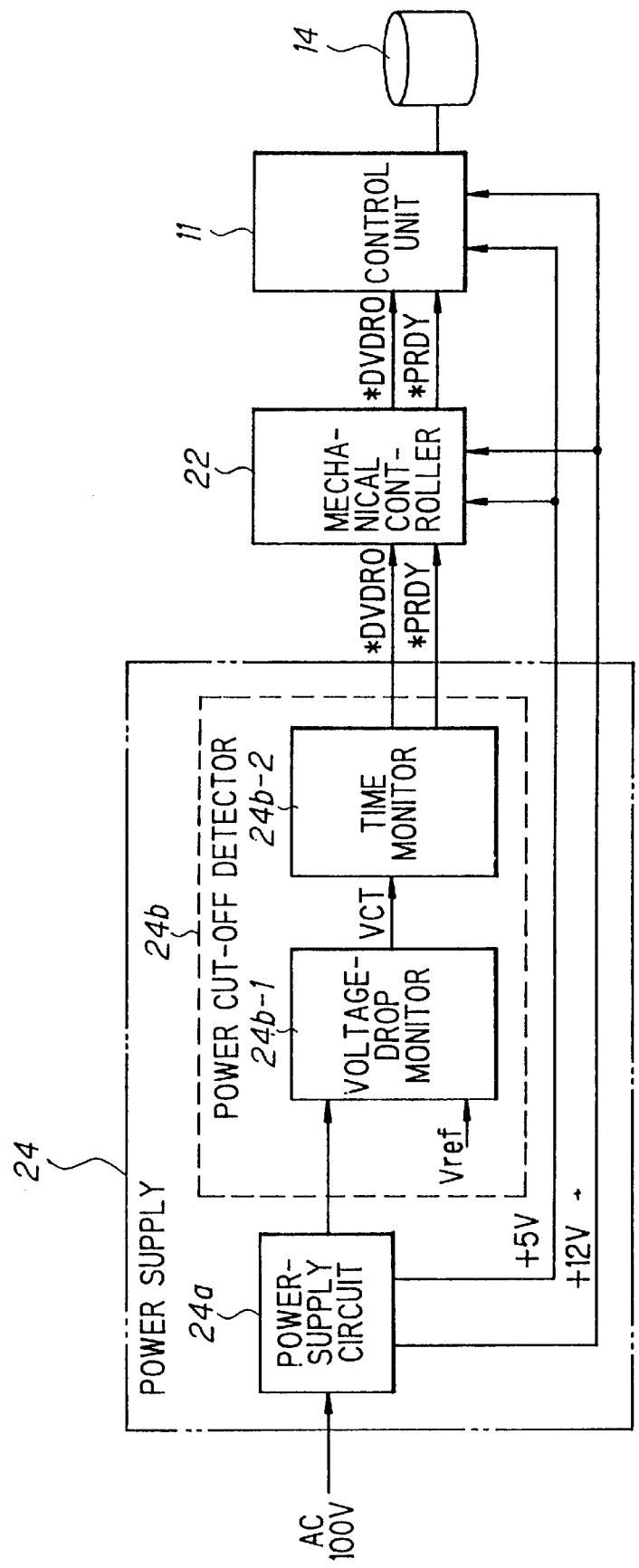
FIG. 28 is a block diagram of a control section in the third embodiment.

FIG. 28 is a block diagram of the power-supply unit 24. The unit 24 includes a power-supply circuit 24a to which an AC voltage of 100 V is applied for outputting a prescribed DC voltage (e.g., +5 V, +12 V). This circuit is so adapted that even if the AC voltage of 100 V is cut off, the DC voltages can continue to be supplied stably for a prescribed period of time (the DC-voltage guarantee time) of, say,60 msec. The unit 24 further includes a power cut-off detector 24b for detecting momentary cut-off of the 100 V AC voltage as well as cut-off of the 100 V AC. The detector 24b has a voltage-drop monitor 24b-1 for outputting a high-level voltage cut-off signal VCT when it is detected that the AC voltage has fallen below a set level Vref, and a time monitor 24b-2 for monitoring the high-level duration of the power cut-off signal VCT and outputting (1) the low-level momentary cut-off notifying signal *DVDRO when the aforementioned duration of the high level exceeds 10 msec, for example, and then (2) a low-level power-read signal *PRDY when the duration exceeds the DC-voltage guarantee time (60 msec). The signals *DVDRO, *PRDY are transmitted to the mechanical controller 22 which, when the momentary cut-off notifying signal *DVDRO attains the low level, responds by sending an unmaskable power cut-off interrupt signal to the control unit 11.

Figure 29:
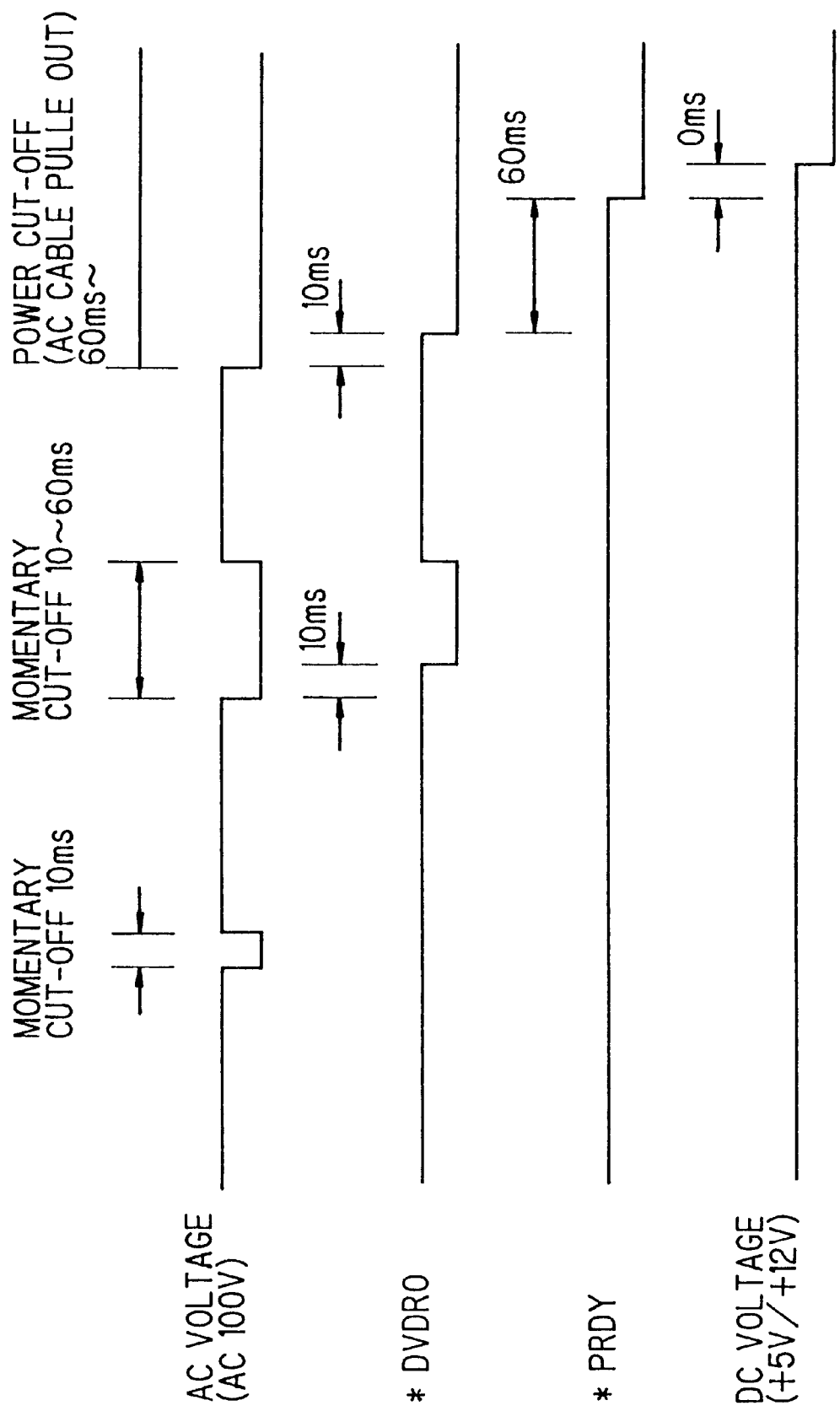
FIG. 29 is a waveform diagram of various voltages and signals.

FIG. 29 is a waveform diagram showing the waveforms of AC voltage, DC voltage and the signals *DVDRO, *PRDY. In a state in which 100 V AC is being introduced, the momentary cut-off notifying signal *DVDRO and power-ready signal *PRDY are both at the high level and the DC voltage is being stably supplied. Even if the AC voltage is cut off momentarily (i.e., for less than 10 msec) [case (1) in FIG. 29] under these conditions, the momentary cut-off notifying signal *DVDRO and power-ready signal *PRDY do not change and the DC voltage continues to be supplied in a stable manner (i.e., in a case where momentary cut-off lasts for less than 10 msec).

If the AC voltage remains in the cut-off state for more than 10 msec (but less than 60 msec), however, as shown at (2) in FIG. 29, the momentary cut-off notifying signal *DVDRO assumes the low level and the mechanical controller 13 is notified of the momentary cut-off of the power supply. In this case, the power-ready signal *PRDY does not change and the DC voltage continues to be supplied in a stable manner (i.e., in a case where momentary cut-off has a duration of 10~60 msec).

If the AC voltage remains in the cut-off state for more than 60 msec, as shown at (3) in FIG. 29, because the power-supply switch has been turned off or the power-supply cable pulled out of its socket, the momentary cut-off notifying signal *DVDRO and power-ready signal *PRDY both attain the low level and the mechanical controller 13 is notified of the momentary cut-off of the power supply. In this case, the DC voltage falls to V when the power-ready signal *PRDY assumes the low level.

(e) Write Processing

Figure 30:
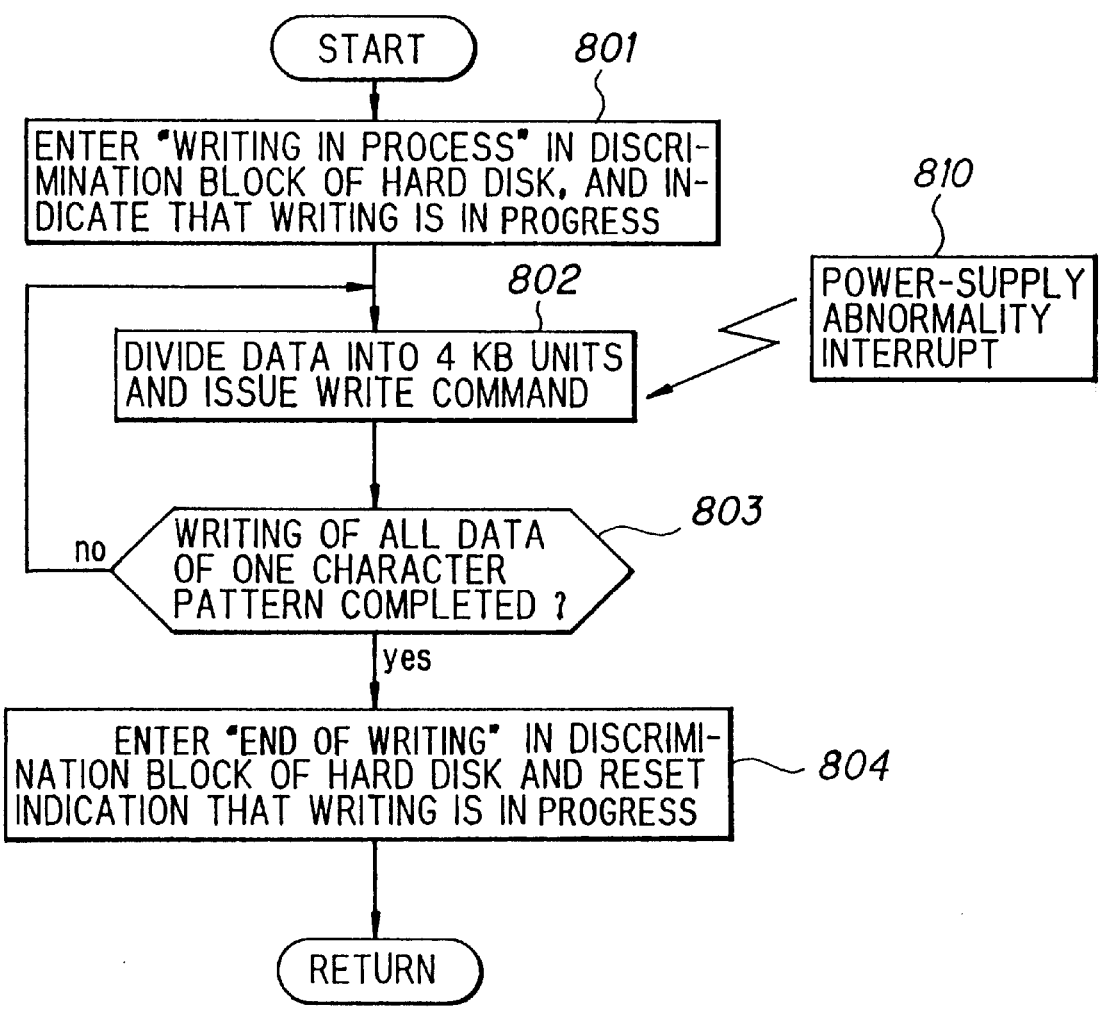
FIG. 30 is a flowchart of hard-disk write processing.

FIG. 30 is a flowchart illustrating processing for a case in which data is written in the hard disk 14 from the control unit 11. FIG. 30 illustrates an example in which character-image data of one character is transferred from the RAM cache 11b to the disk cache 14b and saved in the disk cache at the time of, say, a printing operation.

When conditions for transferring the character-image data from the RAM cache 11b to the disk cache 14b to save the data in the disk cache have been satisfied, the MPU 11a of the control unit 11 first issues a write command (step 801) for setting "writing in progress" in the discrimination block 15a-1 of the hard disk 14. As a result, the data indicating "writing in progress" is set in the discrimination block 14c via the disk interface SPC 11c and disk controller 14'. Concurrently, the MPU 11a lights the LED 13c on the operator's panel 13 to indicate that writing is in progress.

Thereafter, the MPU 11a divides the character-image data into fixed-length units of, say, four kilobytes each if the size of the character-image data is 32 kilobytes, sends the disk interface (SPC) 11c a command for writing the first four kilobytes of data and then instructs that the data is to be written in the external storage device 23 via the disk interface SPC 11c (step 802). As a result, the disk controller 14' of the external storage device 23 writes the four kilobytes (=4096 bytes) of data, which have been designated for writing, in the disk cache 14b in units of one block (=256 bytes), which is the unit of access, and attaches EEC (the error-checking code) to the end of each block. If the writing of the designated data ends without occurrence of a power cut-off, the MPU 11a is so notified via the disk interface 11c.

As a result, the MPU 11a determines whether all of the data of one character has been written in the disk cache (step 803). If the answer is "NO", the program returns to step 802 and the processing from this step onward is executed until the writing of all data of one character is completed. If the writing of all data of one character is completed, on the other hand, the MPU 11a issues a write command (step 804) for setting "writing in progress" in the discrimination block 14c. The data indicating "writing in progress" is set in the discrimination block 14c via the disk interface 11c and disc controller 14'. Further, the MPU 11a extinguishes the LED 13c on the operator's panel to reset the indication that writing is in progress.

Figure 31:
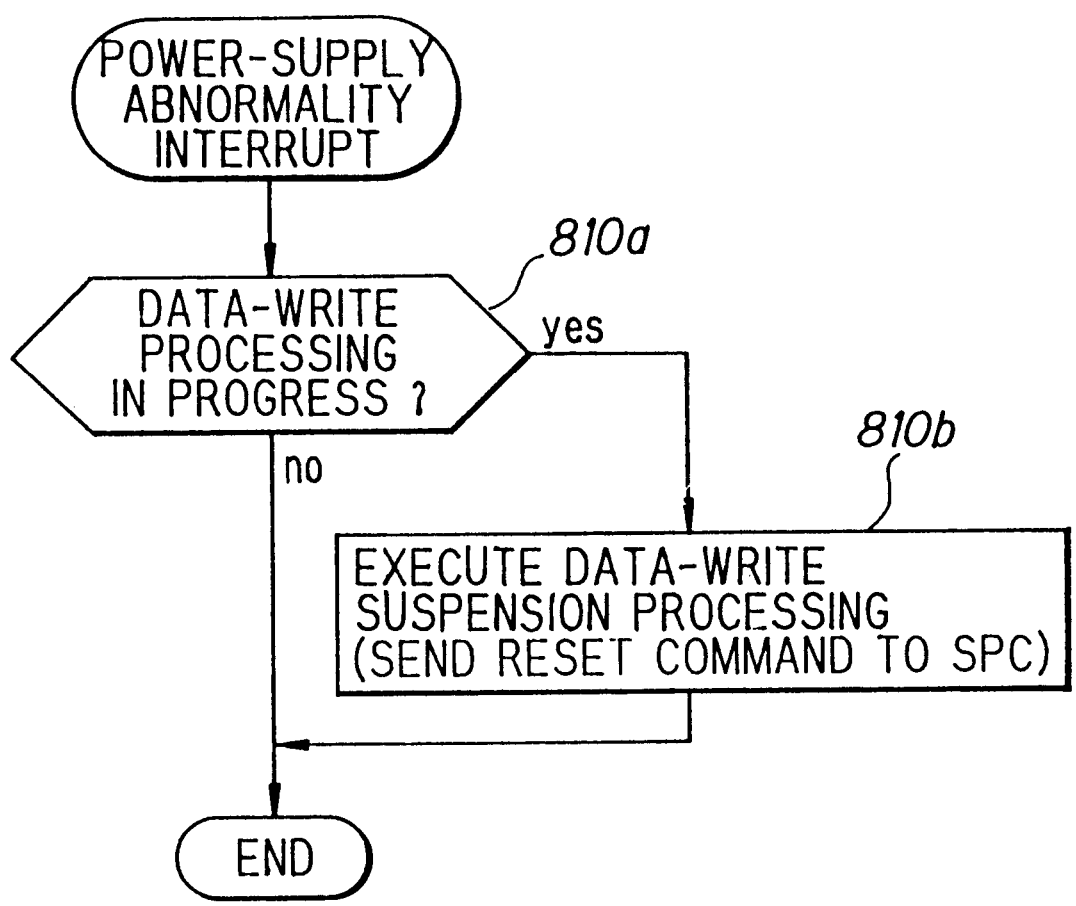
FIG. 31 is a flowchart of interrupt processing.

(f) Power Cut-Off Interrupt (FIG. 31)

If the power supply is cut off when data is in the process of being written in the disk cache 14b and, hence, the momentary cut-off notifying signal *DVDRO assumes the low level, the mechanical controller 22 generates a power cut-off interrupt 810.

When the power cut-off interrupt is generated, the MPU 11a executes the interrupt processing of FIG. 31. More specifically, the MPU 11a determines whether processing for writing data in the hard disk is in progress (step 810a). The MPU 11a executes no processing if writing is not in progress but sends a reset command to the disk interface 11c (step 810b) if data is current being written in. As a result, the disk interface 11c resets the state of the interface. The disc controller 14' of the external storage device 23 discriminates the reset state of the interface, adds the ECC to the data of one access unit (one block) currently undergoing writing, writes the data and the ECC in the hard disk (the disk cache, for example) and terminates the writing operation. Furthermore, as described above, even if the AC voltage of 100 V is cut off, the DC voltage does not fall immediately but declines following elapse of the predetermined DC-voltage guarantee time (60 msec). This means that the data of one access unit (one block unit) is written in the hard disk within the DC-voltage guarantee time, after which the writing operation is terminated. As a result, the data can be written in the hard disk with the error-checking code ECC reliably appended thereto, thereby assuring that a read error will not occur when reading a physical sector after the introduction of power.

Figure 32:
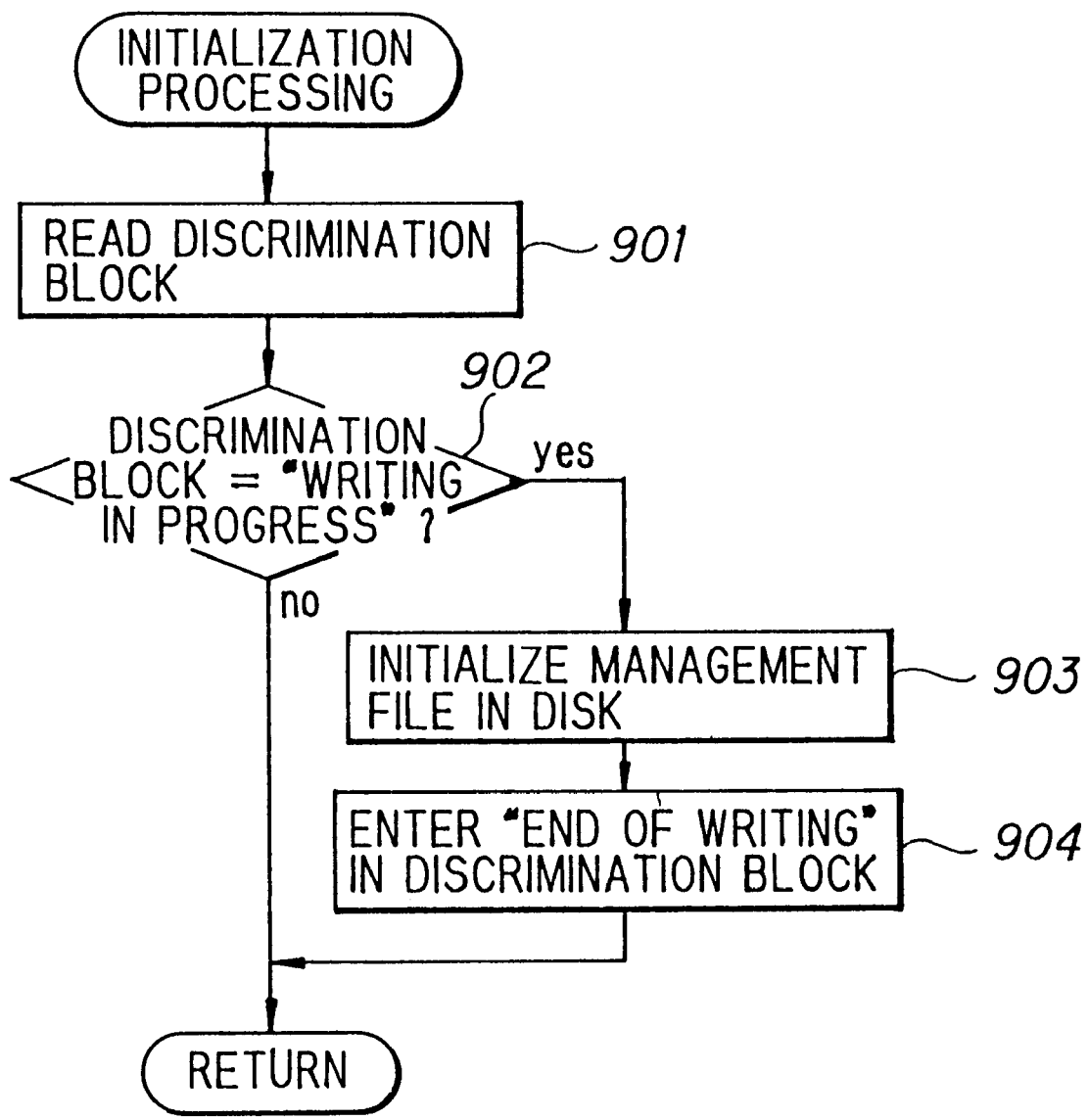
FIG. 32 is a flowchart illustrating initialization processing executed when power is introduced.

(g) Initialization Processing When Power is Introduced (FIG. 32)

When the power-supply interrupt is generated during the writing of data, the data that was being written at the occurrence of the power cut-off is written in the hard disk in incomplete form. Accordingly, this data should not be used or should be cleared. Consequently, the content of the discrimination block 14c is checked at the introduction of power. If "writing in progress" is discriminated, prescribed initialization processing is executed because it is judged that power was cut off during the writing of data. FIG. 32 is a flowchart illustrating initialization processing at introduction of power.

When power is introduced, the MPU 11a reads in the data stored in the discrimination block 14c of the hard disk 14 (step 901) and then determines whether the data in the discrimination block indicates "writing in progress" (step 902). If the decision rendered at step 902 is "NO", then the program returns to the ordinary processing routine.

Figure 33:
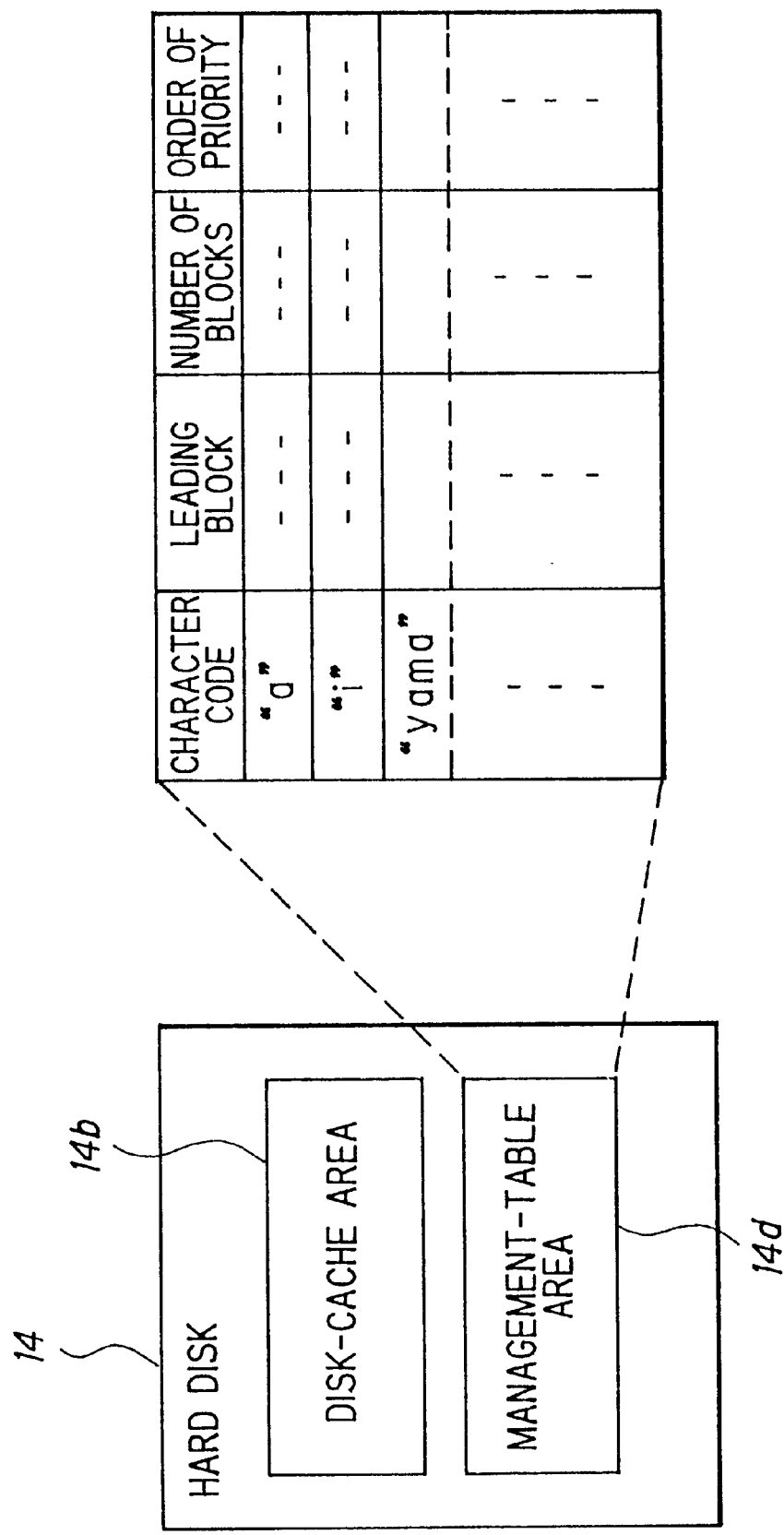
FIG. 33 is a diagram for describing initialization processing of a management table.

If "writing in progress" is discriminated, however, then, of the data contained in the management table within the disk, the management data relating to the data that was written in at the cut-off in power is cleared (initialized) (step 903). For example, in a case where character-image data is transferred from the RAM cache 11b to the disk cache 14b to be saved in the disk cache, the leading block of the character-image data, the number of blocks and the order of priority, etc., are stored in correlation with the character code in the management table 14d, as illustrated in FIG. 33. When the power supply is cut off, however, the data corresponding to the character code that prevailed at the power cut-off, and which has been stored in the management table, must be cleared. Accordingly, if the content of the discrimination block 14c is "writing in progress" when power is introduced, processing is executed to clear this data. For example, if the power supply is cut off during the saving of character-image data representing the Chinese character for "yama", the data in the management table 14d corresponding to "yama" is cleared. By virtue of such processing, loss can be limited to one character even if a power failure occurs during the writing of the character-image data in the hard disk. Moreover, the management table can be maintained in the correct state and it is unnecessary to perform reinstallation as well as a recovery operation.

After the management table is cleared, "end of writing" is entered in the discrimination block (step 904). This is followed by execution of the ordinary processing routine.

(h) Other Configuration of Third Embodiment

The foregoing relates to a case in which power cut-off processing is performed by a power cut-off interrupt. However, power cut-off information can be set in a register and power cut-off processing can be executed by firmware.

Figure 34:
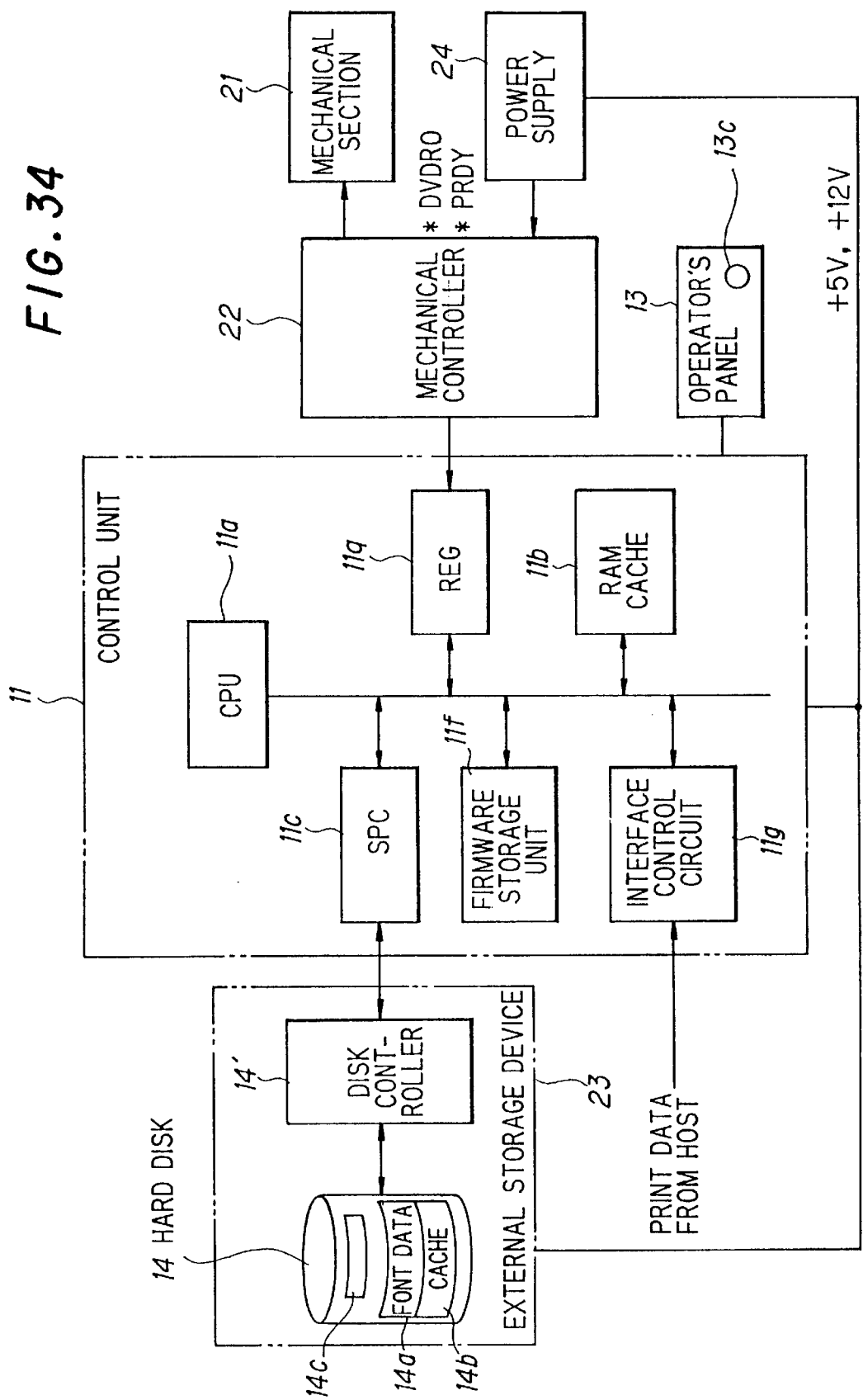
FIG. 34 is a block diagram of a third embodiment.

FIG. 34 is a block diagram showing another configuration of the third embodiment in which power cut-off processing is executed by firmware. Portions identical with those shown in FIG. 27 are designated by like reference numerals. The apparatus of FIG. 34 differs from that of FIG. 27 in the following aspects:

The control unit 11 is provided with a register 11q in which the power cut-off information is set.

When the momentary cut-off notifying signal *DVDRO assumes the low level, the mechanical controller 22 sets the power cut-off information in the register 11q.

The MPU 11a executes power cut-off processing by firmware without an interrupt.

Though the control unit 11 is illustrated in simplified form, the construction thereof is substantially the same as that shown in FIG. 27 with the exception of the aforementioned points. Further, the power-supply unit 24 has the construction shown in FIG. 28.

General Operation

An overview of power cut-off processing by firmware will now be described.

The control unit 11 checks the content of the register 11q to determine whether the power supply has been cut off or not. If it is determined that the power supply has been cut off, the control unit 11 does not command writing of the data of the prescribed length in the external storage device 23. The command for writing this data in the external storage device is issued only if the power supply has been cut off. In such case, the control unit checks the content of the register 11q before indicating that the data of the prescribed length is to be written. If the content of the register indicates that the power supply has been cut off, the write command is not issued and the system waits until the power supply has attained the normal state. Accordingly, when the power supply returns to the normal state in case of a momentary power cut-off (a power cut-off of less than 60 msec), subsequent processing can resume immediately.

Let DL represent the length of data written in the hard disk 14 of the external storage device 23 within the DC-voltage guarantee time. By making the data length designated by the control unit 11 for write-in to the external storage device 23 less than DL (e.g., four kilobytes), the designated data can be written with the ECC attached thereto in reliable fashion before the DC voltage drops. This makes it possible to protect the physical sector.

Furthermore, before the external storage device 23 is instructed via the interface 11c to write in the data of the prescribed length, the control unit sets the information indicating "writing in progress" in the discrimination block 14c of the external storage device. After writing of the data of the prescribed length ends, the control unit sets information indicating "end of writing" in the discrimination block. Then, when power is re-introduced, the control unit checks the information in the discrimination block 14c and, if "writing in progress" is found, executes prescribed initialization processing by judging that a power cut-off occurred while writing was in progress. Thus, loss of data can be held to a minimum. For example, even if a power failure occurs while a character pattern is in the process of being written in the hard disk, the loss can be limited to one character. Moreover, the management table can be maintained in the correct state so that re-installation and a recovery operation need not be performed.

Power Cut-Off Processing

Figure 35:
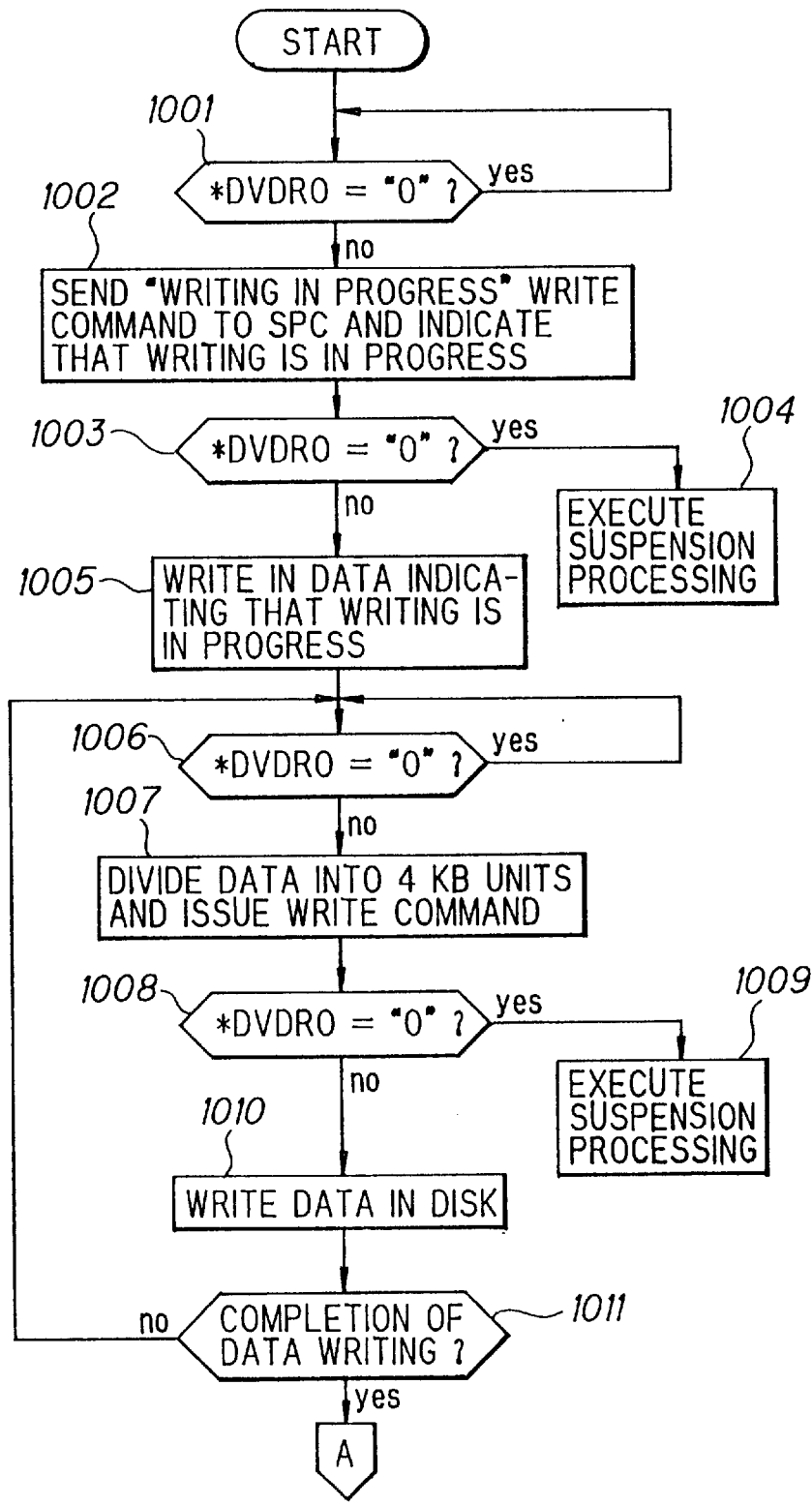
FIG. 35 is a first flowchart of processing for writing data to a hard disk.
Figure 36:
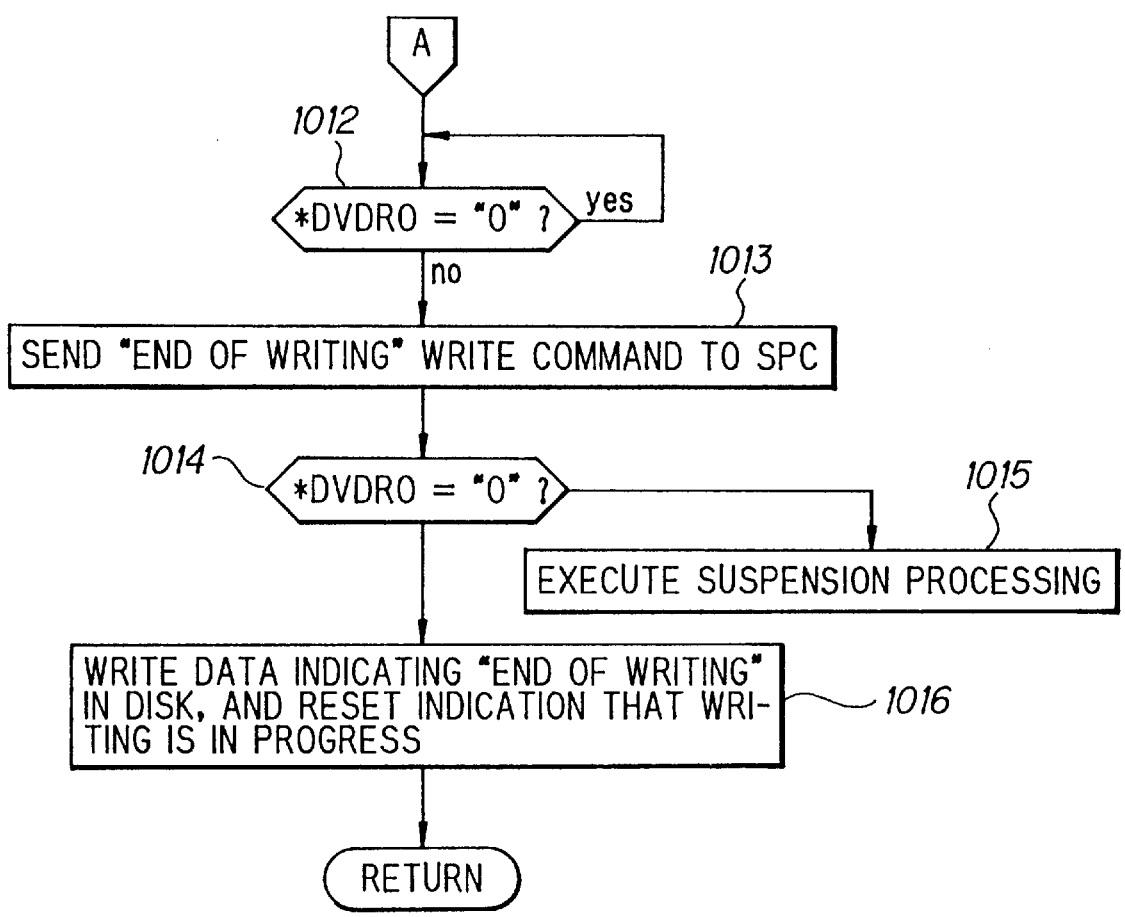
FIG. 36 is a second flowchart of processing for writing data to a hard disk.

FIGS. 35 and 36 are flowcharts of processing for describing data write processing and power cut-off processing.

When conditions for transferring one character of character-image data from the RAM cache 11b to the disk cache 14b to save the data in the disk cache have been satisfied at the time of printing, the MPU 11a of the control unit 11 checks the content of the register 11q to determine whether a power cut-off has occurred and power cut-off information has been written in the register (i.e., whether the momentary cut-off notifying signal *DVDRO is "0") (step 1001). If the power cut-off information has been written in, the MPU 11a waits until this information is reset. If the cut-off in power lasts for less than 60 msec, processing is resumed from this point onward after power is restored.

If the power cut-off information has not been written in, the MPU 11a sends the disk interface 11c a write command for setting "writing in progress" in the discrimination block 14c of the hard disk 14 and lights the LED 13c on the operator's panel 13 to indicate that writing is in progress (step 1002).

Thereafter, the MPU 11a checks the content of the register 11q to determine whether a power cut-off has occurred and power cut-off information has been written in (step 1003). If this information has been written in, processing is suspended (step 1004). In this case, even though processing is suspended, data indicating "writing in progress" is written in the discrimination block 14c, with the EEC being attached thereto, within the DC-voltage guarantee time. In other words, data indicative of "writing in progress" is written in the hard disk in reliable fashion (step 1005).

When writing of the data in the hard disk ends (step 1005), the MPU 11a checks the content of the register 11q again (step 1006).

If the power cut-off information has been written in the register, the MPU 11a waits until this information is reset.

As a result, if the power cut-off lasts less than 60 msec, processing from this point onward can be resumed following the restoration in power.

If power cut-off information has not been written in the register, the MPU 11a divides the character-image data into fixed-length units of, say, four kilobytes each if the size of the character-image data is 32 kilobytes and sends a command, via the disk interface (SPC) 12c, for writing the first four kilobytes of data in the external storage device 23 (step 107). As a result, the disk controller 14' of the external storage device 23 writes the four kilobytes of data, which have been designated for writing, in the disk cache 14b in units of one block (=256 bytes), which is the unit of access, and attaches EEC (the error-checking code) to the end of each block. It should be noted that four kilobytes is the size of data capable of being written in the hard disk fully within the DC-voltage guarantee time.

Thereafter, the MPU (11a checks the content of the register 11q (step 1008) and suspends processing (step 1009) if it finds that the power cut-off information has been written in the register. In this case, data of four kilobytes is written in the disk cache within the DC-voltage guarantee time.

If a power cut-off has not occurred and the writing of four kilobytes of data in the hard disk ends (step 1010), the MPU 11a checks to see whether the writing of all data of one character has been completed (step 1011). If the answer is "NO", then the MPU 11a repeats processing from step 1006 until a "YES" decision is rendered.

If the writing of all data of one character has been completed, on the other hand, the MPU 11a checks the content of the register 11q (step 1012). If the power cut-off information is found to have been written in the register, then the MPU 11a waits for this information to be reset. As a result, if the power cut-off lasts less than 60 msec, processing from this point onward can be resumed following the restoration in power.

If the power cut-off information is found not to have been written in the register, then the MPU 11a sends the disk interface 11c a write command for setting "end of writing" to the discrimination block 14c of the hard disk 14 (step 1013).

Thereafter, the MPU 11a checks the content of the register 11q (step 1014) and suspends processing (step 1015) if it finds that the power cut-off information has been written in the register. If the MPU 11a finds that this information has not been written in the register, the MPU 11a writes the data indicating "end of writing" in the discrimination block 14c and resets the indication that writing is in progress (step 1016). A transition is made to ordinary processing after the completion of the writing operation.

If, when power is re-introduced, the initialization processing shown in FIG. 32 is performed and the discrimination block indicates that writing is in progress, then the result of processing (the write data) executed at the time of the power cut-off is not used.

Though a case has been described in which the invention is applied to a printer apparatus, the invention is not limited to such an apparatus.

Further, though a case has been described in which the invention is applied to a hard disk, the invention is not limited to a hard disk but can be applied also to a case in which data is written in a memory unit such as a floppy disk or memory card.

In accordance with the third embodiment, the arrangement is such that one access unit (one block unit) of data is written in a hard disk by an interrupt resulting from a cut-off in an AC power supply, after which the writing operation is terminated. As a result, data can be written in with the ECC attached thereto in reliable fashion so that a read error will not occur when reading a physical sector after the introduction of power. This makes it possible to protect the physical sector.

Further, before the external storage device is instructed via an interface to write in data of the prescribed length, a control unit sets information indicating "writing in progress" in a prescribed storage area of the external storage device. After writing of the data of the prescribed length ends, the control unit sets information indicating "end of writing" in this storage area. Then, when power is re-introduced after a power cut-off, the control unit checks the information in the storage area and, if "writing in progress" is found, executes prescribed initialization processing by judging that a power cut-off occurred while writing was in progress. As a result of this arrangement, loss of data can be held to a minimum. For example, even if a power failure occurs while a character pattern is in the process of being written in a hard disk, the loss can be limited to one character pattern. Moreover, the management table can be maintained in the correct state so that re-installation and a recovery operation need not be performed.

Furthermore, the arrangement is such that the content of a register in which power cut-off information is written is read and power cut-off processing executed by firmware. As a result, a check is made prior to the instruction for writing the data of the prescribed length. If a power cut-off is found to have occurred, writing is not commanded and the controller waits until the power supply returns to a normal state. Thus, when the power supply assumes a normal state as in the case of a momentary interruption in power, subsequent processing can be resumed immediately.

Furthermore, let DL represent the length of data written in the external storage device within the DC-voltage guarantee time. Since the data length designated by the control unit for being written in the external storage device is made less than DL, the designated data can be written with the ECC attached thereto in reliable fashion before the DC voltage drops. This makes it possible to protect the physical sector (i.e., to assure that a read error will not occur in the physical sector).

(D) Fourth Embodiment

The fourth embodiment relates to power cut-of control when the power-supply switch is turned off in a printer apparatus or the like.

(a) Background

Personal computers, word processors, facsimile machines and printers are provided with a power-supply unit for converting an AC voltage of 100 V into a DC voltage of a prescribed value and supplying the DC voltage to a control unit, memory unit, etc.

Figure 37:
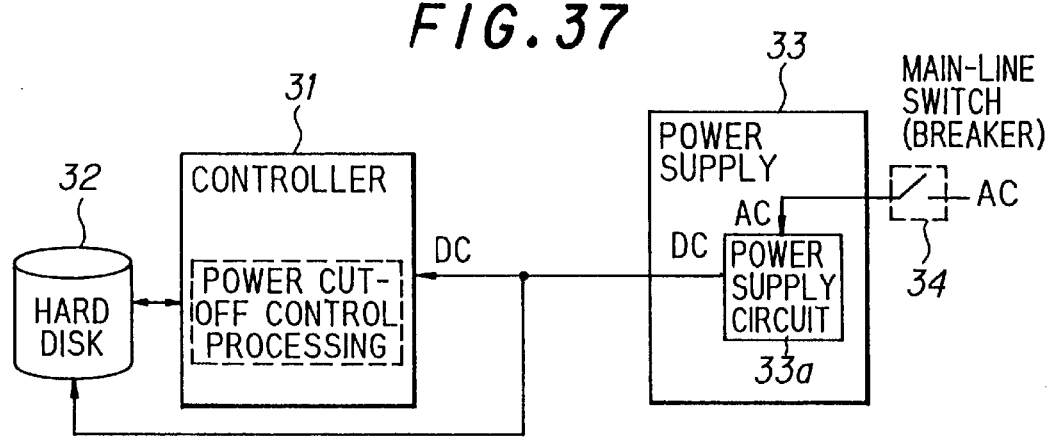
FIG. 37 is a block diagram of conventional first power-supply control and is useful in describing the background of a fourth embodiment.

FIG. 37 is a block diagram for describing power-supply control in the prior art. Numeral 31 denotes a controller constituted by a microcomputer, 32 an external storage device such as a hard disk, 33 a power-supply unit having a power-supply circuit 33a, to which an AC voltage of 100 AC is applied, for generating prescribed DC voltages (e.g., +5 V, +12 V) and applying these DC voltages to the controller 31 and external storage device 32, and 34 a main-line switch (breaker) for making and breaking an AC line. In a case where the DC voltage is applied to the controller 31 so that the latter may perform control, the main-line switch 34 is closed (turned on) to apply the AC voltage of 100 V to the power-supply circuit 33a. As a result, the power-supply circuit 33a applies the DC voltage to the controller 31 so that the latter is capable of performing control. If the input of DC voltage to the controller 31 is terminated to end control, the main-line switch 34 is opened (turned off).

Figure 38:
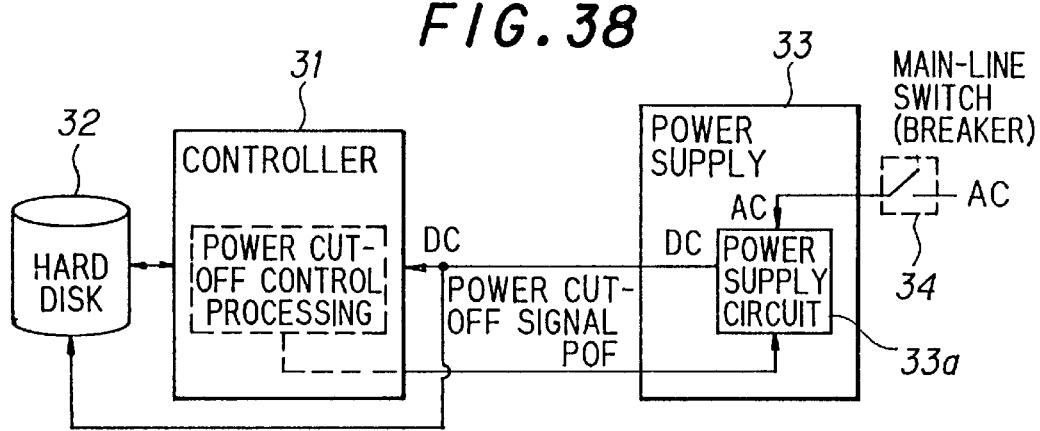
FIG. 38 is a block diagram of conventional second power-supply control and is useful in describing the background of a fourth embodiment.

FIG. 38 is a different block diagram for describing power-supply control in the prior art. Portions identical with those shown in FIG. 37 are designated by like reference characters. This arrangement differs from that of FIG. 37 in the introduction and cut-off of power using the main-line switch 34. Another difference is that a power cut-off signal POF is transmitted from he controller 31 to the power-supply unit 33 to enable the power supply to be cut off. For example, when cut-off of the power supply is commanded by a keyboard (not shown), the controller 31 performs power cut-off control processing to apply the power cut-off signal POF to the power-supply unit 33 and perform power cut-off.

Figure 39:
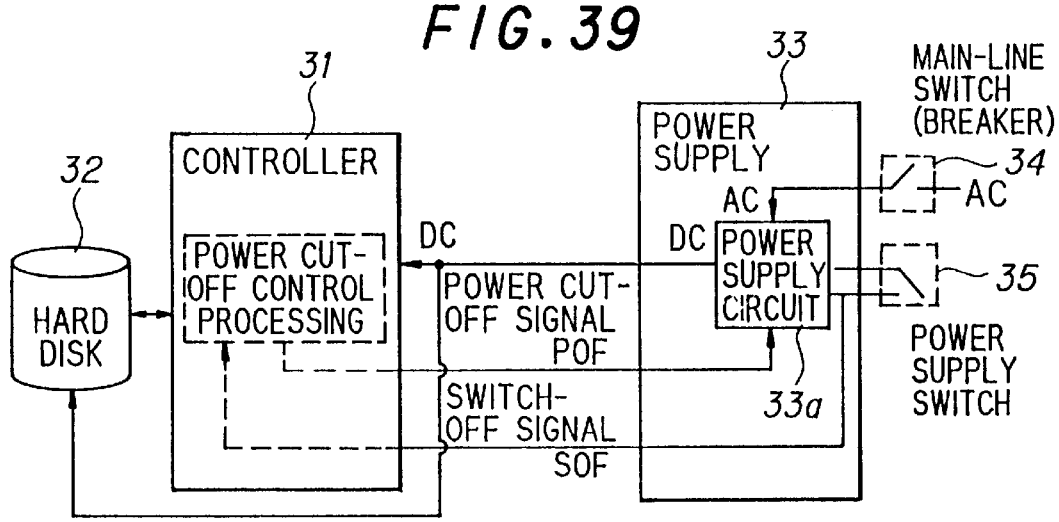
FIG. 39 is a block diagram of conventional third power-supply control and is useful in describing the background of a fourth embodiment.

FIG. 39 is a still another block diagram for describing power-supply control in the prior art. Portions identical with those shown in FIG. 37 are designated by like reference characters. This arrangement differs from that of FIG. 37 in that a power-supply switch 35 is provided on the side of the power-supply unit and is turned on and off to control the introduction and cut-off of power. More specifically, when the power-supply switch 35 is turned on (it is assumed here that the main-line switch is on), the power-supply circuit 33a immediately outputs DC voltage to the controller 31. When the power-supply switch 35 is turned off, the power-supply circuit 33a immediately cuts off DC voltage and outputs a switch-OFF signal SOF to the controller 31. Upon receiving the switch-OFF signal SOF, the controller 31 performs control processing for power cut-off (for example, the processing whose execution is in progress) and then sends the power cut-off signal POF to the power-supply unit 33, in response to which the power-supply circuit 33a effects cut-off of the power supply.

The arrangements of FIGS. 37 and 38 are disadvantageous in that if the power supply is cut off by accidentally operating the main-line switch 34 while the controller 31 is in the process of writing data in an external storage device such as a hard disk or floppy disk, a correct writing operation cannot be performed (i.e., writing ends in the middle of one sector) and an error is produced in the external storage device the next time power is introduced.

With the arrangement of FIG. 39, the power-supply switch 35 is provided so that the operator cuts off and introduces power using solely the switch 35 without and not the main-line switch 34. Accordingly, since the power supply is cut off after control processing for power cut-off is executed, the problems encountered in the arrangements of FIGS. 37 and 38 are reduced. However, if the control unit 31 develops an abnormality when the power supply is cut off, the power cut-off signal POF cannot be sent to the power-supply circuit 33a and it will no longer be possible to cut off power.

(b) General Description of Fourth Embodiment

Figure 40:
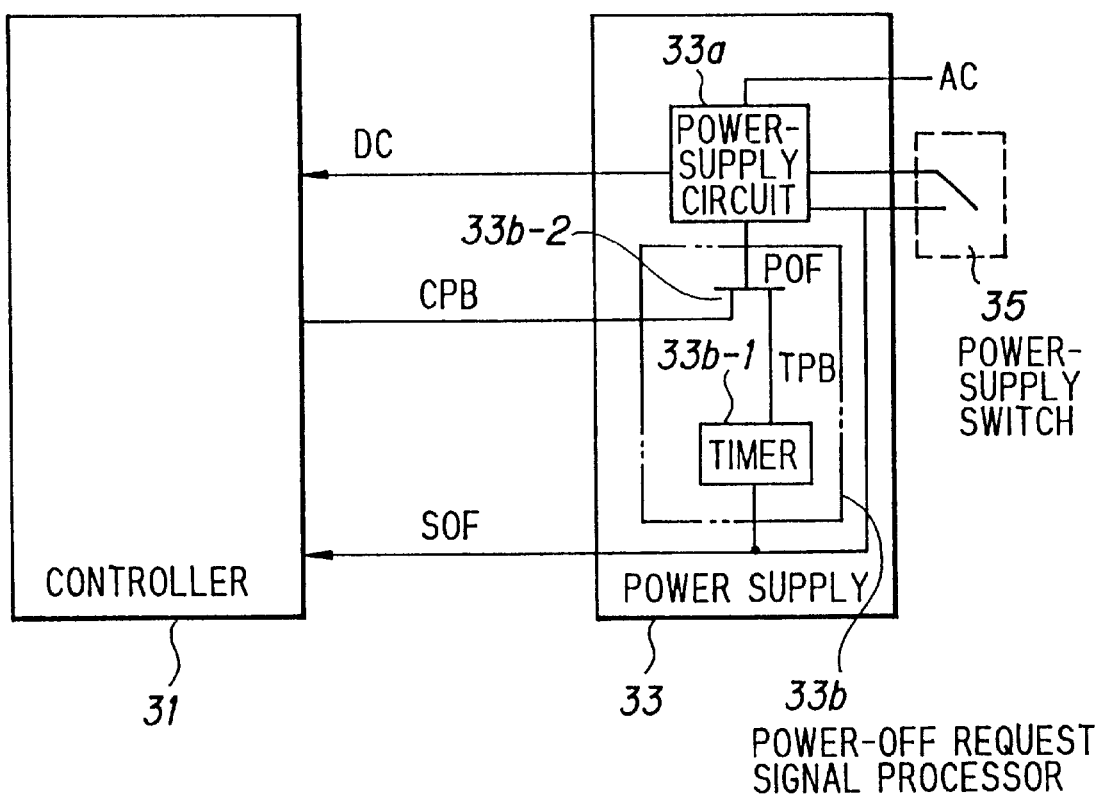
FIG. 40 is a block diagram of the fourth embodiment.

FIG. 40 is a block diagram for describing the fourth embodiment of the present invention.

Numeral 31 denotes the controller constituted by a microcomputer, 33 the power-supply unit having a power-supply circuit 33a, to which an AC voltage of 100 AC is applied, for generating a prescribed DC voltage and applying the DC voltages to the controller 31 and a power-off request signal generating unit 33b for outputting power-off request signals (CPB, TPB) (1) at the end of power cut-off preparation processing by the control unit or (2) upon elapse of a prescribed time period following turn-off of the power-supply switch, after the power-supply switch has been turned off. Further, numeral 35 denotes the power-supply switch, 33b-1 a timer and 33b-2 an OR gate.

When the power-supply switch 35 has been turned off, the power-supply unit 33 inputs the switch-OFF signal SOF to the control unit 31. On the basis of the switch-OFF signal SOF, the control unit 31 executes prescribed power cut-off preparation processing and then outputs the power cut-off signal CPB. As a result, the power-off request signal generating unit 33b inputs the power-off request signal POF to the power-supply circuit 33a to cut off the power supply. The timer 33b-1 clocks elapsed time from generation of the switch-OFF signal SOF and outputs the power cut-off signal TPB when elapsed time attains a predetermined time. As a result, the power-off request signal generating unit 33b inputs the power-off request signal POF to the power-supply circuit 33a to cut off the power supply.

Thus, even when the power-supply switch is turned off, the power supply is not cut off immediately. Rather, the power supply is cut off after power cut-off preparation processing (e.g., data-write processing currently being executed) ends. This means that even if the power-supply switch is turned off inadvertently by the operator while processing is in progress, an error will not occur the next time power is introduced. Further, even if the control unit 31 develops an abnormality and becomes incapable of outputting the power cut-off signal CPB, the power supply can be cut off with assurance after a prescribed period of time.

Further, when the power-supply switch is turned off, a power cut-off masking signal PBM(refer to FIG. 45) is outputted to invalidate the power cut-off signal TPB produced (by the timer) when time elapses. At the completion of the prescribed power cut-off preparation processing, the power cut-off signal CPB is outputted to cut off the power supply. In accordance with this expedient, it can be so arranged that power will not be cut off even if the elapsed time attains the set time before power cut-off preparation processing ends. Accordingly, even if power cut-off preparation processing takes a long period of time, the power supply can be cut off after the processing is executed in its entirety.

Furthermore, if processing for preserving information (format-setting information, abnormal-status information) desired to be maintained the next time the power-supply switch is turned on is executed as the power cut-off preparation processing, the result will be as if introduction of power has continued without interruption.

In addition, the controller sets processing-start information before processing starts, sets processing-end information after processing ends and subdivides processing into a plurality of processing operations in which difficulties do not arise. Before the execution of each processing operation resulting from subdivision, the controller determines whether the power-switch OFF signal has been produced. If this signal has been produced, the controller outputs the power-off request signal. When power is re-introduced, it is determined whether the processing-start information has been set. If this information has been set, the controller judges that the power-supply switch has been turned off during processing and invalidates the above-described processing. Thus, even if the power-supply switch is turned off during the execution of lengthy processing, the power supply can be cut off promptly.

(c) Configuration of Fourth Embodiment Overall Configuration

Figure 41:
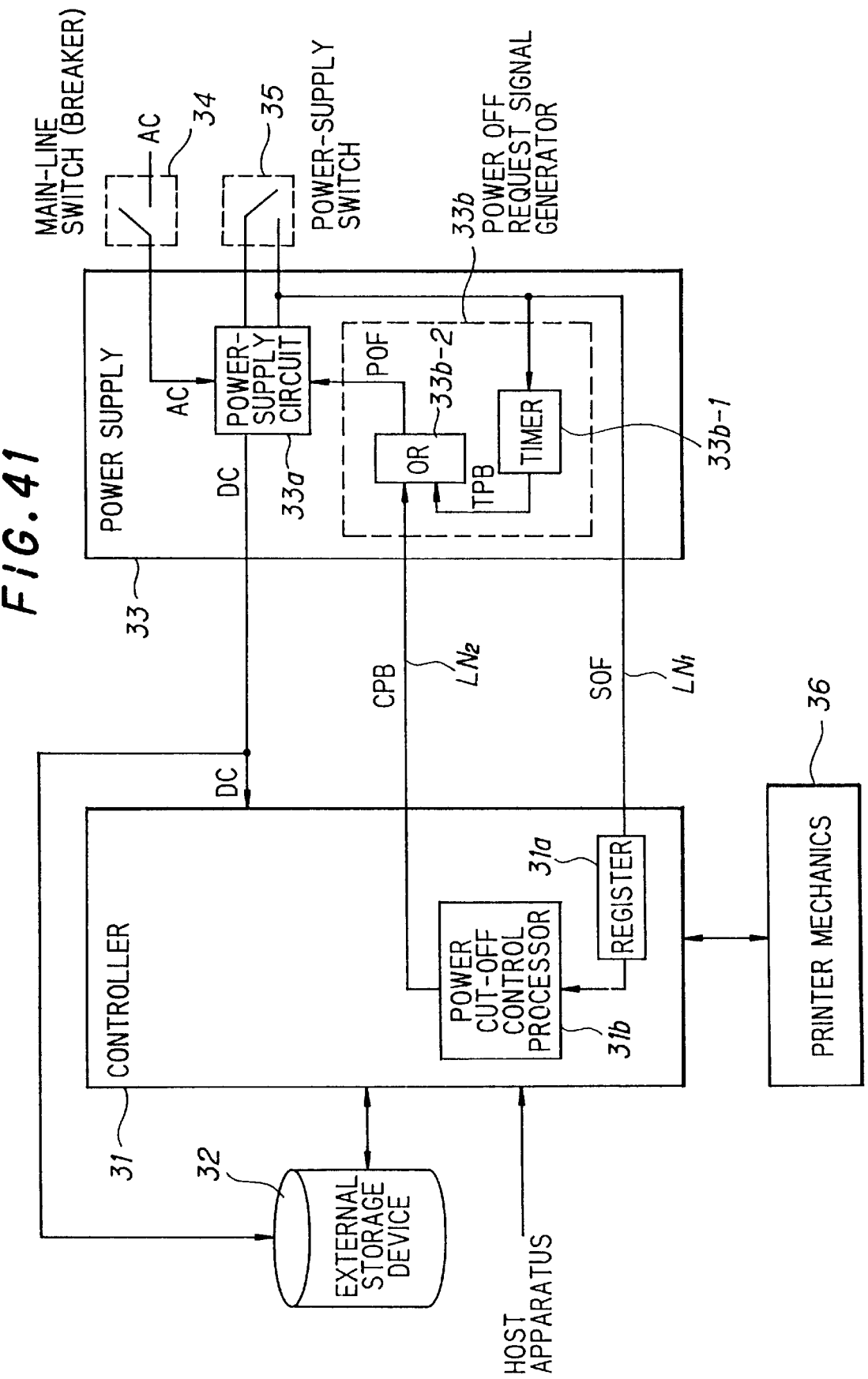
FIG. 41 is a first block diagram of the fourth embodiment.

FIG. 41 is a block diagram illustrating the construction of the fourth embodiment. Numeral 31 denotes the controller constituted by a microcomputer, 32 the external storage device such as a hard disk, 33 the power-supply unit for supplying DC voltages to the controller 31 and external storage device 32, 34 the main-line switch (breaker) for making and breaking an AC line, 35 the power-supply switch for turning on and off the supply of DC voltage when an AC voltage of 100 V is introduced to the power-supply unit from the AC line, and 36 a portion, such as the mechanical components (inclusive of a mechanical controller) of the printer, controlled by the controller 31.

Controller

The controller 31 (which corresponds to the control unit 11 of the first through third embodiments) is constituted by a microcomputer and is adapted so as to execute various types of processing in accordance with programs (firmware). The controller 31 exchanges signals (switch-OFF signal SOF, power cut-off signal CPB), which are necessary for power-supply control, with the power-supply unit 33 via an input/output port (not shown), and exchanges data with the external storage device 32 and host apparatus via an interface. Numeral 31a denotes a register for storing the switch-OFF signal SOF, which indicates the on/off status of the power-supply switch 35, sent from the power-supply unit 33, and numeral 31b designates a power cut-off processing function, written as a power cut-off control processor, among the various control operations performed by firmware.

Power-Supply Unit

The power supply unit 33 has the power-supply circuit 33a, to which an AC voltage of 100 AC is applied, for generating prescribed DC voltages and applying these DC voltages to the controller 31 and external storage device 32, and a power-off request signal generating unit 33b for outputting the power-off request signal POF. The unit 33b, which has the timer 33b-1 and the OR gate 33b-2, outputs the power-off request signal POF to the power-supply circuit 33a (1) when the controller 31 outputs the power cut-off signal CPB at the end of power cut-off preparation processing or (2) when the timer outputs the power cut-off signal TPB upon elapse of a prescribed time T from opening of the power-supply switch. It should be noted that a time period longer than that of the power cut-off preparation processing by the controller 31 is set as the time T.

Overall Operation

If the power-supply switch 35 is turned on with the main-line switch 34 in the closed state so that an AC voltage of 100 V is being applied to the power-supply circuit 33a, the power-supply circuit 33a immediately supplies the controller 31 and the external storage device 32 with DC voltage.

When the power-supply switch 35 is turned off while the DC voltage is being supplied, the power-supply unit 33 inputs the switch-OFF signal SOF to the controller 31 via a cable LN1 and writes power-switch OFF information in the register 31a. Further, the switch-OFF signal SOF of the power-supply switch 35 enters the timer 33b-1, which clocks the time that elapses from the moment the power-supply switch is turned off.

When power-switch OFF information has been written in the register 31a, the controller 31 performs the prescribed power cut-off preparation processing and then outputs the power cut-off signal CPB to the power-off request signal generating unit 33b via a cable LN2. When the signal CPB enters, the power-off request signal generating unit 33b inputs the power-off request signal POF to the power-supply circuit 33a. The latter cuts off the supply of DC voltage as soon as the power-off request signal POF enters.

Figure 42:
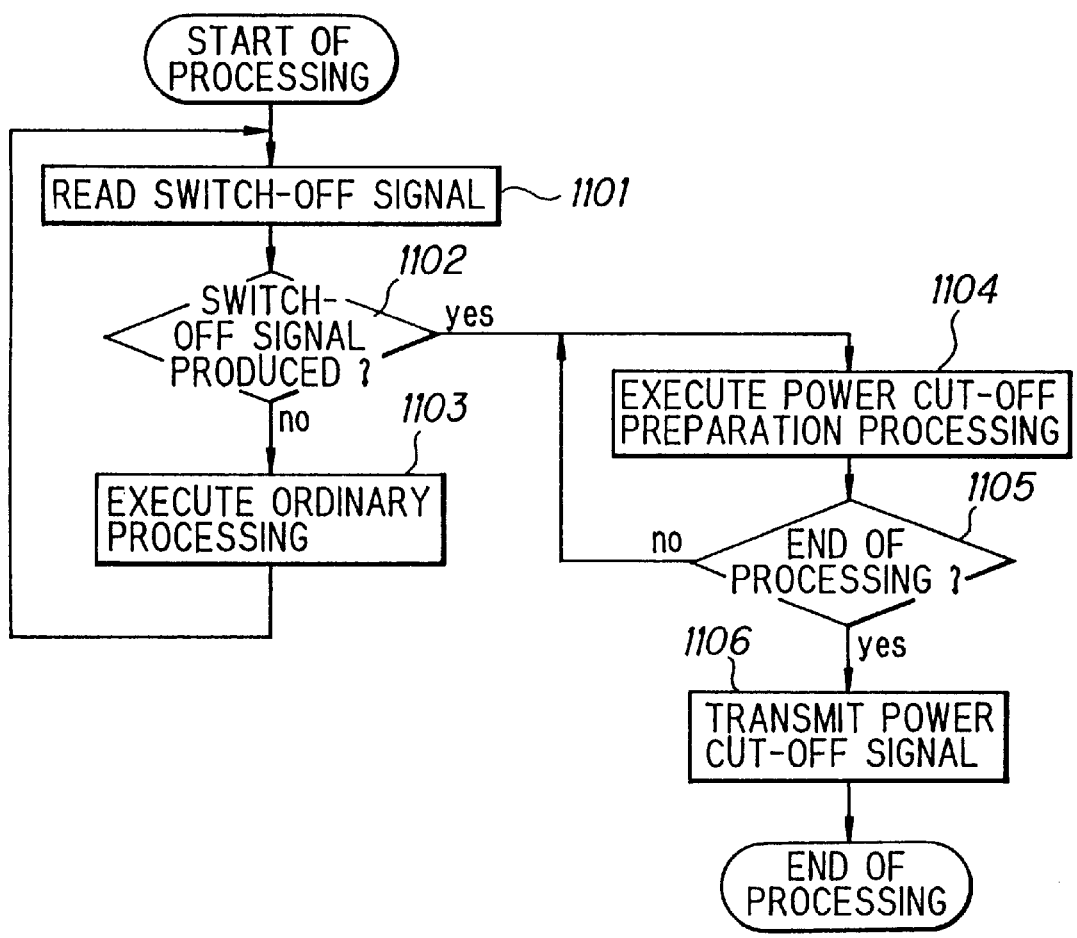
FIG. 42 is a flowchart illustrating processing for generating a power-supply cut-off signal.

FIG. 42 is a flowchart illustrating the processing executed by the controller 31 for generating the power cut-off signal.

Decision processing for deciding that the content of the register 31a has been read and indicates that the power-supply switch 35 has been turned off is inserted at a suitable location in the program (steps 1101, 1102). If the power-supply switch has not been turned off, ordinary processing usually performed by the controller is performed (step 1103). However, if the power-supply switch 35 is found to be off at the decision step 1102, power cut-off preparation processing is executed (step 1104). For example, the processing that was being executed when the power-supply switch was turned off (e.g., processing for writing data in the hard disk 32, processing for printing using a printer) is executed. If the data writing operation or printing operation ends and the power cut-off preparation processing is concluded (step 1105), the power cut-off signal CPB is outputted to the power-supply unit 33 and processing is terminated (step 1106).

The foregoing is for a case in which the controller 31 and cables are normal. However, if the hardware or firmware of the controller 31 is defective or the cables LN1, LN2 develop a fault, the power cut-off signal CPB can no longer be outputted by the controller 31. In such case, the power cut-off signal TPB is outputted by the timer 33b-1. More specifically, the timer 33b-1 clocks the time that has elapsed from generation of the switch-OFF signal SOF and outputs the power cut-off signal TPB when the elapsed time has attained a predetermined time. As a result, the power-off request signal generating unit 33b feeds the power-off request signal POF into the power-supply circuit 33a via the OR gate 33b-2, whereby the power supply is cut off.

Thus, even though the power-supply switch 35 is turned off, the power supply is not cut off immediately but is cut off after the end of power cut-off preparation processing (e.g., data-write processing currently being executed). As a result, even if the power-supply switch is turned off accidentally by the operator or some other person during the execution of processing, an error will not occur the next time power is introduced. Further, even if the controller 31 develops an abnormality and the power cut-off signal CPB can no longer be outputted, the power cut-off signal TPB can be outputted by the timer 33b-1 after a prescribed period of time. This makes it possible to cut off the power supply in a reliable manner.

Example of Power Cut-Off Preparation Processing

In FIG. 42, processing (such as processing for writing data in the hard disk) performed when the power-supply switch 35 is off is executed as the power cut-off preparation processing. However, power cut-off preparation processing is not limited to such case. FIGS. 43(a)–43(b) illustrate an example of a case in which the power cut-off preparation processing involves preserving information desired to be maintained the next time the power-supply switch is turned on. The processing steps of this flowchart identical with those shown in FIG. 42 are designated by like step numbers.

When the power-supply switch 35 is turned off (YES at step 1102), the information desired to be maintained, such as a printing format, printing conditions or the states of various components, are preserved in a non-volatile memory such as a hard disk (steps 1104', 1105). After this information has been preserved, the power cut-off signal TPB is outputted and the power supply is cut off (step 1106).

When the power-supply switch 35 is turned on, the preserved information is read out of the non-volatile memory and restored in a RAM (step 1111), after which ordinary processing is executed using the restored information (step 1112).

Thus, when the power-supply switch is turned off, the information (format setting information, abnormality-status information, etc.) desired to be maintained is preserved. In other words, it is as if introduction of power has continued without interruption. By adopting this arrangement, mismatching will not develop between the apparatus and the host even if the apparatus frequently has its power supply turned on and off repeatedly in order to conserve power. For example, in the case of a personal computer and printer, the personal computer, which is the host, instructs the printer of a certain setting (e.g., a line-feed quantity of ⅛ inch), and the printer receives this instruction normally. When the power-supply switch 35 is turned off, the setting data is preserved in a non-volatile memory such as a hard disk and then the power supply is cut off. When the power-supply switch 35 of the printer is turned on, the preserved setting data is restored and ordinary processing is executed.

Figure 43:
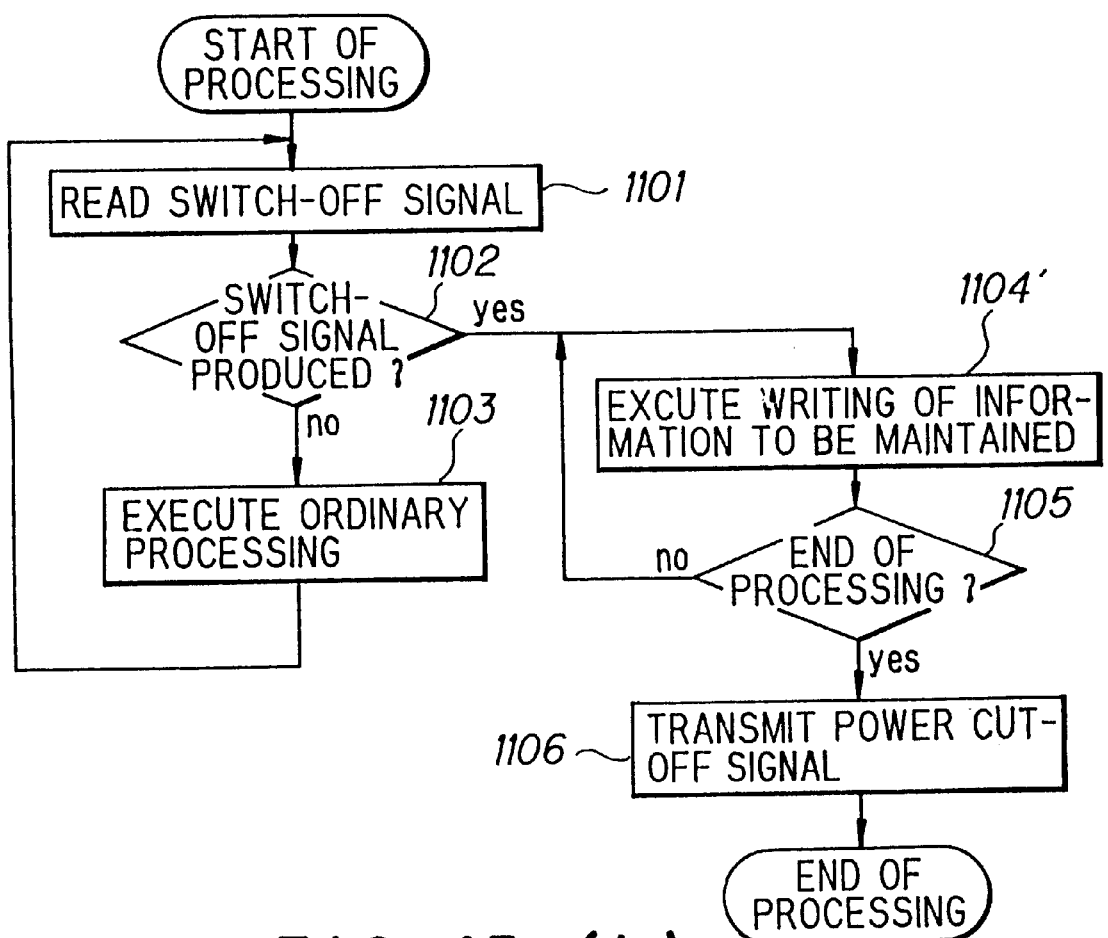
FIGS. 43(a)–43(b) are another flowchart illustrating processing for generating a power-supply cut-off signal.
Figure 43:
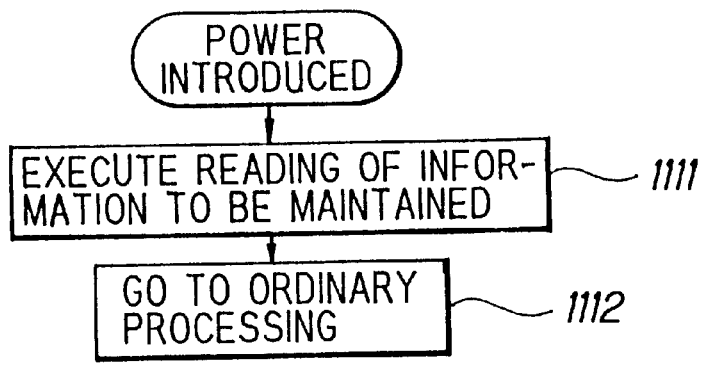

It should be noted that the processing step 1104' of FIG. 43(*a*) for writing the information desired to be maintained may be placed immediately after the power cut-off preparation processing step 1104 of FIG. 42.

(c) Other Configuration of Fourth Embodiment

Figure 44:
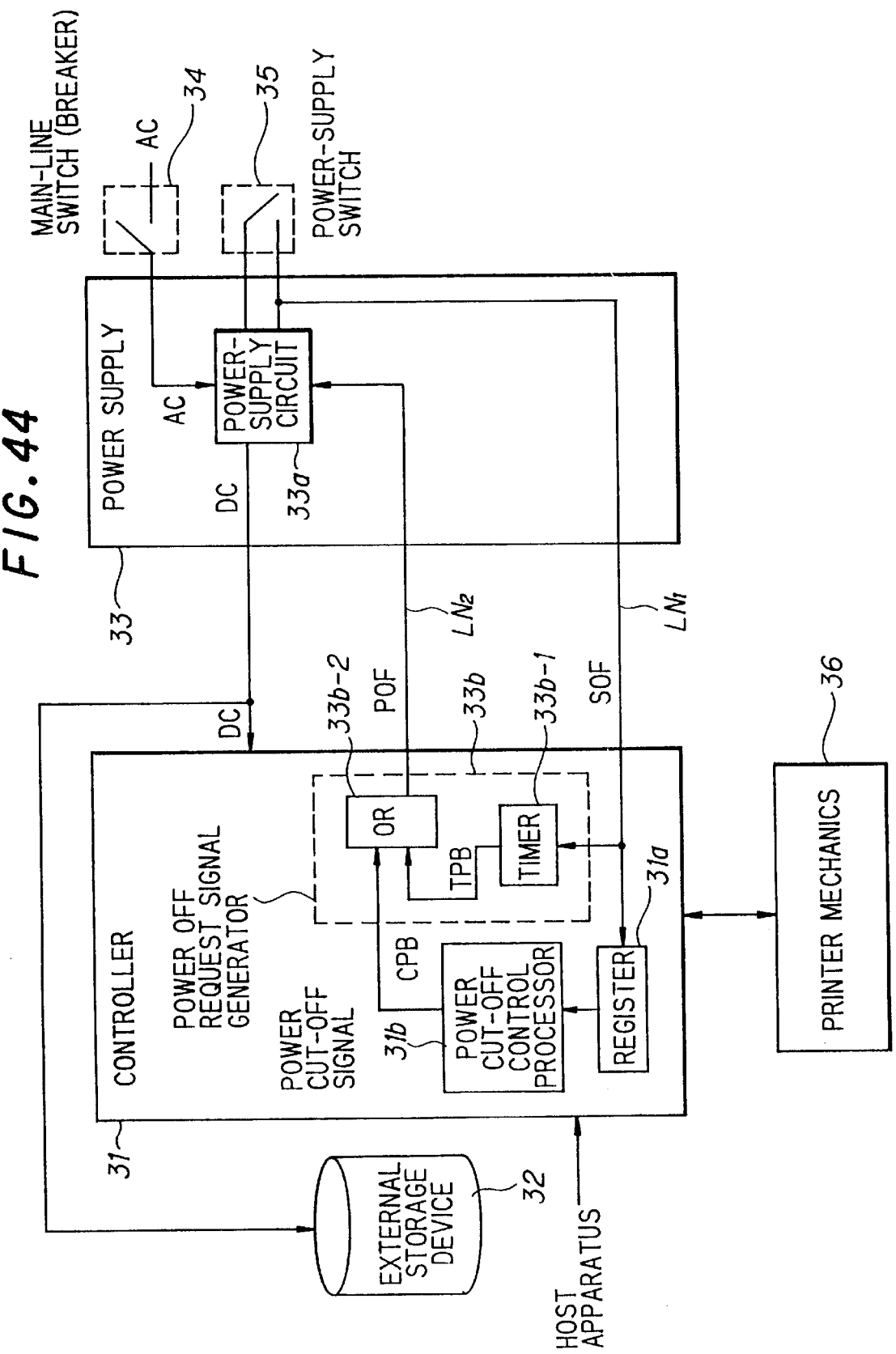
FIG. 44 is a second block diagram of the fourth embodiment.

FIG. 44 is a block diagram illustrating another configuration according to the fourth embodiment. Portions identical with those of the embodiment shown in FIG. 41 are designated by like reference characters. This arrangement differs from that of the embodiment of FIG. 41 in that the power-off request generating unit 33*b* is provided within the controller 31 and the power-off request signal POF enters the power-supply circuit 33*a* via cable LN2. All other aspects of this arrangement are the same. In FIG. 44, the power-supply unit 33 has the same construction as the conventional power-supply unit. This is advantageous in that it is unnecessary to design the power-supply unit anew.

(d) Other Configuration of Fourth Embodiment

Figure 45:
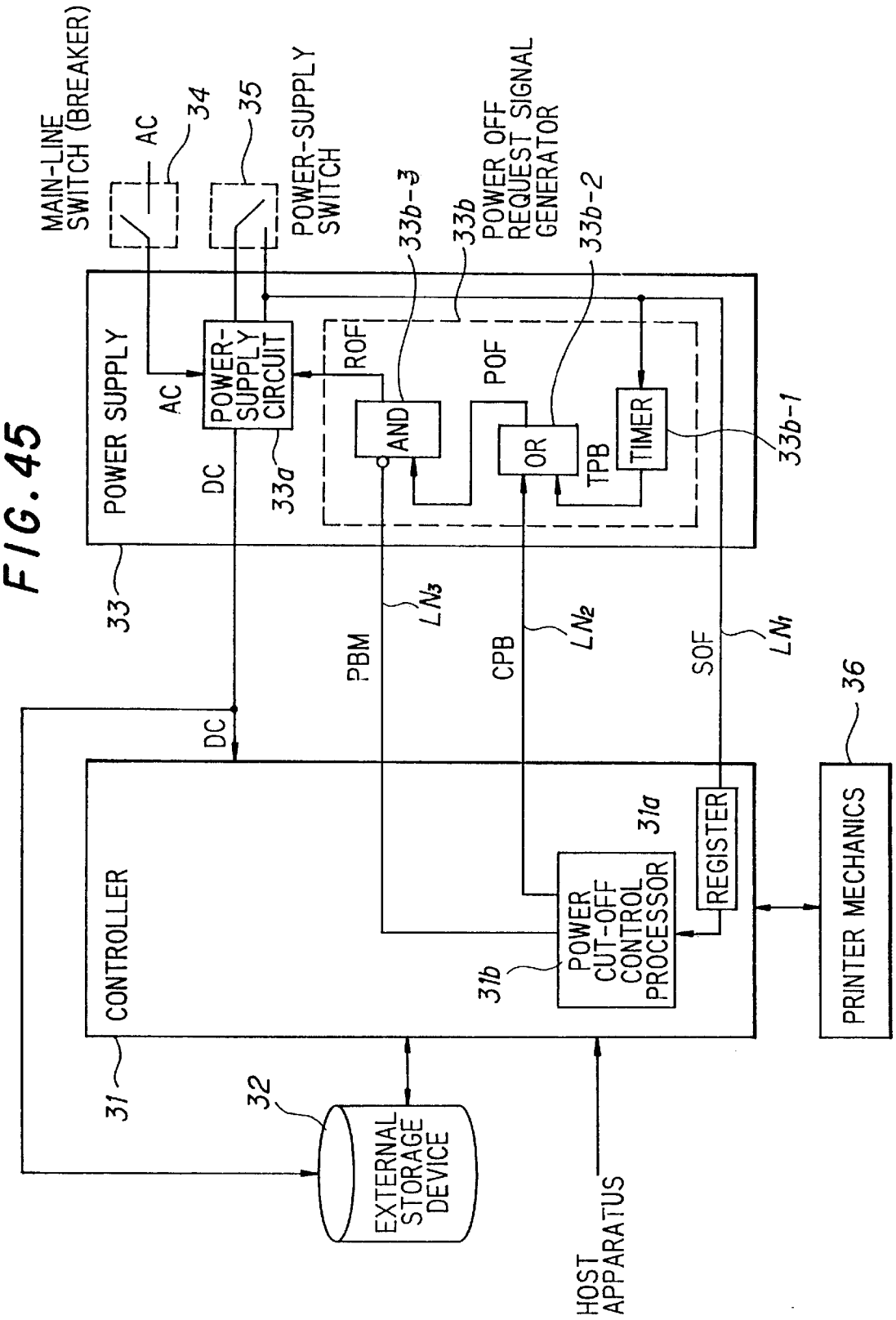
FIG. 45 is a third block diagram of the fourth embodiment.

FIG. 45 is a block diagram illustrating another configuration according to the fourth embodiment. Portions identical with those of the embodiment shown in FIG. 41 are designated by like reference characters. This arrangement differs from that of the embodiment of FIG. 41 in that:

- the power cut-off control processor 31*b* outputs the power cut-off signal CPB as well as a power cut-off masking signal PBM for masking (invalidating) the power cut-off signal CPB based upon the timer 33*b*-1; and
- the power-off request signal generator 33*b* is provided with an AND gate 33*b*-3 in which the power cut-off signal TPB is invalidated by the power cut-off masking signal PBM.

More specifically, the power cut-off masking signal PMB is outputted when the power-supply switch 35 is off, thereby invalidating the power cut-off signal TPB produced (by the timer) when time elapses. The power cut-off masking signal falls after the prescribed power cut-off preparation processing is completed, and the power cut-off signal CPB is outputted to cut off the power supply. In accordance with this expedient, it can be so arranged that if the power cut-off preparation processing executed after the power-supply switch 35 is turned off is lengthy, power cut-off will not be allowed even if the elapsed time attains the set time T before power cut-off preparation processing ends. Accordingly, even if power cut-off preparation processing takes a long period of time, the power supply can be cut off after the processing is executed in its entirety.

Overall Operation

If the power-supply switch 35 is turned on with the main-line switch 34 in the closed state so that an AC voltage of 100 V is being applied to the power-supply circuit 33*a*, the power-supply circuit 33*a* immediately supplies the controller 31 and the external storage device 32 with DC voltage.

When the power-supply switch 35 is turned off while the DC voltage is being supplied, the power-supply unit 33 inputs the switch-OFF signal SOF to the controller 31 via the cable LN1 and writes power-switch OFF information in the register 31*a*. Further, the switch-OFF signal SOF of the power-supply switch 35 enters the timer 33*b*-1, which clocks the time that elapses from the moment the power-supply switch is turned off.

When power-switch OFF information has been written in the register 31*a* and, as a result, the controller 31 detects that the power-supply switch is off, the power cut-off masking signal PBM at the high ("1") level is outputted on cable LN3. As a result, "1" enters an inhibit terminal of the AND gate 33*b*-3 in the power-off request signal generator 33*b*, whereby the AND gate 33*b*-3 is closed. Thereafter, the AND gate remains closed, thereby masking the power cut-off signal TPB outputted by the timer 33*b*-1, until the power cut-off masking signal PBM assumes the low ("0") level.

After the output of the power cut-off masking signal PBM, the controller 31 executes the prescribed power cut-off preparation processing. When this processing ends, the controller 31 sends the power cut-off masking signal PBM to the low ("0") level to cancel the masking operation. The controller 31 then inputs the power cut-off signal CPB to the power-off request signal generator 33*b* via the cable LN2.

The power-off request signal generator 33*b* directs the power cut-off signal CPB through the OR gate 33*b*-2 and gate 33*b*-3 to obtain the power-off request signal POF, which enters the power-supply circuit 33*a*. The latter cuts off supply of DC voltage as soon as the power-off request signal POF enters.

The foregoing is for a case in which the controller 31 and cables are normal. However, if the hardware or firmware of the controller 31 is defective or the cables LN1, LN2 develop a fault, the power cut-off masking signal PBM and power cut-off signal CPB can no longer be outputted by the controller 31. In such case, the power cut-off signal TPB is outputted by the timer 33*b*-1. More specifically, the timer 33*b*-1 clocks the time that has elapsed from generation of the switch-OFF signal SOF and outputs the power cut-off signal TPB when the elapsed time has attained a predetermined time. As a result, the power-off request signal generating unit 33*b* feeds the power-off request signal POF into the power-supply circuit 33*a* via the OR gate 33*b*-2, whereby the power supply is cut off.

Figure 46:
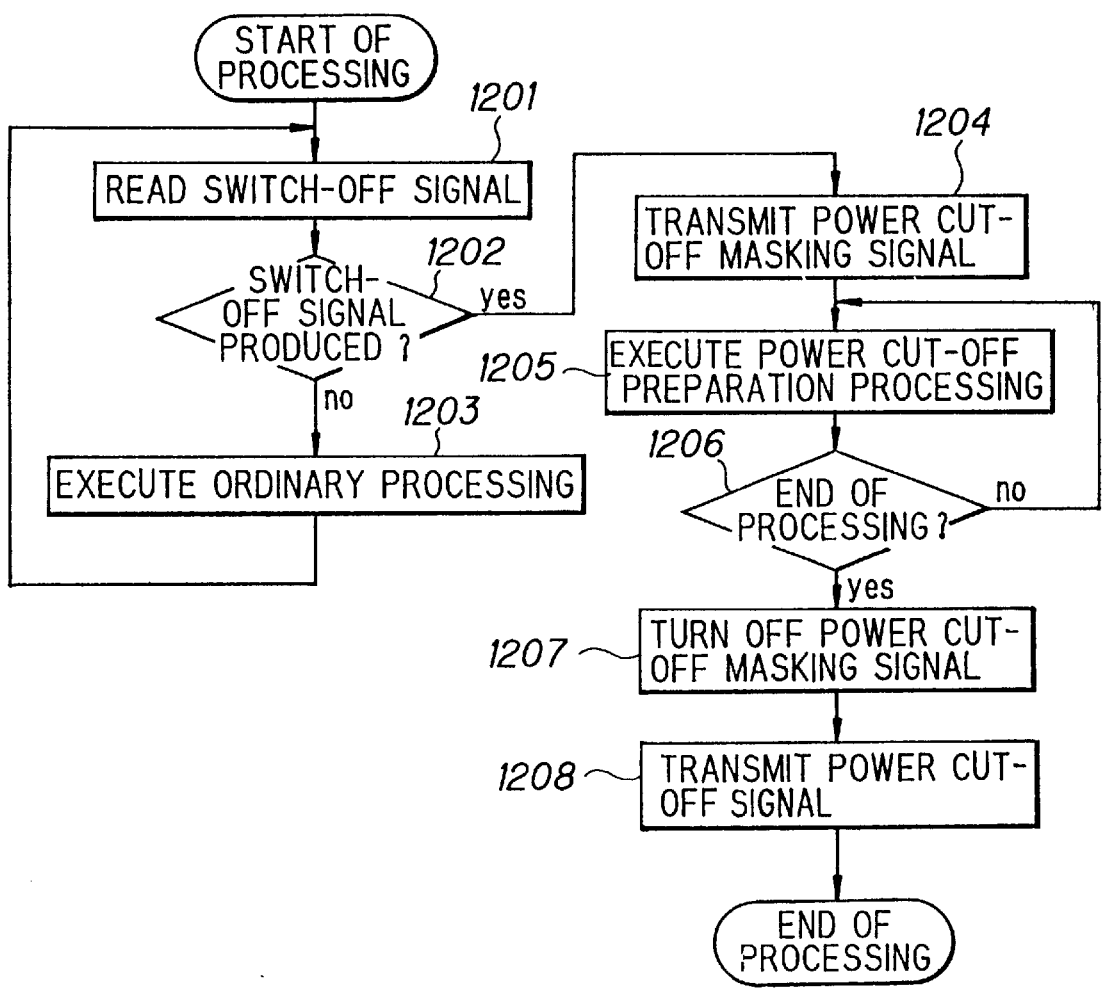
FIG. 46 is a flowchart illustrating processing for generating a power-supply cut-off signal by a controller.

FIG. 46 is a flowchart illustrating the processing for power cut-off control executed by the controller 31.

Decision processing for deciding that the content of the register 31*a* has been read and indicates that the power-supply switch 35 has been turned off is inserted at a suitable location in the program (steps 1201, 1202). If the power-supply switch has not been turned off, ordinary processing usually performed by the controller is performed (step 1203). However, if the power-supply switch 35 is found to be off at the decision step 1202, the power cut-off masking signal PBM is outputted (step 1204). As a result, as mentioned above, the AND gate 33*b*-3 is closed and the power cut-off signal TPB outputted by the timer 33*b*-1 is masked from this point onward until power cut-off masking signal PBM becomes "0".

After the power cut-off masking signal PBM is outputted, the controller 31 executes the prescribed power cut-off preparation processing (steps 1205, 1206). When this processing ends, the controller 31 sends the power cut-off masking signal PBM to the low level ("0") to cancel masking (step 1207), The controller 31 then inputs the power cut-off signal CPB to the power-off request signal generating unit 33*b* (step 1208) so that the power supply is cut off.

It should be noted that the processing of FIG. 46 is for a case in which the power cut-off preparation processing executed after the power-supply switch 35 is turned off is lengthy. However, if the processing of FIG. 46 is for a case in which the power cut-off preparation processing executed after the power-supply switch 35 is turned off is short, an arrangement may be adopted in which processing according to FIG. 42 or 43 is executed without outputting the power cut-off masking signal PBM.

Thus, if the power cut-off preparation processing executed after the power-supply switch 35 is turned off is lengthy, power cut-off will not be allowed even if the elapsed time attains the set time T before power cut-off preparation processing ends. Accordingly, even if power cut-off preparation processing takes a long period of time, the power supply can be cut off after the processing is executed in its entirety. Further, even if an abnormality occurs in the controller 31 so that the power cut-off masking signal PBM and the power cut-off signal CPB can no longer be outputted, the power cut-off signal TPB can be outputted by the timer 33b-1 after a prescribed period of time. This makes it possible to cut off the power supply in reliable fashion.

Other Configuration of Power-Off Request Signal Generating Unit 33b

Figure 47:
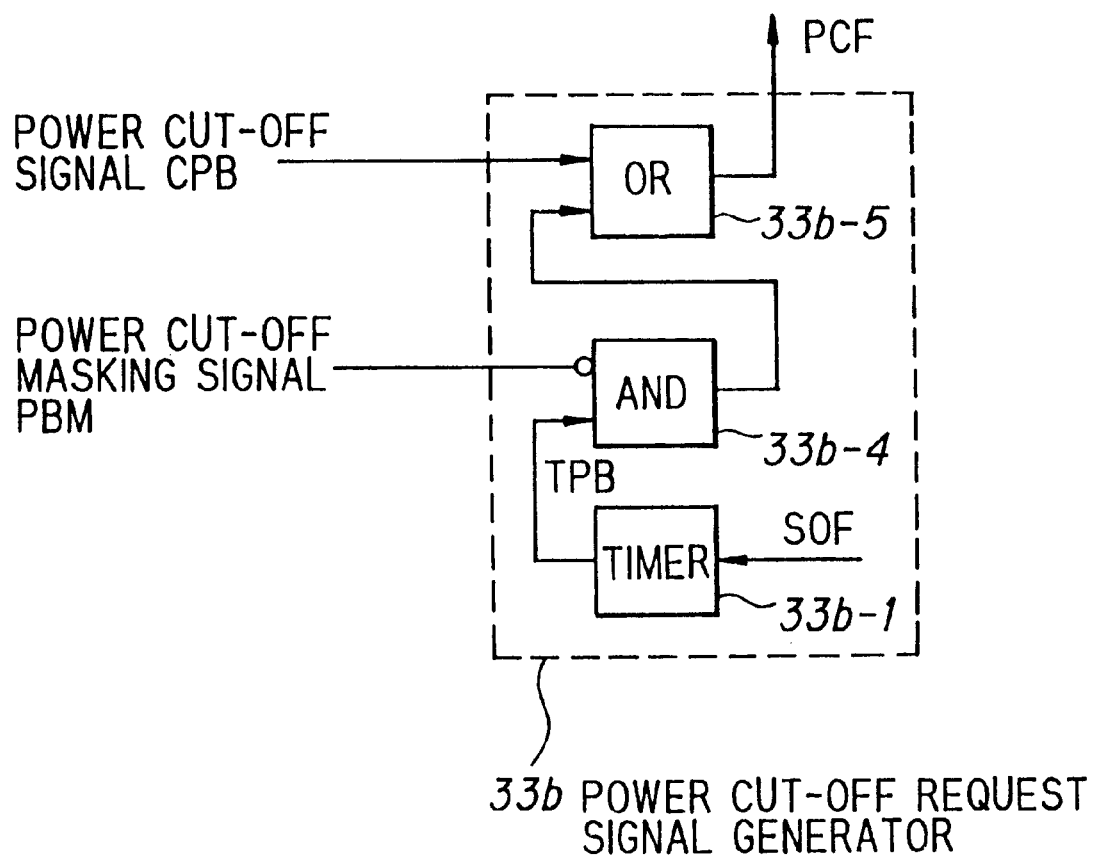
FIG. 47 is another block diagram showing a power-off request signal generator.

FIG. 47 is a block diagram showing the construction of another embodiment of the power-off request signal generating unit 33b. According to this arrangement, the power cut-off signal TPB outputted by the timer 33b-1 is masked (invalidated) by an AND gate 33b-4, an OR gate 33b-5 takes the OR between the output of the AND gate 33b-4 and the power cut-off signal CPB of the control unit 31, the output of the OR gate 33b-5 is adopted as the power cut-off request signal POF and the signal POF is inputted to the power-supply circuit 33a.

(e) Other Configuration of Fourth Embodiment

Figure 48:
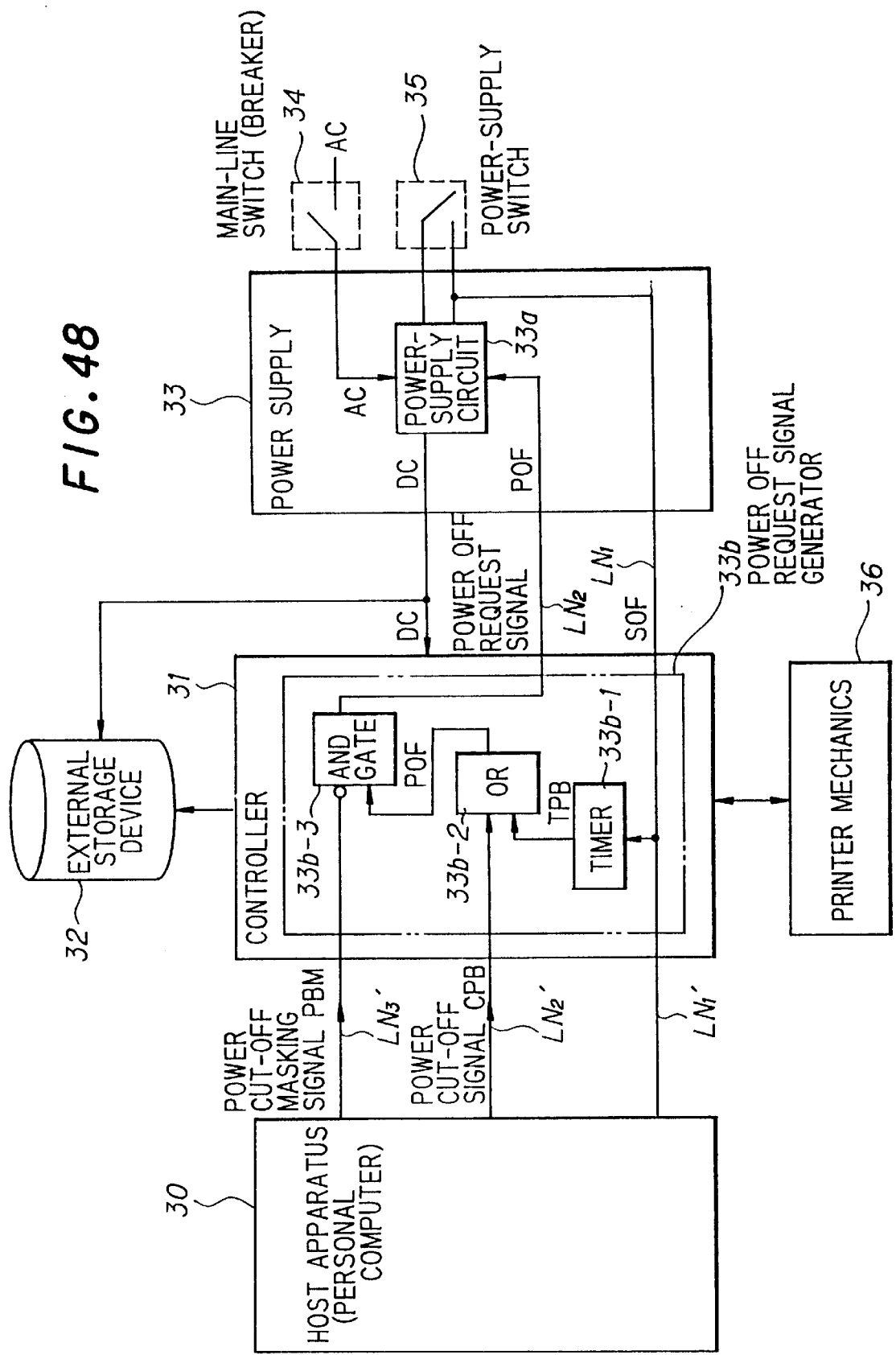
FIG. 48 is a fourth block diagram of the fourth embodiment.

FIG. 48 is a block diagram illustrating another configuration of the fourth embodiment. Portions identical with those of the embodiment shown in FIG. 44 are designated by like reference characters. This arrangement differs from that of the embodiment of FIG. 45 in that:

the power cut-off request signal generating unit 33b is provided within the controller 31, the controller 31 generates the power cut-off request signal POF and inputs this signal to the power-supply circuit 33a; and the power cut-off masking signal PBM and power cut-off signal CPB are outputted to the controller 31 from the host apparatus 30 of the controller 31.

When the power-supply switch 35 of the apparatus (a printer, for example) connected to the personal computer (host apparatus) 30 is turned off, the switch-OFF signal SOF of the power-supply switch 35 is transmitted to the personal computer 30. As a result, the personal computer 30 immediately outputs the power cut-off masking signal PBM to the controller 31 to mask (invalidate) the power cut-off signal TPB produced by the timer 33b-1. Thereafter, the personal computer 30 executes the prescribed power cut-off preparation processing and, when this processing ends, sends the power cut-off masking signal PBM to the low level ("0") to cancel masking. The personal computer 30 then transmits the power cut-off signal TPB to the controller 31 and the power-off request signal generating unit 33b inputs the power-off request signal POF to the power-supply circuit 33a to cut off the power supply.

The foregoing relates to a case in which the personal computer 30, the controller 31 and the cables LN1~LN3' are normal. However, there are also cases in which the personal computer 30 or the like develops an error so that the power cut-off masking signal PBM or power cut-off signal CPB can no longer be delivered to the controller 31. In such cases, the power cut-off signal TPB is outputted by the timer 33b-1 to cut off the power supply. More specifically, the timer 33b-1 clocks elapsed time from the moment the switch-OFF signal SOF is generated and, when the elapsed time attains a predetermined time, outputs the power cut-off signal TPB. As a result, the power-off request signal generating unit 33b inputs the power-off request signal POF to the power-supply circuit 33a via the OR gate 33b-2 and the AND gate 33b-3 to cut off the power supply. Thus, in a case where power-supply control is performed by the host apparatus (personal computer) or the like, the power supply can be cut off reliably if the power-supply switch is turned off, even if the host apparatus such as the personal computer develops a fault.

(f) Other Configuration of Fourth Embodiment

There are cases in which power cut-off preparation processing performed by the controller 31 (see FIG. 45) after the power-supply switch is turned off requires more time than ordinary processing. For example, there is processing in which cache data (character-image data) is written in the disk-cache area of the hard disk 32 from the RAM cache (not shown) within the controller in order to improve performance. If the power-supply switch 35 is turned off during the course of processing for writing the data in the disk cache, a long period of time is required for the power supply to be cut off by the power cut-off signal CPB in the embodiment of FIG. 45. This means that even though the power-supply switch is turned off, the power supply is not cut off immediately. This may strike the operator as being strange and can cause some anxiety.

Figure 49:
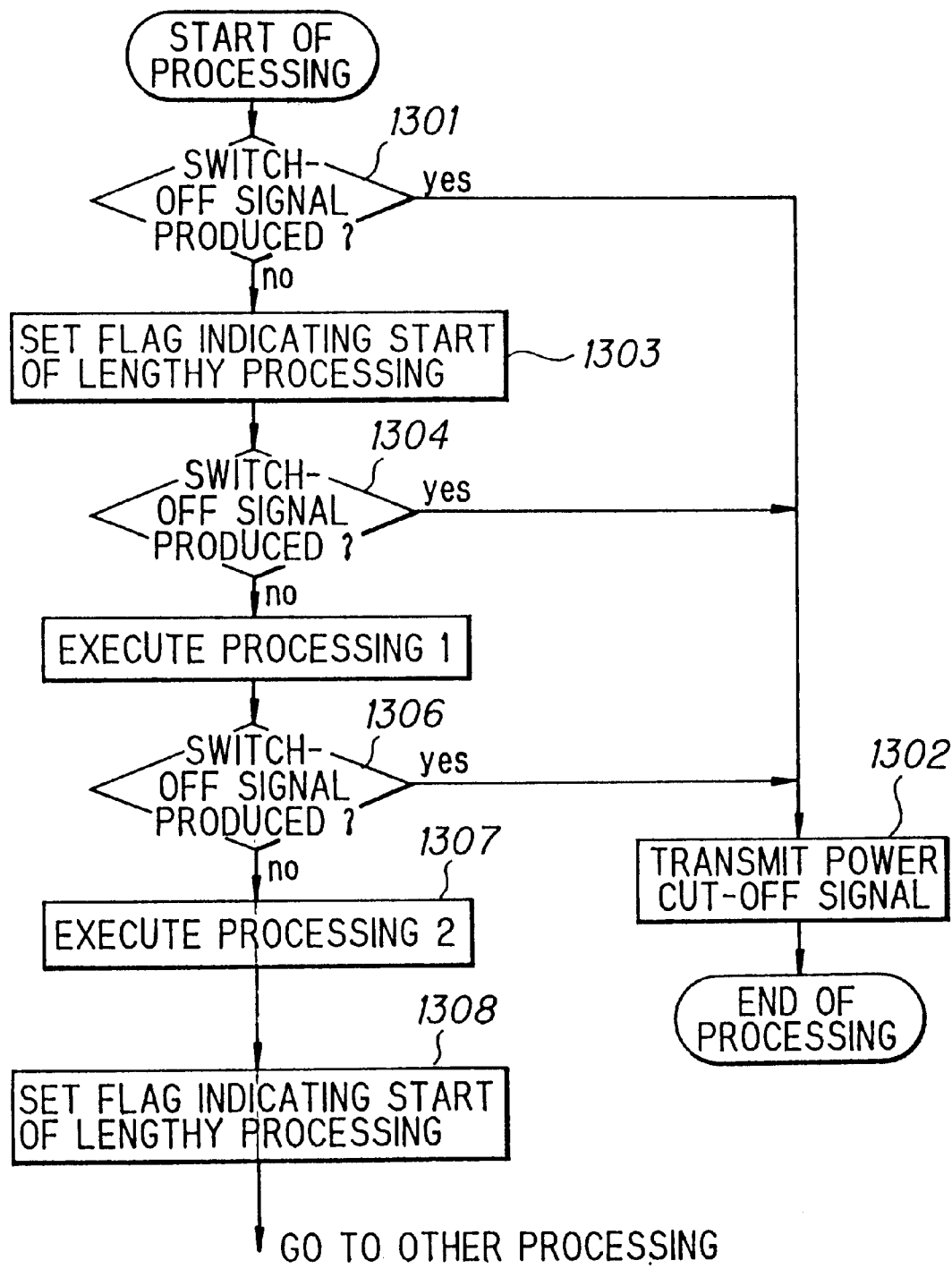
FIG. 49 is a flowchart of control for a case in which processing is executed over a long period of time.
Figure 50:
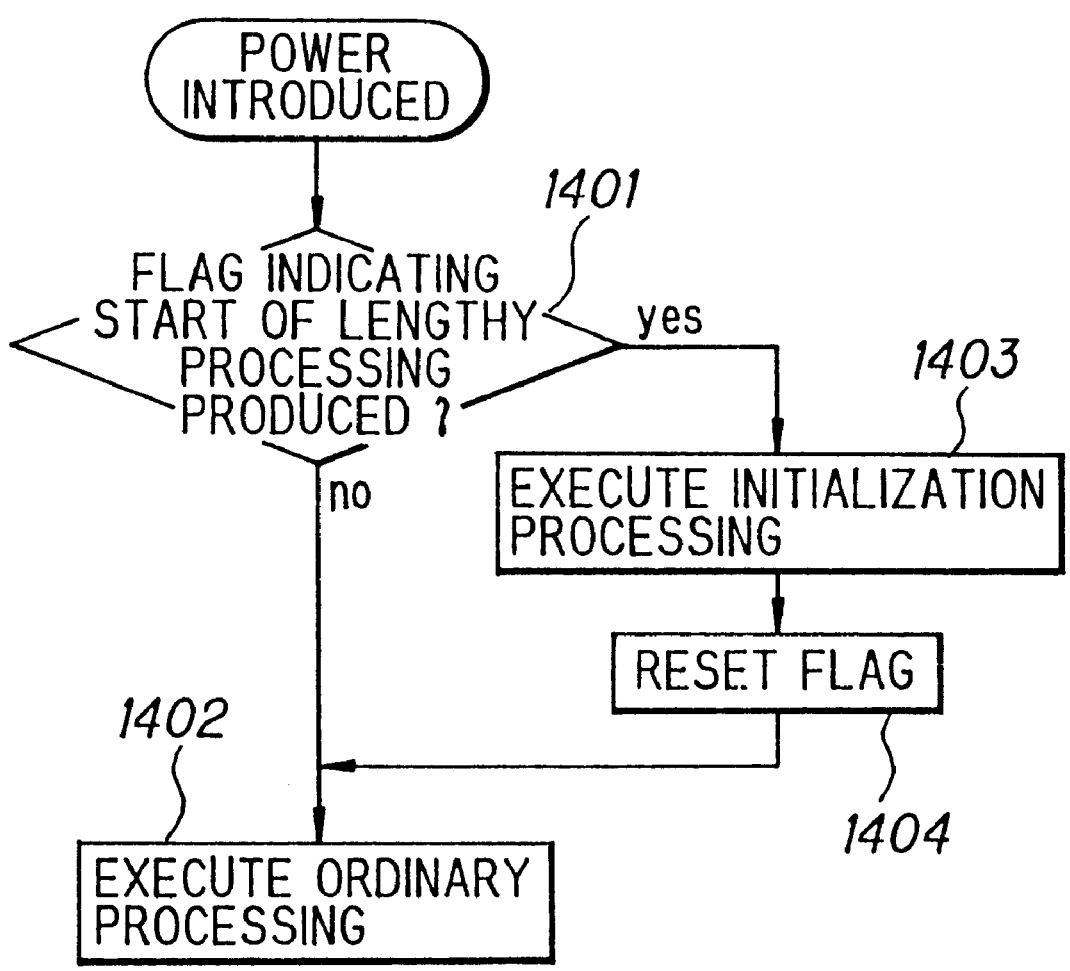
FIG. 50 is a flowchart of processing executed when power is introduced.

FIGS. 49 and 50 are flowcharts illustrating processing executed by the controller 21 in order to cut off the power supply, at intervals of processing that will not cause inconvenience, even when overall processing has not ended. It should be noted that the hardware configuration for this processing is identical with that of the embodiment shown in FIG. 41.

Before the start of processing that will require an extended period of time, the controller 31 performs a check to determine whether the power-switch OFF information has been written in the register 31a (step 301). If this information has been written in the register, then the controller 31 outputs the power cut-off signal CPB to the power-off request signal generating unit 33b via the cable LN2 to cut off the power supply (step 1302).

If the power-switch OFF information has not been written in the register 31a, a flag indicating the start of lengthy processing is set in a prescribed block of the hard disk (step 1303), after which the controller 31 determines whether the power-switch OFF information has been written in the register 31a (step 1304). If this information has been written in the register, then the controller 31 outputs the power cut-off signal CPB to the power-off request signal generating unit 33b via the cable LN2 to cut off the power supply (step 1302).

If the power-switch OFF information has not been written in the register 31a, the controller 31 executes first processing, which is the result of subdividing processing beforehand into a plurality of processing operations in units that will not cause difficulty (step 1305). After this processing is executed, the controller 31 performs a check to determine whether the power-switch OFF information has been written in the register 31a (step 301). If this information has been written in the register, then the controller 31 outputs the power cut-off signal CPB to the power-off request signal generating unit 33b via the cable LN2 to cut off the power supply (step 1302).

If the power-switch OFF information has not been written in the register 31a, the controller 31 executes second processing, which is the result of subdividing processing beforehand into a plurality of processing operations in units that will not cause difficulty (step 1307). Thereafter, and in similar fashion, the controller determines whether the power-supply switch has been turned off. If the switch has not been turned off, the controller successively executes third, fourth, . . . , n-th processing resulting from successive subdivision. Then, after the last subdivided processing operation ends, the controller resets the flag, which has been set in the prescribed block of the hard disk, indicating the beginning of lengthy processing (step 1308). The controller then executes other processing.

FIG. 50 is a flowchart of processing executed by the controller 31 when the power-supply switch 35 is turned on. When the power-supply switch 35 is turned on to introduce power, the controller 31 determines whether the flag indicative of lengthy processing has been set (1401). If the flag has not been set, the controller 31 executes ordinary processing (step 1402). If the flag has been set, the controller 31, which takes this as meaning that the power-supply switch has been turned off to cut off the power supply during the execution of lengthy processing, invalidates the result of this lengthy processing. In other words, the controller 31 judges that none of the subdivided processing of the lengthy processing took place and initializes the result of processing (step 1403). The controller 31 subsequently resets the flag indicative of the start of lengthy processing (step 1404) and executes ordinary processing.

Thus, it is so arranged that the controller sets the flag indicative of the start of lengthy processing before the start of processing, resets the flag at the end of processing and subdivides the processing into a plurality of processing operations in units that will not cause difficulties. Before execution of the subdivided processing operations, the controller determines whether the power-switch OFF signal has been produced. If this signal has been produced, the controller outputs the power-off request signal to cut off the power supply. As a result, even if the power-supply switch is turned off during the execution of lengthy processing, the power supply can be cut off promptly so that the operator will not experience any anxiety.

Even if the power supply is cut off during the course of lengthy processing, the next time the power supply is turned on the controller determines whether the flag indicative of the start of lengthy processing has been set. If the flag has been set, the controller judges that the power-supply switch was turned off during processing and then invalidates the result of the lengthy processing. Thus, no difficulties arise.

In a case where the controller 31 does not generate the power cut-off signal CPB even at elapse of the prescribed time from the moment the power-supply switch is turned off, the power supply is cut off by the power cut-off signal TPB outputted by the timer 33b-1.

In accordance with the fourth embodiment, the power supply is not cut off immediately when the power-supply switch is turned off. Instead, the power supply is cut off after the end of power cut-off preparation processing (e.g., data writing processing currently being executed). As a result, even if the power-supply switch is turned off accidentally as by the operator when processing is in progress, a disk error will not occur the next time power is introduced.

Further, the arrangement is such that when the power-supply switch is turned off, the power cut-off masking signal PMB is outputted to invalidate the power cut-off signal TPB produced (by the timer) upon passage of time, and the power cut-off signal CPB is outputted at the completion of the prescribed power cut-off preparation processing, thereby cutting off the power supply. Therefore, even if the elapsed time attains a set time before the power cut-off preparation processing ends, the power supply is not allowed to be cut off. Accordingly, even if the processing is power cut-off preparation processing that takes a long period of time, power cut-off can be upon execution this processing in its entirety.

Furthermore, it is so arranged that the controller sets information indicative of the start of length processing before the start of processing, sets information indicative of the end of processing (resets the information indicative of the start of processing) upon the completion of processing and subdivides the processing into a plurality of processing operations in units that will not cause difficulties. Before execution of the subdivided processing operations, the controller determines whether the power-switch OFF signal has been produced. If this signal has been produced, the controller outputs the power-off request signal to cut off the power supply. As a result, even if the power-supply switch is turned off during the execution of lengthy processing, the power supply can be cut off promptly so that the operator will not experience any anxiety. Moreover, the next time the power-supply switch is turned on, the controller determines whether the information indicative of the start of processing has been set. If it has been set, the controllers takes this as meaning that the power supply was cut off during processing and responds by invalidating the result of the lengthy processing. Accordingly, no difficulties arise even if the power-supply switch is turned off to cut off the power supply during the execution of lengthy processing.

As many apparently widely different embodiments of the present invention can be made without departing from the spirit and scope thereof, it is to be understood that the invention is not limited to the specific embodiments thereof except as defined in the appended claims.

What is claimed is:

1. A cache memory control method in a character-image data generating system having a first cache memory from which stored character-image data vanishes owing to cut-off of a power supply, and a second cache memory in which stored character-image data is held even if the power supply is cut off, said method comprising the steps of:

saving newly generated character-image data that has been used in the first cache memory if said first cache memory is not full;

saving said newly generated character-image data in said first cache memory, after some of the character-image data that has been saved in said first cache memory is transferred to said second cache memory, if said first cache memory is full;

searching said first cache memory when prescribed character-image data is necessary, searching said second cache memory if the prescribed character-image data is not found in said first cache memory, and outputting character-image data retrieved by the search;

generating the prescribed character-image data if the data cannot be retrieved from either of the cache memories, outputting the generated character-image data and saving said generated character-image data in said first cache memory;

transferring character-image data, which has been saved in said first cache memory but not in said second cache memory, from said first cache memory to said second cache memory to save the character-image data in said second cache memory; and transferring some of the character-image data that has been saved in said second cache memory to said first cache memory when power is introduced, wherein transfer of character-image data from said first cache memory to said second cache memory is carried out after the system having said first cache memory has stopped outputting character-image data.

2. The method according to claim 1, further comprising the step of executing the transfer of character-image data from said first cache memory to said second cache memory at fixed time intervals in prescribed data units.

3. The method according to claim 2, further comprising the steps of:

assigning character-image data saved in said first cache memory an order of priority in accordance with an order in which the character-image data is used; and transferring character-image data to said second cache memory starting from character-image data of a comparatively high order of priority.

4. The method according to claim 1, wherein said first cache memory is a RAM cache memory using a RAM, said second cache memory is a disk cache memory using a disk-like storage medium, and said data is font-image data.

5. A cache memory control method in a character-image data generating system having a storage unit for storing outline-font data of a number of characters, a cache memory for storing character-image data created by developing the outline-font data, and a cache memory controller, said system generating character-image data corresponding to an entered character mode, said method comprising the steps of:

searching said cache memory, when a character code has been entered, to determine whether character-image data corresponding to said character code has been stored in said cache memory;

generating character-image data by loading the character-image data from said cache memory if said character-image data has been stored in said cache memory; and generating character-image data using outline-font data, which corresponds to said character code, stored in said storage unit if the character-image data has not been stored in said cache memory and saving said character-image data in said cache memory; and halting saving of the character-image data in said cache memory if such halt is externally commanded, wherein said cache memory has a first cache memory from which stored data vanishes owing to cut-off of a power supply and a second cache memory in which stored data is held even if the power supply is cut off;

said save processing includes:

saving generated character-image data in the first cache memory if said first cache memory is not full;

saving said generated character-image data in said first cache memory, after some of the character-image data that has been saved in said first cache memory is transferred in said second cache memory, if said first cache memory is full; and if a cache memory in which saving is to be halted is externally specified, halting the saving of the character-image data in said specified cache memory; and said search and load processing includes:

searching said first cache memory to determine whether character-image data corresponding to a character code has been stored in said first cache memory;

searching said second cache memory if the character-image has not been stored in said first cache memory; and loading character-image data, which has been retrieved by the search, from the cache memory.

6. A cache memory control method in a character-image data generating system having a storage unit for storing outline-font data of a number of characters, a cache memory for storing character-image data created by developing the outline-font data, and a cache memory control unit, said system generating character-image data corresponding to an entered character mode, said method comprising the steps of:

searching said cache memory, when a character code has been entered to determine whether character-image data corresponding to said character code has been stored in said cache memory, generating character-image data by loading the character-image data from said cache memory if said character-image data has been stored in said cache memory;

generating character-image data using outline-font data, which corresponds to said character code, stored in said storage unit if the character-image data has not been stored in said cache memory, and saving said character-image data in said cache memory; and halting loading of the character-image data from said cache memory if such halt is externally commanded, wherein said cache memory has a first cache memory from which stored data vanishes owning to cut-off of a power supply and a second cache memory in which stored data is held even if the power supply is cut off;

said save processing includes:

saving generated character-image data in the first cache memory if said first cache memory is not full; and saving said generated character-image data in said first cache memory, after some of the character-image data that has been saved in said first cache memory is transferred in said second cache memory, if said first cache memory is full; and said search and load processing includes:

searching said first cache memory to determine whether character-image data corresponding to a character code has been stored in said first cache memory;

searching said second cache memory if the character-image data has not been stored in said first cache memory; and loading character-image data, which has been retrieved by the search, from said first or second cache memory; and if a cache memory from which loading is to be halted is externally specified, halting the loading of the character-image data from said specified cache memory.

7. A cache memory control method in a character-image data generating system having a storage unit for storing outline-font data of a number of characters, a cache memory for storing character-image data created by developing the outline-font data, and a cache memory controller, said system generating character-image data corresponding to an entered character code, said method comprising the steps of:

searching said cache memory, when a character code has been entered to determine whether character-image data corresponding to said character code has been stored in said cache memory;

loading the character-image data from said cache memory if said character-image data has been stored in said cache memory;

generating character-image data using outline-font data, which corresponds to said character code, stored in said storage unit if the character-image data has not been stored in said cache memory, and saving said character-image data in said cache memory; and erasing the character-image data, which has been stored in said cache memory, in response to an externally applied command wherein said cache memory has a first cache memory from which stored data vanishes owing to cut-off of a power supply and a second cache memory in which stored data is held even if the power supply is cut off;

said save processing includes:
   saving generated character-image data in the first cache memory if said first cache memory is not full; and
   saving said generated character-image data in said first cache memory, after some of the character-image data that has been saved in said first cache memory is saved in said second cache memory, if said first cache memory is full; and said search and load processing includes:
   searching said first cache memory to determine whether character-image data corresponding to a character code has been stored in said first cache memory;
   searching said second cache memory if the character-image has not been stored in said first cache memory; and
   loading character-image data, which has been retrieved by the search, from said first or second cache memory; and
   if a cache memory from which character-image data is to be erased is designated by an externally applied command, erasing the character-image data that has been stored in said cache memory.

* * * * *